(12) United States Patent
Brown et al.

(10) Patent No.: US 12,099,250 B2
(45) Date of Patent: Sep. 24, 2024

(54) ACTUATOR ASSEMBLY

(71) Applicant: CAMBRIDGE MECHATRONICS LIMITED, Cambridge (GB)

(72) Inventors: Andrew Benjamin Simpson Brown, Cambridge (GB); Adam South, Cambridge (GB); Robert Langhorne, Cambridge (GB); James Howarth, Cambridge (GB); Emily Kwok, Cambridge (GB)

(73) Assignee: CAMBRIDGE MECHATRONICS LIMITED, Cambridge (GB)

( * ) Notice: Subject to any disclaimer, the term of this patent is extended or adjusted under 35 U.S.C. 154(b) by 0 days.

(21) Appl. No.: 18/019,304

(22) PCT Filed: Aug. 5, 2021

(86) PCT No.: PCT/GB2021/052032
§ 371 (c)(1),
(2) Date: Feb. 2, 2023

(87) PCT Pub. No.: WO2022/029441
PCT Pub. Date: Feb. 10, 2022

(65) Prior Publication Data
US 2023/0213728 A1    Jul. 6, 2023

(30) Foreign Application Priority Data

Aug. 5, 2020  (GB) ..................... 2012206
Aug. 5, 2020  (GB) ..................... 2012207
Aug. 5, 2020  (GB) ..................... 2012208

(51) Int. Cl.
*G02B 7/08*    (2021.01)
*G02B 27/64*    (2006.01)
(Continued)

(52) U.S. Cl.
CPC ............. *G02B 7/08* (2013.01); *G02B 27/646* (2013.01); *G03B 5/06* (2013.01); *G03B 13/36* (2013.01);
(Continued)

(58) Field of Classification Search
CPC ...... G02B 27/646; G02B 6/3514; G02B 7/08; G02B 7/09; G02B 7/182; G02B 15/173;
(Continued)

(56) References Cited

U.S. PATENT DOCUMENTS 8,350,959 B2 *  1/2013  Topliss ................... F03G 7/065
                                                                396/73
2008/0158412 A1   7/2008  Tagome et al.
2021/0382320 A1  12/2021  Brown et al.

FOREIGN PATENT DOCUMENTS

EP    2372428 A1    10/2011
GB    2575026 A     1/2020
(Continued)

OTHER PUBLICATIONS

Great Britain Search Report Received for GB Application No. 2012206.5, dated Jan. 14, 2021, 5 pages.
(Continued)

*Primary Examiner* — Stephone B Allen
*Assistant Examiner* — Tamara Y. Washington
(74) *Attorney, Agent, or Firm* — Haley Guiliano LLP

(57) ABSTRACT

An actuator assembly (4001) includes a first part (4002), a second part (4004), a bearing arrangement (4003) and a drive arrangement (4005). The bearing arrangement (4003) includes first to fourth flexures (40151, 40152, 40153, 40154) arranged about a primary axis (4009) passing through the actuator assembly (4001). The bearing arrangement (4003) supports the second part (4004) on the first part
(Continued)

(4002). The second part (4004) is tiltable about first and/or second axes (4011, 4012) which are not parallel and which are perpendicular to the primary axis (4009). The drive arrangement (4005) includes four lengths of shape memory alloy wire (40101, 40102, 40103, 40104). The four lengths of shape memory alloy wire (40101, 40102, 40103, 40104) are coupled to the second part (4004) and to the first part (4002). The bearing 15 arrangement (4003) is configured to convert lateral force(s) normal to the primary axis (4009) generated by the drive arrangement (4005) into tilting of the second part (4004) about the first and/or second axes (4011, 4012). Each of the first to fourth flexures (40151, 40152, 40153, 40154) has a first end (4016) connected to the first part (4002) and a second end (4017) connected to the second part (4004). Each of the first to fourth flexures (40151, 40152, 40153, 40154) includes a feature (1016) configured to increase a first compliance of that flexure (40151, 40152, 40153, 40154) to displacement of the respective second end (4017) towards the respective first end (4016). The first compliance is less than a second compliance of that flexure (40151, 40152, 40153, 40154) to 25 displacement of the respective second end (4017) parallel to the primary axis (4009).

20 Claims, 26 Drawing Sheets

(51) Int. Cl.
*G03B 5/06* (2021.01)
*G03B 13/36* (2021.01)
*F03G 7/06* (2006.01)

(52) U.S. Cl.
CPC ........ *F03G 7/06143* (2021.08); *F03G 7/0665* (2021.08); *G03B 2205/0023* (2013.01); *G03B 2205/0076* (2013.01)

(58) Field of Classification Search
CPC ...... G02B 15/14; G02B 15/177; G02B 15/22; G02B 15/16; G02B 13/18; G02B 13/009; G02B 27/64; G02B 13/02; G02B 7/04; G02B 13/0015; G02B 15/15; G02B 13/0045; G02B 15/17; G02B 15/20; G02B 27/0025; G02B 9/62; G02B 13/04; G02B 7/023; G02B 9/64; G02B 13/001; G02B 13/0065; G02B 15/10; G02B 15/163; G02B 15/167; G02B 23/02; G02B 7/02; G02B 7/022; G02B 7/102; G02B 7/14; G02B 9/04; G02B 9/34; G02B 9/60; G02B 13/002; G02B 13/004; G02B 13/06; G02B 13/16; G02B 15/12; G02B 15/161; G02B 17/08; G02B 17/0804; G02B 17/0808; G02B 17/0896; G02B 21/26; G02B 23/08; G02B 26/004; G02B 26/0808; G02B 26/0816; G02B 27/0911; G02B 27/644; G02B 3/14; G02B 7/021; G02B 7/025; G02B 7/18; G02B 7/24; G02B 7/28; G02B 9/00; G02B 9/24; H04N 5/23287; H04N 5/2252; H04N 5/2254; H04N 5/2329; H04N 5/2257; H04N 5/2253; H04N 5/23248; H04N 5/2328; H04N 5/225; H04N 5/232; H04N 5/23209; H04N 5/23212; H04N 5/23245; H04N 5/23258; H04N 5/23264; H04N 13/0203; H04N 13/0239; H04N 13/0296; H04N 5/222; H04N 5/228; H04N 5/23229; H04N 5/23251; H04N 5/23254; H04N 5/23261; H04N 5/23274; H04N 5/238; H04N 23/58; H04N 23/687; H04N 23/55; G03B 5/00; G03B 3/00; G03B 3/14; G03B 5/02; G03B 5/06; G03B 2205/0015; G03B 3/10; G03B 2205/0069; G03B 2205/002; G03B 2205/0007; G03B 13/36; G03B 17/02; G03B 17/04; G03B 17/14; G03B 17/12; G03B 2205/0046; G03B 2205/0053; G03B 2205/0092; G03B 2217/005; G03B 2205/0023; G03B 2205/0076; F03G 7/06143; F03G 7/0665
USPC ............................................. 348/374, 208.11
See application file for complete search history.

(56) References Cited

FOREIGN PATENT DOCUMENTS

| KR | 10-2015-0127792 A | 11/2015 |
|----|-------------------|---------|
| WO | 2008/099155 A1 | 8/2008 |
| WO | 2009/056822 A2 | 5/2009 |
| WO | 2010/029316 A2 | 3/2010 |
| WO | 2010/089526 A2 | 8/2010 |
| WO | 2018/202819 A1 | 11/2018 |
| WO | 2019/162694 A1 | 8/2019 |
| WO | 2020074899 A1 | 4/2020 |

OTHER PUBLICATIONS

Great Britain Search Report Received for GB Application No. 2012207.3, dated Jan. 14, 2021, 4 pages.
Great Britain Search Report Received for GB Application No. 2012208.1, dated Jan. 14, 2021, 5 pages.
International Search Report and Written Opinion received for PCT Patent Application No. PCT/GB21/052032, dated Jan. 11, 2022, 15 pages.

* cited by examiner

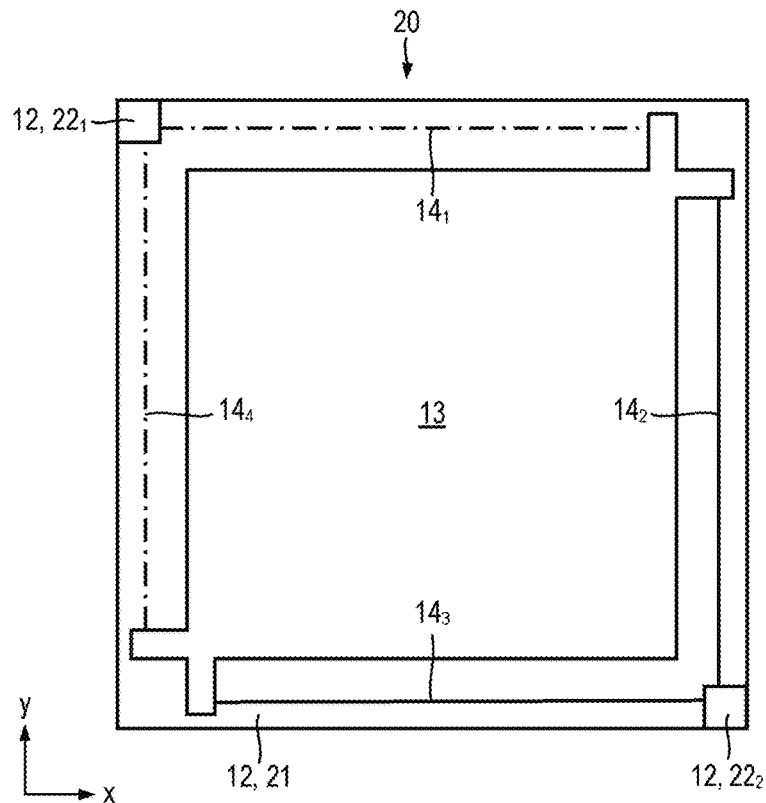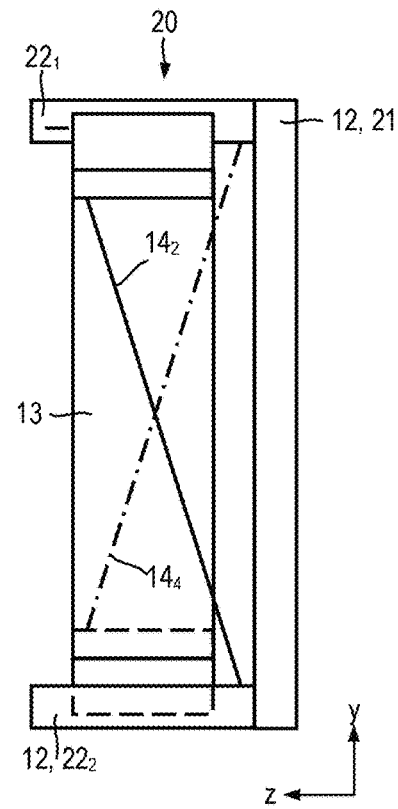
Fig. 5A    Fig. 5B
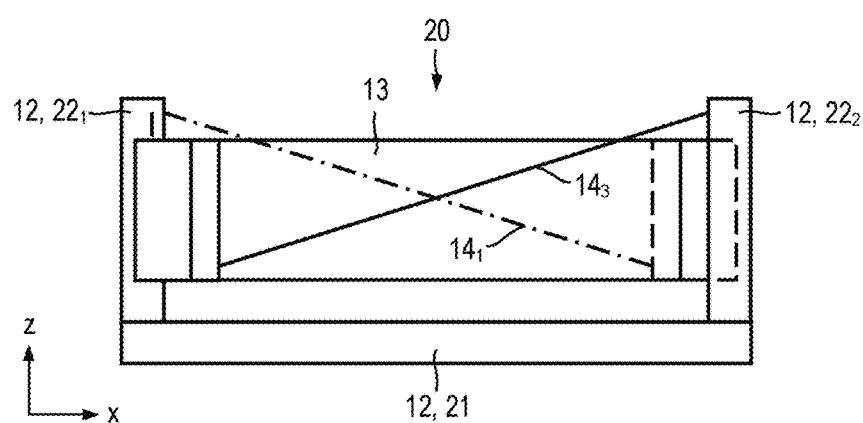
Fig. 5C

ACTUATOR ASSEMBLY

CROSS-REFERENCE TO RELATED APPLICATIONS

This application is a national stage application under 35 U.S.C. § 371 of International Application No. PCT/GB2021/052032, filed Aug. 5, 2021, which claims priority of GB Patent Applications 2012206.5, filed Aug. 5, 2020, 2012207.3, filed Aug. 5, 2020, and 2012208.1, filed Aug. 5, 2020, the disclosures of each of which are hereby incorporated by reference herein in their entireties.

FIELD

The present application relates to an actuator assembly, particularly an actuator assembly comprising a plurality of lengths of shape-memory alloy (SMA) wire.

BACKGROUND

Such an actuator assembly may be used, for example, to provide optical image stabilization (OIS) in connection with a compact camera module by tilting the entire module including the image sensor and the lens system relative to a support structure. This method of providing OIS is often referred to as 'module tilt'.

WO 2010/029316 A2 describes a camera apparatus with a suspension system comprising a plurality of flexure elements supporting the camera module on the support structure in a manner allowing the camera module to tilt and with a plurality of SMA wires each connected between the camera module and the support structure and arranged on contraction to drive tilting of the camera module. The SMA wire may be fixed to the camera module at its ends and hooked over an element of the support structure.

SUMMARY

According to a first aspect of the present invention, there is provided an actuator assembly including a first part, a second part, a bearing arrangement and a drive arrangement (or system). The bearing arrangement includes first to fourth flexures arranged about a primary axis passing through the actuator assembly. The bearing arrangement supports the second part on the first part. The second part is tiltable about first and/or second axes which are not parallel and which are perpendicular to the primary axis. The drive arrangement includes four lengths of shape memory alloy wire. The four lengths of shape memory alloy wire are coupled to the second part and to the first part. The bearing arrangement is configured to convert lateral force(s) normal to the primary axis generated by the drive arrangement into tilting of the second part about the first and/or second axes. Each of the first to fourth flexures has a first end connected to the first part and a second end connected to the second part. Each of the first to fourth flexures includes a feature configured to increase a first compliance of that flexure to displacement of the respective second end towards (and/or away from) the respective first end. The first compliance is less than a second compliance of that flexure to displacement of the respective second end parallel to the primary axis.

Thus, there is provided an alternative actuator assembly which can be used, for example, to provide module tilt OIS and in which the driving forces required to tilt the second part can be reduced and/or displacements of the second part other than tilting can be reduced.

The first to fourth flexures may be elongate. The features of the first to fourth flexures do not simply correspond to increasing the length of the flexures.

The first to fourth flexures may be equi-angularly spaced about the primary axis.

The first and second compliances correspond to effective, overall or total compliances for relative displacements between the first and second ends, which take into account the geometry and materials of the corresponding flexure.

The drive arrangement may consist of four lengths of shape memory alloy wires. The four lengths of shape memory alloy wires may directly connect or couple the second part to the first part.

The four lengths of shape memory alloy wires may be configured, in response to applied input signals, to generate a first force parallel to the first axis, a second force parallel to the second axis and/or a torque around the normal.

Each of the four length of shape memory alloy wire corresponds to a section of shape memory alloy wire over which a drive current may be controlled independently. For example, a pair of lengths of shape memory alloy wire may be provided by a single physical wire having a first current source connected to one end, a second current source connected to the other end and a current return connection at a point between the two ends.

Each length of shape memory alloy wire may be arranged to apply a force to a part that has a component which is not parallel, e.g., substantially perpendicular, to the primary axis.

The normal may pass through a pivot point. The pivot point need not be a physical point, for example, a point on a surface of an object, but may be located in space. The pivot point may more, for example, in response to the first bearing arrangement moving and/or deforming.

The first and second axes may be perpendicular to the primary axis. The first axis may be perpendicular to the second axis.

The first and third flexures may run in a first sense about the primary axis, and the second and fourth flexures may run in a second, opposite, sense about the primary axis.

The first sense may be clockwise and the second sense anti-clockwise (counter-clockwise). A flexure which "runs" in a sense about the primary axis (e.g. clockwise) may correspond to that flexure being elongated such that a pair of lines drawn from the first and second ends of that flexure to the third axis z make an angle about the third axis z which has a sign (moving from the first end to the second end) which is either positive (e.g. a first sense) or negative (e.g. a second sense).

The feature of each of the first to fourth flexures may include at least one change of direction at a point between the respective first and second ends. Each feature may correspond to a change of direction and/or a change of cross-section of the flexure at a point between the respective first and second ends.

The feature of each of the first to fourth flexures may include at least one hairpin-shaped portion of that flexure. A hairpin shaped portion may be confined to a corresponding plane, optionally the plane may be parallel to the primary axis.

The feature of each of the first to fourth flexures may include at least one portion of that flexure which meanders within an envelope. A feature may meander within a corresponding plane, optionally the plane may be parallel to the primary axis.

The feature of each of the first to fourth flexures may include at least one curved portion of that flexure. A curved portion may lie within a corresponding plane, optionally the plane may be parallel to the primary axis. The plane may be parallel to the primary axis.

The feature of each of the first to fourth flexures may include at least one elbow. An elbow may lie within a corresponding plane, optionally the plane may be parallel to the primary axis. The plane may be parallel to the primary axis.

Each flexure may be substantially L-shaped with a first straight portion. The first straight portion may be connected by an elbow to a second straight portion. The first straight portion may be longer than the second straight portion.

Each feature may take the form of a change in the cross-sectional shape and/or area of the corresponding flexure. For example, a feature may take the form of a notch or a constriction in the corresponding flexure.

The first compliance may be less than or equal to 2% of the second compliance and the first compliance may be greater than or equal to 0.02% of the second compliance.

The first compliance may be between 0.05% and 2% of the second compliance. The first compliance may be between 0.1% and 2% of the second compliance. The first compliance may be between 0.02% and 1% of the second compliance. The first compliance may be between 0.05% and 1% of the second compliance. The first compliance may be between 0.1% and 1% of the second compliance. The first compliance may be between 0.02% and 0.2% of the second compliance. The first compliance may be between 0.05% and 0.2% of the second compliance. The first compliance may be between 0.1% and 0.2% of the second compliance.

The bearing arrangement may include one or more stops configured to constrain movement of the second part relative to the first part to within an allowed volume. Each feature of the first to fourth flexures may be configured so that the mechanical behaviour of the respective flexures remains elastic whilst the second part remains within the allowed volume.

For example, one or more stops (also termed "end-stops" may be positioned such that the second part will abut at least one stop after moving more than a maximum amount parallel to the first axis, the second axis and/or the primary axis. Additionally or alternatively, one or more stops may be positioned such that the second part will abut at least one stop after rotating more than a maximum angle about the first axis, the second axis and/or the primary axis. The volume within which the second part may move relative to the first part before abutting (coming into contact with) any of the stops may define the allowed volume.

At least one stop of the one or more stops may be configured to constrain movement of the second part relative to the first part along the primary axis.

The bearing arrangement may be configured to constrain rotation of the second part relative to the first part about the primary axis. Configured to constrain may mean to resist or even to prevent, or to discourage.

The bearing arrangement may be configured to allow rotation of the second part relative to the first part about the primary axis.

The bearing arrangement may be configured to constrain translation of the second part relative to the first part in directions perpendicular to the primary axis.

The bearing arrangement may include a pivot bearing. The pivot bearing may include a base and a pivot upstanding from the base or the first part. The pivot may have a distal end arranged to contact the second part. Conversely, the pivot may depend from the second part. The pivot may comprise silicone or another flexible material. The pivot may be surrounded, for example, by a coating or be embedded in a block, of flexible material such as silicone.

The bearing arrangement may include a thermally conductive link. For example, the flexible coating or block may help to conduct heat away from the second part.

The pivot may be conical. The pivot may be a cylindrical. The pivot may upstand from a centre of the base. The base may be flat. The base plate may be a plate. The base may be a frame. For example, the frame may include a web, for example, comprising an annular peripheral frame, a central pad and members linking the peripheral frame and a central pad. The base may be annular. For example, the pivot may comprise an annular base and a cone or a pyramid extending from the annular base (for instance, forming a cone or pyramid having a flange around its base). The second part may be shaped so as to provide a seat for the distal end of the pivot.

For example, the second part may include a blind hole (or "recess"), through hole or indent for seating the distal end of the pivot. The second part may include an annular projection defining a blind hole or indent. If the pivot depends from the second part, then the first part may be shaped so as to provide a seat for the distal end of the pivot.

Each of the four lengths of shape memory alloy wire may lie in a first plane parallel to a second plane defined by the first and second axes.

The first and second planes may be offset with respect to each other along the primary axis.

Using co-planar four shape memory wires can help reduce the height of the actuator assembly (or "lower the profile" of the actuator assembly). Offsetting the plane of the shape memory wires can allow force to be applied in a different plane to the first plane and thus allow the shape memory wires to cause tilting of the platform.

The four lengths of shape memory alloy wire may be not co-planar (non co-planar).

The four lengths of shape memory alloy wires may be configured, in response to applied input signals, to generate a first force parallel to the first axis, a second force parallel to the second axis and/or a torque around the normal.

The four shape memory wires may be inclined with respect to the first plane.

This can help achieve a higher stroke, but may result in less force.

Each of the each of the four lengths of shape memory wire may be interposed between the first and second parts.

Each of the first to fourth flexures may include a corresponding thin web.

The first to fourth flexures may be formed as a single part with the first part. The first part and the first to fourth flexures may be co-planar when the flexures are unflexed.

The first to fourth flexures may be formed as a single part with the second part. The second part and the first to fourth flexures may be co-planar when the flexures are unflexed.

The second part may be tiltable with respect to the first part to a range of ±6° (plus or minus six degrees) about the first and/or second axes.

The actuator assembly may also include an image sensor and a lens system. The image sensor and the lens system may be supported by the second part and tilt with the second part. Alternatively, the image sensor may be supported by the first part, and the lens system may be supported by the second part in order to tilt (and optionally move along the primary axis) with the second part.

The second part may be flat. The second part may be generally circular (i.e., a disc), elliptical (i.e., an elliptical disc or plate) or polygonal (i.e., a polygonal plate), for example, rectangular (i.e., a rectangular plate), in particular square (i.e., a square plate). The second part may be rigid or more rigid than the flexures.

A system may include the actuator assembly and a set of switching devices for applying drive signals to respective lengths of shape memory alloy wire. The system may also include a controller for individually controlling the switching devices.

According to a second aspect of the invention, there is provided a method including using the actuator assembly or the system for optical image stabilisation and/or automatic focussing.

The method may include features corresponding to any features of the actuator assembly or the system.

According to a third aspect of the invention, there is provided a camera assembly comprising a first part and a second part tiltable with respect to the first part. The camera assembly also includes a bearing arrangement which supports the second part on the first part. The bearing arrangement includes first to fourth flexures arranged about a primary axis passing through the camera assembly. The second part carries a module including an image senor and a lens system. The camera assembly also includes four lengths of shape memory alloy wires arranged, in response to drive signals, to cause tilting of the second part and the module with respect to the first part. Each of the first to fourth flexures has a first end connected to the first part and a second end connected to the second part. Each of the first to fourth flexures includes a feature configured to increase a first compliance of that flexure to displacement of the respective second end towards the respective first end. The first compliance is less than a second compliance of that flexure to displacement of the respective second end parallel to the primary axis.

The lens system may also include a lens carriage. The lens system may also include a lens arrangement including at least one lens. The lens system may also include an autofocussing system mechanically coupling the lens arrangement and the lens carriage to move the lens arrangement relative to the sensor.

The camera assembly may include features corresponding to any features of the actuator assembly or the system.

According to a fourth aspect of the present invention, there is provided an actuator assembly including a first part and a second part. The actuator assembly also includes first to fourth flexure arrangements connecting the first part to the second part. Each flexure arrangement includes a first portion connected to the first part. Each flexure arrangement also includes a second portion connected to the first portion by a flexure. The second portion is connected to the second part. The actuator assembly also includes first to fourth crimp arrangements connecting the first part to the second part. Each crimp arrangement includes a third portion connected to the first part and supporting a first crimp. Each crimp arrangement also includes a fourth portion connected to a side surface of the second part and supporting a second crimp. Each crimp arrangement also includes a length of shape memory alloy wire connected between the first and second crimps. The actuator assembly also includes a bearing arrangement including the flexures included in the first to fourth flexure arrangements, and supporting the second part on the first part. The second part is tiltable about first and/or second axes which are not parallel and which are perpendicular to a primary axis passing through the actuator assembly. The actuator assembly also includes a drive arrangement including the lengths of shape memory alloy wire included in the first to fourth crimp arrangements. The bearing arrangement is configured to convert lateral force(s) normal to the primary axis generated by the drive arrangement into tilting of the second part about the first and/or second axes.

Thus, there is provided an alternative actuator assembly which can be used, for example, to provide module tilt OIS, and which can be conveniently manufactured.

A side surface of the second part is any surface which is substantially parallel to the primary axis.

The first to fourth flexures may be elongate. Each flexure arrangement may be substantially planar. Each crimp arrangement may be substantially planar. Each of the first to fourth flexure arrangements may be substantially co-planar with the corresponding crimp arrangement.

Each first crimp may be formed as a single piece with the corresponding third portion. Each second crimp may be formed as a single piece with the corresponding fourth portion. Each first crimp may be attached to the corresponding third portion, for example by welding. Each second crimp may be attached to the corresponding fourth portion, for example by welding.

The drive arrangement may consist of four lengths of shape memory alloy wires. The four lengths of shape memory alloy wires may directly connect or couple the second part to the first part via the respective third and second portions.

The four lengths of shape memory alloy wires may be configured, in response to applied input signals, to generate a first force parallel to the first axis, a second force parallel to the second axis and/or a torque around the normal.

Each of the four lengths of shape memory alloy wire may correspond to a section of shape memory alloy wire over which a drive current may be controlled independently. For example, a pair of lengths of shape memory alloy wire may be provided by a single physical wire having a first current source connected to one end, a second current source connected to the other end and a current return connection at a point between the two ends.

Each length of shape memory alloy wire may be arranged to apply a force to a part that has a component which is not parallel, e.g., substantially perpendicular, to the primary axis.

The normal may pass through a pivot point. The pivot point need not be a physical point, for example, a point on a surface of an object, but may be located in space. The pivot point may more, for example, in response to the first bearing arrangement moving and/or deforming.

The first and second axes may be perpendicular to the primary axis. The first axis may be perpendicular to the second axis.

Each second portion may be electrically connected to the corresponding fourth portion, and the respective flexure may constitute a return path for electrical current through the respective length of SMA wire.

The first flexure arrangement corresponds to the first crimp arrangement. The second flexure arrangement corresponds to the second crimp arrangement. The third flexure arrangement corresponds to the third crimp arrangement. The fourth flexure arrangement corresponds to the fourth crimp arrangement.

Each second portion may be formed as a single piece with the corresponding fourth portion. In other words, each flexure arrangement and corresponding crimp arrangement may correspond to a single (assembly) unit. Alternatively, each second portion and the corresponding fourth portion may be separate pieces.

Each second portion may be connected to the same side surface of the second part as the corresponding fourth portion. Alternatively, each second portion may be connected to a different surface of the second part to the corresponding fourth portion, for example a lower surface.

Each first portion may be formed as a single piece with the corresponding third portion. Alternatively, each first portion and the corresponding third portion may be separate pieces.

The length of shape memory alloy wire corresponding to each of the first to fourth crimp arrangements may be offset along the primary axis with respect to the flexure of the corresponding flexure arrangement.

Each flexure of the first to fourth flexure arrangements may have a first end connected to the first portion and a second end connected to the second portion.

Each flexure may include a feature configured to increase a first compliance of that flexure to displacement of the respective second end towards the respective first end. The first compliance may be less than a second compliance of that flexure to displacement of the respective second end parallel to the primary axis.

The features do not simply correspond to increasing the length of the flexures. Rather, each feature may correspond to a change of direction and/or a change of cross-section of an elongate flexure at a point between the respective first and second ends The first and second compliances correspond to effective, overall or total compliances for relative displacements between the first and second ends, which take into account the geometry and materials of the corresponding flexure.

The first compliance may be less than or equal to 2% of the second compliance and the first compliance may be greater than or equal to 0.02% of the second compliance.

The first compliance may be between 0.05% and 2% of the second compliance. The first compliance may be between 0.1% and 2% of the second compliance. The first compliance may be between 0.02% and 1% of the second compliance. The first compliance may be between 0.05% and 1% of the second compliance. The first compliance may be between 0.1% and 1% of the second compliance. The first compliance may be between 0.02% and 0.2% of the second compliance. The first compliance may be between 0.05% and 0.2% of the second compliance. The first compliance may be between 0.1% and 0.2% of the second compliance The bearing arrangement may include one or more stops configured to constrain movement of the second part relative to the first part to within an allowed volume. Each feature of the first to fourth flexures may be configured so that the mechanical behaviour of the respective flexures remains elastic whilst the second part remains within the allowed volume.

For example, one or more stops (also termed "end-stops" may be positioned such that the second part will abut at least one stop after moving more than a maximum amount parallel to the first axis, the second axis and/or the primary axis. Additionally or alternatively, one or more stops may be positioned such that the second part will abut at least one stop after rotating more than a maximum angle about the first axis, the second axis and/or the primary axis.

The volume within which the second part may move relative to the first part before abutting (coming into contact with) any of the stops may define the allowed volume.

At least one stop of the one or more stops may be configured to constrain movement of the second part relative to the first part along the primary axis.

The bearing arrangement may be configured to constrain rotation of the second part relative to the first part about the primary axis. Configured to constrain may mean to resist or even to prevent, or to discourage.

The first to fourth flexures corresponding to the first to fourth flexure arrangements may be arranged about the primary axis The first and third flexures may run in a first sense about the primary axis, and the second and fourth flexures may run in a second, opposite, sense about the primary axis.

The first to fourth flexures may be equi-angularly spaced about the primary axis. The first sense may be clockwise and the second sense anti-clockwise (counter-clockwise). A flexure which "runs" in a sense about the primary axis (e.g. clockwise) may correspond to that flexure being elongated such that a pair of lines drawn from the first and second ends of that flexure to the third axis z make an angle about the third axis z which has a sign (moving from the first end to the second end) which is either positive (e.g. a first sense) or negative (e.g. a second sense).

The feature of each flexure of the first to fourth flexure arrangements may include at least one hairpin-shaped portion of that flexure. A hairpin shaped portion may be confined to a corresponding plane, optionally the plane may be parallel to the primary axis. The feature of each flexure of the first to fourth flexure arrangements may include at least one portion of that flexure which meanders within an envelope. A feature may meander within a corresponding plane, optionally the plane may be parallel to the primary axis. The feature of each flexure of the first to fourth flexure arrangements may include at least one curved portion of that flexure. A curved portion may lie within a corresponding plane, optionally the plane may be parallel to the primary axis. The plane may be parallel to the primary axis. The feature of each flexure of the first to fourth flexure arrangements may include at least one elbow. An elbow may lie within a corresponding plane, optionally the plane may be parallel to the primary axis. The plane may be parallel to the primary axis. Each flexure of the first to fourth flexure arrangements may be substantially L-shaped with a first straight portion. The first straight portion may be connected by an elbow to a second straight portion. The first straight portion may be longer than the second straight portion.

Each feature may take the form of a change in the cross-sectional shape and/or area of the corresponding flexure. For example, a feature may take the form of a notch or a constriction in the corresponding flexure.

The bearing arrangement may be configured to constrain rotation of the second part relative to the first part about the primary axis. Configured to constrain may mean to resist or even to prevent, or to discourage.

The bearing arrangement may be configured to allow rotation of the second part relative to the first part about the primary axis.

The bearing arrangement may be configured to constrain translation of the second part relative to the first part in directions perpendicular to the primary axis.

The bearing arrangement may include a pivot bearing. The pivot bearing may include a base and a pivot upstanding from the base or the first part and having a distal end, wherein the distal end of the pivot is arranged to contact the second part. Conversely, the pivot may depend from the second part. The pivot may comprise silicone or another flexible material. The pivot may be surrounded, for example, by a coating or be embedded in a block, of flexible material such as silicone.

The bearing arrangement may include a thermally conductive link. For example, the flexible coating or block may help to conduct heat away from the second part.

The pivot may be conical. The pivot may be a cylindrical. The pivot may upstand from a centre of the base. The base may be flat. The base plate may be a plate. The base may be a frame. For example, the frame may include a web, for example, comprising an annular peripheral frame, a central pad and members linking the peripheral frame and a central pad. The base may be annular. For example, the pivot may comprise an annular base and a cone or a pyramid extending from the annular base (for instance, forming a cone or pyramid having a flange around its base).

The second part may be shaped so as to provide a seat for the distal end of the pivot. For example, the second part may include a blind hole (or "recess"), through hole or indent for seating the distal end of the pivot. The second part may include an annular projection defining a blind hole or indent. If the pivot depends from the second part, then the first part may be shaped so as to provide a seat for the distal end of the pivot.

Each of the four lengths of shape memory alloy wire may lie in a first plane parallel to a second plane defined by the first and second axes. The first and second planes may be offset with respect to each other along the primary axis.

Using co-planar four shape memory wires can help reduce the height of the actuator assembly (or "lower the profile" of the actuator assembly). Offsetting the plane of the shape memory wires can allow force to be applied in a different plane to the first plane and thus allow the shape memory wires to cause tilting of the platform.

The four lengths of shape memory alloy wire may be not co-planar.

The four lengths of shape memory alloy wires may be configured, in response to applied input signals, to generate a first force parallel to the first axis, a second force parallel to the second axis and/or a torque around the normal.

The four shape memory wires may be inclined with respect to the first plane.

This can help achieve a higher stroke, but may result in less force.

Each of the each of the four lengths of shape memory wire may be interposed between the first and second parts.

Each of the first to fourth flexure arrangements may include, or take the form of, a thin web. Each of the first to fourth crimp arrangements may include, or take the form of, a thin web. Each of the first to fourth flexure arrangements and the corresponding crimp arrangement may include, or take the form of, the same thin web.

The actuator assembly may also include an image sensor and a lens system which are supported by the second part so as to tilt with the second part.

The actuator assembly may also include an image sensor supported by the first part, and a lens system supported by the second part so as to tilt with the second part.

The second part may be flat. The second part may be generally circular (i.e., a disc), elliptical (i.e., an elliptical disc or plate) or polygonal (i.e., a polygonal plate), for example, rectangular (i.e., a rectangular plate), in particular square (i.e., a square plate). The second part may be rigid or more rigid than the flexures.

A system may include the actuator assembly and a set of switching devices for applying drive signals to respective lengths of shape memory alloy wire. The system may also include a controller for individually controlling the switching devices.

According to a fifth aspect of the invention, there is provided a method comprising using the actuator assembly for optical image stabilisation and/or automatic focussing.

The method may include using the system. The method may include features corresponding to any features of the actuator assembly or the system.

According to a sixth aspect of the invention there is provided a method of fabricating an actuator assembly. The method includes crimping four lengths of shape memory wire to first to fourth corresponding crimp arrangements. Each crimp arrangement includes a third portion supporting a first crimp and a fourth portion supporting a second crimp. The length of shape memory alloy wire is crimped between the first and second crimps. Each of the first to fourth crimp arrangements corresponds to one of first to fourth flexure arrangements. Each flexure arrangement includes a first portion and a second portion connected by a flexure. The method also includes connecting each of the first to fourth crimp arrangements and first to fourth flexure arrangements between a first part and a second part. Connecting each of the first to fourth crimp arrangements between the first part and the second part includes connecting each fourth portion to a side surface of the second part. The connection of the crimp arrangements and flexure arrangements between the first and second parts is such that a bearing arrangement includes the flexures included in the first to fourth flexure arrangements, and supports the second part on the first part. The bearing arrangement formed is such that the second part is tiltable about first and/or second axes which are not parallel and which are perpendicular to a primary axis passing through the actuator assembly. The connection of the crimp arrangements and flexure arrangements between the first and second parts is such that a drive arrangement includes the lengths of shape memory alloy wire included in the first to fourth flexure arrangements. The bearing arrangement is configured to convert lateral force(s) normal to the primary axis generated by the drive arrangement into tilting of the second part about the first and/or second axes.

The method of fabricating an actuator assembly may include features corresponding to any features of the actuator assembly, the system or the method of use.

The method may also include electrically connecting each second portion to the corresponding fourth portion such that the respective flexure may constitute a return path for electrical current through the respective length of SMA wire.

The first flexure arrangement corresponds to the first crimp arrangement. The second flexure arrangement corresponds to the second crimp arrangement. The third flexure arrangement corresponds to the third crimp arrangement. The fourth flexure arrangement corresponds to the fourth crimp arrangement.

Each second portion may be formed as a single piece with the corresponding fourth portion. Alternatively, each second portion and the corresponding fourth portion may be separate pieces.

The method may also include connecting each second portion to the same side surface of the second part as the corresponding fourth portion. Alternatively, the method may include connecting each second portion to a different surface of the second part than the corresponding fourth portion, for example a lower surface.

Each first portion may be formed as a single piece with the corresponding third portion.

The first portion and the second portion corresponding to each of the first to fourth flexure arrangements may be connected by one or more first sprues during connection between the first and second parts. The method may also include severing the one or more first sprues to separate each first portion from the corresponding second portion. For example, each first portion and the respective second portion may be connected by to a first frame by the first sprues.

The third portion and the fourth portion corresponding to each of the first to fourth crimp arrangements may be connected by one or more second sprues during connection between the first and second parts. The method may also include severing the one or more second sprues to separate each third portion from the corresponding fourth portion. For example, each third portion and the respective fourth portion may be connected by to the first frame or to a second frame by the first sprues.

Each crimp arrangement and the corresponding flexure arrangement may be connected between the first part and second part such that the respective length of shape memory alloy wire is offset along the primary axis from the respective flexure.

Each flexure of the first to fourth flexure arrangements may have a first end connected to the first portion and a second end connected to the second portion. Each flexure may include a feature configured to increase a first compliance of that flexure to displacement of the respective second end towards the respective first end. The first compliance may be less than a second compliance of that flexure to displacement of the respective second end parallel to the primary axis.

According to a seventh aspect of the invention, there is provided a camera assembly comprising a first part and a second part tiltable with respect to the first part. The camera assembly also includes first to fourth flexure arrangements connecting the first part to the second part. Each flexure arrangement includes a first portion connected to the first part. Each flexure arrangement also includes a second portion supporting a first crimp. Each flexure arrangement also includes a third portion connected to the first portion by a flexure. The second portion is connected to the second part and supports a second crimp. Each flexure arrangement also includes a length of shape memory alloy wire connected between the first and second crimps. The camera assembly also includes a bearing arrangement. The bearing arrangement includes the flexures corresponding to the first to fourth flexure arrangements. The second part carries a module including an image senor and a lens system. The lengths of shape memory alloy wires corresponding to the first to fourth flexure arrangements are arranged, in response to drive signals, to cause tilting of the second part and the module with respect to the first part.

The lens system may also include a lens carriage. The lens system may also include a lens arrangement including at least one lens. The lens system may also include an auto-focussing system mechanically coupling the lens arrangement and the lens carriage to move the lens arrangement relative to the sensor.

The camera assembly may include features corresponding to any features of the actuator assembly, the system, the method of use or the method of fabricating an actuator assembly.

According to an eighth aspect of the present invention, there is provided an actuator assembly including a first part and a second part. The second part includes a central portion and first to fourth sides. The sides form a single piece with the central portion and are folded down (and/or extend down) from the central portion such that the first side is opposite to and substantially parallel with the third side and the second side is opposite to and substantially parallel with the fourth side. Each side includes a first portion connected to the first part and supporting a first crimp. Each side also includes a second portion connected to the first portion by a flexure, the second portion connected to the second part and supporting a second crimp. The first portion is connected to the central portion via the second portion and the flexure. Each side also includes a length of shape memory alloy wire connected between the first and second crimps. The actuator assembly also includes a bearing arrangement including the flexures corresponding to the first to fourth sides, and supporting the second part on the first part. The second part is tiltable about first and/or second axes which are not parallel and which are perpendicular to a primary axis passing through the actuator assembly. The actuator assembly also includes a drive arrangement including the lengths of shape memory alloy wire corresponding to the first to fourth sides. The bearing arrangement is configured to convert lateral force(s) normal to the primary axis generated by the drive arrangement into tilting of the second part about the first and/or second axes.

Thus, there is provided an alternative actuator assembly which can be used, for example, to provide module tilt OIS, and which can be conveniently manufactured.

Substantially parallel may correspond to an angle of less than 45 degrees or an angle of less than 20 degrees or an angle of less than 10 degrees or an angle of less than 5 degrees.

The flexures of the first to fourth sides may be elongate.

Each first crimp may be formed as a single piece with the corresponding first portion. Each second crimp may be formed as a single piece with the corresponding second portion. Each first crimp may be attached to the corresponding first portion, for example by welding. Each second crimp may be attached to the corresponding second portion, for example by welding. The first and second crimps may be made of a first material and the first and second portions may be made of a second, different material. The central portion may include a central aperture. The central portion may be square or rectangular.

The drive arrangement may consist of four lengths of shape memory alloy wires. The four lengths of shape memory alloy wires may directly connect or couple the second part to the first part via the respective third and second portions.

The four lengths of shape memory alloy wires may be configured, in response to applied input signals, to generate a first force parallel to the first axis, a second force parallel to the second axis and/or a torque around the normal.

Each of the four length of shape memory alloy wire corresponds to a section of shape memory alloy wire over which a drive current may be controlled independently. For example, a pair of lengths of shape memory alloy wire may be provided by a single physical wire having a first current source connected to one end, a second current source connected to the other end and a current return connection at a point between the two ends.

Each length of shape memory alloy wire may be arranged to apply a force to a part that has a component which is not parallel, e.g., substantially perpendicular, to the primary axis.

The normal may pass through a pivot point. The pivot point need not be a physical point, for example, a point on a surface of an object, but may be located in space. The pivot point may more, for example, in response to the first bearing arrangement moving and/or deforming.

The first and second axes may be perpendicular to the primary axis. The first axis may be perpendicular to the second axis.

The length of shape memory alloy wire corresponding to each of the first to fourth sides may be offset along the primary axis with respect to the corresponding flexure.

Each flexure of the first to fourth sides may have a first end connected to the first portion and a second end connected to the second portion, and each flexure may comprise a feature configured to increase a first compliance of that flexure to displacement of the respective second end towards the respective first end, wherein the first compliance is less than a second compliance of that flexure to displacement of the respective second end parallel to the primary axis.

The features do not simply correspond to increasing the length of the flexures. Rather, each feature corresponds to a change of direction and/or a change of cross-section of an elongate flexure at some point between the respective first and second ends The first and second compliances correspond to effective, overall or total compliances for relative displacements between the first and second ends, which take into account the geometry and materials of the corresponding flexure.

The first compliance may be less than or equal to 2% of the second compliance and greater than or equal to 0.02% of the second compliance.

The first compliance may be between 0.05% and 2% of the second compliance. The first compliance may be between 0.1% and 2% of the second compliance. The first compliance may be between 0.02% and 1% of the second compliance. The first compliance may be between 0.05% and 1% of the second compliance. The first compliance may be between 0.1% and 1% of the second compliance. The first compliance may be between 0.02% and 0.2% of the second compliance. The first compliance may be between 0.05% and 0.2% of the second compliance. The first compliance may be between 0.1% and 0.2% of the second compliance.

The first to fourth flexures corresponding to the first to fourth sides may be arranged about the primary axis. The first and third flexures may run in a first sense about the primary axis, and the second and fourth flexures may run in a second, opposite, sense about the primary axis.

The first to fourth flexures may be equi-angularly spaced about the primary axis. The first sense may be clockwise and the second sense anti-clockwise (counter-clockwise). A flexure which "runs" in a sense about the primary axis (e.g. clockwise) may correspond to that flexure being elongated such that a pair of lines drawn from the first and second ends of that flexure to the third axis z make an angle about the third axis z which has a sign (moving from the first end to the second end) which is either positive (e.g. a first sense) or negative (e.g. a second sense).

The feature of each flexure of the first to fourth sides may include at least one hairpin-shaped portion of that flexure. A hairpin shaped portion may be confined to a corresponding plane, optionally the plane may be parallel to the primary axis. The feature of each flexure of the first to fourth sides may include at least one portion of that flexure which meanders within an envelope. A feature may meander within a corresponding plane, optionally the plane may be parallel to the primary axis. The feature of each flexure of the first to fourth sides may include at least one curved portion of that flexure. A curved portion may lie within a corresponding plane, optionally the plane may be parallel to the primary axis. The plane may be parallel to the primary axis. The feature of each flexure of the first to fourth sides may include at least one elbow. An elbow may lie within a corresponding plane, optionally the plane may be parallel to the primary axis. The plane may be parallel to the primary axis. Each flexure of the first to fourth sides may be substantially L-shaped with a first straight portion. The first straight portion may be connected by an elbow to a second straight portion. The first straight portion may be longer than the second straight portion.

Each feature may take the form of a change in the cross-sectional shape and/or area of the corresponding flexure. For example, a feature may take the form of a notch or a constriction in the corresponding flexure.

The bearing arrangement may be configured to constrain rotation of the second part relative to the first part about the primary axis. Configured to constrain may mean to resist or even to prevent, or to discourage.

The bearing arrangement may be configured to allow rotation of the second part relative to the first part about the primary axis.

The bearing arrangement may be configured to constrain translation of the second part relative to the first part in directions perpendicular to the primary axis.

The bearing arrangement may comprise: a pivot bearing. The pivot bearing may include a base and a pivot upstanding from the base or the first part and having a distal end, wherein the distal end of the pivot is arranged to contact the second part. Conversely, the pivot may depend from the second part. The pivot may comprise silicone or another flexible material. The pivot may be surrounded, for example, by a coating or be embedded in a block, of flexible material such as silicone.

The bearing arrangement may include a thermally conductive link. For example, the flexible coating or block may help to conduct heat away from the second part.

The pivot may be conical. The pivot may be a cylindrical. The pivot may upstand from a centre of the base. The base may be flat. The base plate may be a plate. The base may be a frame. For example, the frame may include a web, for example, comprising an annular peripheral frame, a central pad and members linking the peripheral frame and a central pad. The base may be annular. For example, the pivot may comprise an annular base and a cone or a pyramid extending from the annular base (for instance, forming a cone or pyramid having a flange around its base).

The second part may be shaped so as to provide a seat for the distal end of the pivot. For example, the second part may include a blind hole (or "recess"), through hole or indent for seating the distal end of the pivot. The second part may include an annular projection defining a blind hole or indent. If the pivot depends from the second part, then the first part may be shaped so as to provide a seat for the distal end of the pivot.

Each of the four lengths of shape memory alloy wire may lie in a first plane parallel to a second plane defined by the first and second axes.

The first and second planes may be offset with respect to each other along the primary axis.

Using co-planar four shape memory wires can help reduce the height of the actuator assembly (or "lower the profile" of the actuator assembly). Offsetting the plane of the shape memory wires can allow force to be applied in a different plane to the first plane and thus allow the shape memory wires to cause tilting of the platform.

The four lengths of shape memory alloy wire may not be co-planar.

The four lengths of shape memory alloy wires may be configured, in response to applied input signals, to generate a first force parallel to the first axis, a second force parallel to the second axis and/or a torque around the normal.

The four shape memory wires may be inclined with respect to the first plane.

This can help achieve a higher stroke, but may result in less force.

Each of the each of the four lengths of shape memory wire may be interposed between the first and second parts.

The actuator assembly may comprise a stop to constrain movement of a lower end of each of second portions parallel and/or perpendicular to the primary axis.

The bearing arrangement may include one or more stops configured to constrain movement of the second part relative to the first part to within an allowed volume. Each feature of the first to fourth flexures may be configured so that the mechanical behaviour of the respective flexures remains elastic whilst the second part remains within the allowed volume.

For example, one or more stops (also termed "end-stops") may be positioned such that the second part will abut at least one stop after moving more than a maximum amount parallel to the first axis, the second axis and/or the primary axis. Additionally or alternatively, one or more stops may be positioned such that the second part will abut at least one stop after rotating more than a maximum angle about the first axis, the second axis and/or the primary axis. The volume within which the second part may move relative to the first part before abutting (coming into contact with) any of the stops may define the allowed volume.

At least one stop of the one or more stops may be configured to constrain movement of the second part relative to the first part along the primary axis.

Each first portion may be connected to the first part via a connection portion that forms a single piece with the first portion and with the central portion and is folded up from the first portion such that the connection portion is substantially parallel with the central portion.

The central portion and the first to fourth sides may be formed from a single thin web.

The central portion and the first to fourth sides may be formed by etching a single thin web. Etching may include chemical etching. Etching may include laser etching.

The actuator assembly may further comprise an image sensor and a lens system which are supported by the second part so as to tilt with the second part. The actuator assembly may further comprise: an image sensor supported by the first part; and a lens system supported by the second part so as to tilt with the second part.

The second part may be flat. The second part may be generally circular (i.e., a disc), elliptical (i.e., an elliptical disc or plate) or polygonal (i.e., a polygonal plate), for example, rectangular (i.e., a rectangular plate), in particular square (i.e., a square plate). The second part may be rigid or more rigid than the flexures.

A system may include the actuator assembly and a set of switching devices for applying drive signals to respective lengths of shape memory alloy wire. The system may also include a controller for individually controlling the switching devices.

A method may comprise using the actuator assembly or the system for optical image stabilisation and/or automatic focussing.

The method may include features corresponding to any features of the actuator assembly or the system.

According to a ninth aspect of the present invention, there is provided a method of fabricating an actuator assembly. The method includes providing a sheet including a central portion and first to fourth sides. The sides are integrally formed with the central portion. Each side includes a first portion and a second portion connected to the first portion by a flexure. The first portion is connected to the central portion via the second portion and the flexure. The method also includes forming a second part by folding the first to fourth sides down from the central portion such that the first side is opposite to and substantially parallel with the third side and the second side is opposite to and substantially parallel with the fourth side. The method also includes connecting the first portion of each of the first to fourth sides to a first part. The method also includes providing a first crimp supported on the first portion, a second crimp supported on the second portion and a length of shape memory alloy wire connected between the first and second crimps. This is such that a bearing arrangement includes the flexures corresponding to the first to fourth sides, and supports the second part on the first part. The second part is tiltable about first and/or second axes which are not parallel and which are perpendicular to a primary axis passing through the actuator assembly. It is also such that a drive arrangement includes the lengths of shape memory alloy wire corresponding to the first to fourth flexure arrangements. The bearing arrangement is configured to convert lateral force(s) normal to the primary axis generated by the drive arrangement into tilting of the second part about the first and/or second axes.

The method of fabricating an actuator assembly may include features corresponding to any features of the actuator assembly, the system or the method of use.

Each pair of first and second crimps may be formed as a single piece with the respective side.

Each first crimp may be formed by bending a section of the respective first portion. Each second crimp may be formed by bending a section of the respective second portion.

Each pair of first and second crimps may be attached to the respective side.

Each first crimp may be attached to the respective first portion, for example by welding. Each second crimp may be attached to the respective second portion, for example by welding. The first and second crimps may be made of a first material and the first and second portions may be made of a second, different material.

The corresponding length of shape memory alloy wire may be crimped between each pair of first and second crimps before the crimps are attached to the respective side.

Alternatively, the corresponding length of shape memory alloy wire may be crimped between each pair of first and second crimps after the crimps are attached to the respective side.

The length of shape memory alloy wire corresponding to each of the first to fourth sides may be offset along the primary axis with respect to the corresponding flexure.

Each flexure of the first to fourth sides may have a first end connected to the first portion and a second end connected to the second portion, and each flexure may comprise a feature configured to increase a first compliance of that flexure to displacement of the respective second end towards the respective first end, wherein the first compliance is less than a second compliance of that flexure to displacement of the respective second end parallel to the primary axis.

The first compliance may be less than or equal to 2% of the second compliance and great than or equal to 0.02% of the second compliance.

The first portion of each of the first to fourth sides may be connected to the first part such that each of the four lengths of shape memory alloy wire lies in a first plane parallel to a second plane defined by the first and second axes.

The first portion of each of the first to fourth sides may be connected to the first part such that the four lengths of shape memory alloy wire are not co-planar.

An image sensor and a lens system may be supported by the second part so as to tilt with the second part when the actuator assembly is fabricated. Or an image sensor may be supported by the first part and a lens system may be supported by the second part so as to tilt with the second part when the actuator assembly is fabricated.

The sheet may comprise first to fourth connection portions connected to respective first portions. Forming the second part may comprise folding the first to fourth connection portions up from the respective first portion such that the connection portions are substantially parallel with the central portion. Connecting the first portions to the first part may comprise securing the connection portions to the first part.

According to a tenth aspect of the invention, there is provided a camera assembly comprising a first part. The camera assembly also includes a second part including a central portion and first to fourth sides. The sides form a single piece with the central portion and are folded down (and/or extend down) from the central portion such that the first side is opposite to and substantially parallel with the third side and the second side is opposite to and substantially parallel with the fourth side. Each side includes a first portion connected to the first part and supporting a first crimp. Each side also includes a second portion connected to the first portion by a flexure. The second portion is connected to the second part and supports a second crimp. The first portion is connected to the central portion via the second portion and the flexure. Each side also includes a length of shape memory alloy wire connected between the first and second crimps. The camera assembly also includes a bearing arrangement which enables to second part to be tiltable relative to the first part. The bearing arrangement includes the flexures corresponding to the first to fourth sides. The second part carries a module including an image senor and a lens system. The lengths of shape memory alloy wires corresponding to the first to fourth sides are arranged, in response to drive signals, to cause tilting of the second part and the module with respect to the first part.

The lens system may also include a lens carriage. The lens system may also include a lens arrangement including at least one lens. The lens system may also include an auto-focussing system mechanically coupling the lens arrangement and the lens carriage to move the lens arrangement relative to the sensor.

The camera assembly may include features corresponding to any features of the actuator assembly, the system, the method of use or the method of fabricating an actuator assembly.

BRIEF DESCRIPTION OF THE DRAWINGS

Certain embodiments of the present invention will now be described, by way of example only, with reference to the accompanying drawings, in which:

FIG. 5A is a schematic plan view of a second type of drive arrangement which may be used in an SMA actuator assembly;

FIGS. 5B and 5C are schematic side and end views of the second type of drive arrangement shown in FIG. 5A;

DETAILED DESCRIPTION

Camera

Figure 1:
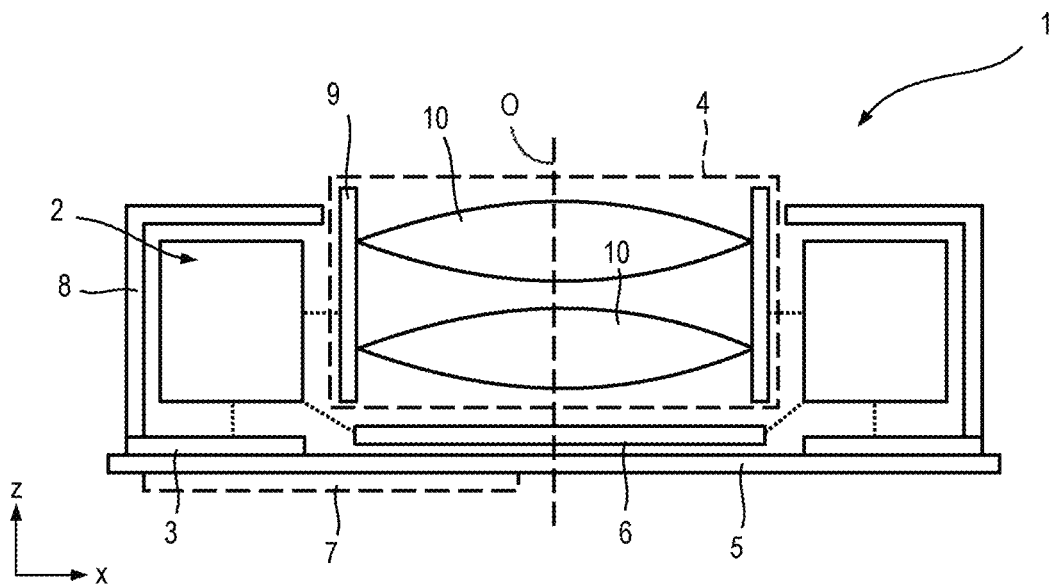
FIG. 1 is a schematic diagram of a camera incorporating a shape memory alloys (SMA) actuator assembly.

Referring to FIG. 1, a camera 1 incorporating an SMA actuator assembly 2 (herein also referred to as an "SMA actuator" or simply an "actuator") is shown.

The camera 1 includes first and second parts 3, 4.

The first part 3 of the camera takes the form of a support structure and includes a base 5. The second part 4 of the camera takes the form a lens assembly suspended on the first part 3 of the camera 1 by the SMA actuator assembly 2.

An image sensor 6 is disposed in front of a front side of the base 5, i.e., the image sensor 6 is interposed between the lens assembly 4 and the base 5.

The SMA actuator assembly 2 supports the lens assembly 4 and the image sensor 6 in a manner allowing one or more degrees-of-freedom of the lens assembly 4 relative to the support structure 3. The lens assembly 4 has an optical axis O (sometimes also referred to as a primary axis hereinafter).

The camera 1 includes an integrated circuit (IC) 7, which implements a control circuit, and also a gyroscope sensor (not shown). The support structure 3 also includes a can 8 which protrudes forwardly from the base 5 to encase and protect the other components of the camera 1.

The lens assembly 4 includes a lens carriage 9 in the form of a cylindrical body supporting two lenses 10 arranged along the optical axis O. In general, any number of one or more lenses 10 may be included. Preferably, each lens 10 has a diameter of up to about 20 mm. The camera 1 can therefore be referred to as a miniature camera.

The lens assembly 4 is arranged to focus an image onto the image sensor 6. The image sensor 6 captures the image and may be of any suitable type, for example, a charge-coupled device (CCD) or a complementary metal-oxide-semiconductor (CMOS) device.

The lenses 10 are supported on the lens carriage 9 and the lens carriage 9 is supported by the SMA actuator assembly 2 such that the lens assembly 4 is movable along the optical axis O relative to the support structure 3, for example to provide focussing or zoom. Although all the lenses 10 are fixed to the lens carriage 9 in this example, in general, one or more of the lenses 10 may be mounted to a component other than the lens carriage 9, and may be fixed in place relative to the image sensor 6, leaving at least one of the lenses 10 attached to the lens carriage and movable along the optical axis O relative to the image sensor 6.

In general, the lens assembly 4 may be moved orthogonally to the optical axis O in use, relative to the image sensor 6, with the effect that the image on the image sensor 6 is moved. For example, if a set of right-handed orthogonal axes x, y, z is aligned so that a third axis z is oriented substantially parallel to the optical axis O, then the lens assembly 4 may be moveable in a direction parallel to the first x axis and/or in a direction parallel to the second y axis. This is used to provide optical image stabilization (OIS), compensating for movement of the camera 1, which may be caused by hand shake etc. The movement providing OIS need not be constrained to the x-y plane. Additionally or alternatively, OIS functionality may be provided by tilting the lens assembly 4, or both the lens assembly 4 and the image sensor 6 (i.e. the entire camera module), about an axis parallel to the first axis x and/or about an axis parallel to the second y axis. Additionally, the lens assembly 4, or at least one lens 10 thereof, may be moved parallel to the optical axis O (parallel to the third axis z) to provide focussing of an image formed on the image sensor 6, for example as part of an automatic focussing (AF) function.

This specification is concerned with examples of SMA actuator assemblies 2 which provide optical image stabilisation (OIS) based on tilting the lens assembly 4 and the image sensor 6 together relative to the support structure 3 (also referred to as "module tilt" OIS). This specification is also concerned with examples of SMA actuator assemblies 2 which provide optical image stabilisation (OIS) that is based on tilting the lens assembly 4 relative to the support structure 3 whilst the image sensor 6 remains static relative to the support structure 3 (also referred to as "lens tilt" OIS). Automatic focussing (AF) may be provided by an additional system which may or may not use SMA wires.

Degrees of Freedom

Figure 2:
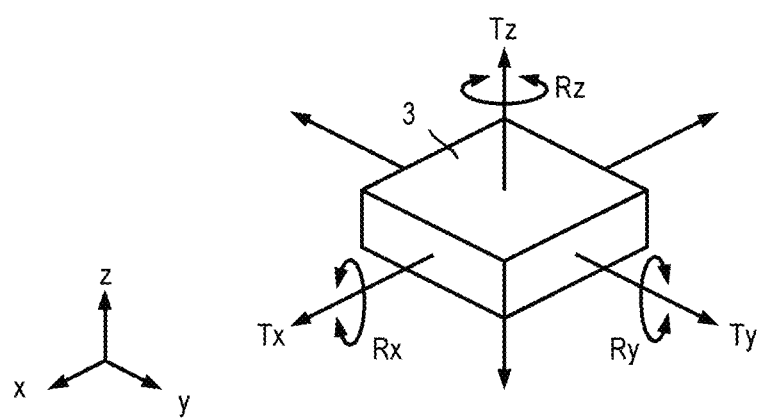
FIG. 2 schematically illustrates possible degrees of freedom which may be provided by an SMA actuator assembly.

Referring also to FIG. 2, possible types of movement (or degrees of freedom) which may be provided by an SMA actuator assembly 2 are illustrated. A first degree-of-freedom (DOF) Tx corresponds to movement parallel to the first axis x. A second DOF Ty corresponds to movement parallel to the second axis y. A third DOF Tz corresponds to movement parallel to the third axis z, which is oriented substantially parallel to the optical axis O. The third DOF Tz corresponds to movement of the lens assembly 3 towards or away from the image sensor 6. The first, second and third axes x, y, z form a right-handed Cartesian coordinate system. A fourth DOF Rx corresponds to rotation about an axis parallel to the first axis x. A fifth DOF Ry corresponds to rotation about an axis parallel to the second axis y. A sixth DOF Rz corresponds to rotation about an axis parallel to the third axis z. In some examples, one or more of the axes may be attached to (and move and/or rotate/tilt with) a first part, a second part, or any other elements of an SMA actuator assembly 2 or camera 1. For example, an origin may be an element of the camera 1 such as the image sensor 6 or a lens 10 of the lens assembly 4.

Motions of the lens assembly 4 (first part) relative to the support structure 3 (second part) may be broken down into components of any or all of the first to sixth DOF (movements) Tx, Ty, Tz, Rx, Ry, Rz. Although described as degrees-of-freedom, in some cases translations and rotations may be linked. For example, a given translation Tz along the third axis z may be tied to a corresponding rotation Rz so that motion of the lens assembly 4 is helical. Such linked motions may be referred to using a pair enclosed in square brackets to avoid confusion with more independent motions, for example [Tz, Rz] will denote a helical motion described hereinafter.

This specification concerns SMA actuator assemblies which primarily aim to provide the motions corresponding to the fourth and fifth DOF Rx, Ry to tilt one or more lenses 10 of a lens assembly (lens tilt OIS), or to tilt both the lens(es) 10 and the image sensor 6 (module tilt OIS). The fourth and fifth DOF Rx, Ry provide the OIS functionality herein. Other motions may be constrained (i.e. reduced or even prevented, or at least rendered into much smaller motions that the desired rotations/tilts by the SMA actuator assemblies 2 as described herein.

Shape-Memory Alloy Drive Assemblies

Figure 3:
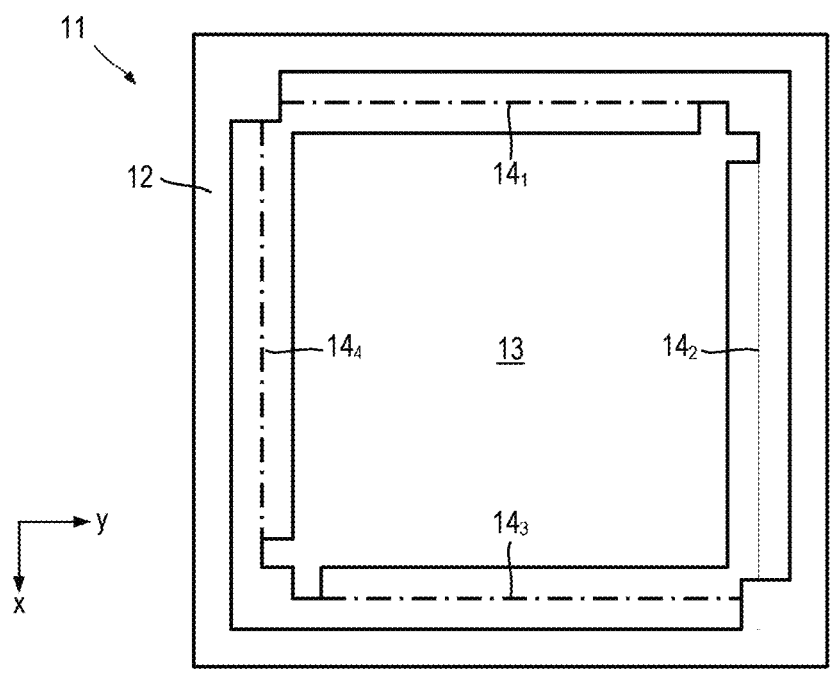
FIG. 3 is a schematic plan view of a first type of drive arrangement which may be used in an SMA actuator assembly.

Referring also to FIG. 3, a first type of drive arrangement 11 which may be included in SMA actuator assemblies herein described is shown schematically.

The first drive arrangement 11 includes a first structure 12 and a second structure 13. The second structure 13 is generally supported within a boundary defined by the first structure 12, for example using one or more bearings as described hereinafter. The second structure 12 generally need not provide a complete or uninterrupted boundary. The first and second structures 12, 13 may take the form of respective patterned sheets of metal, e.g., etched or machined stainless steel, and may be coated with an electrically-insulating dielectric material.

Four SMA wires $14_1$, $14_2$, $14_3$, $14_4$ (shown in chain to aid visibility) form a loop around the second structure 13. First $14_1$ and third $14_3$ SMA wires extend substantially parallel to the first axis x and are spaced apart in a direction parallel to the second axis y. Contraction of the first SMA wire $14_1$ will exert a force on the second structure 13 in the negative $-x$ direction, whereas contraction of the third SMA wire $14_3$ will exert a force on the second structure 13 in the positive $+x$ direction. Second $14_2$ and fourth $14_4$ SMA wires extend substantially parallel to the second axis y and are spaced apart in a direction parallel to the first axis x. Contraction of the second SMA wire $14_2$ will exert a force on the second structure 13 in the negative $-y$ direction, whereas contraction of the fourth SMA wire $14_4$ will exert a force on the second structure 13 in the positive $+y$ direction.

Other examples configurations may be used, and further details are provided in WO 2017/055788 A1 and WO 2019/086855 A1, which are both incorporated herein in their entirety by this reference.

The position of the second structure 13 relative to the first structure 12 perpendicular to the optical axis O is controlled by selectively varying the temperatures of the SMA wires $14_1$, $14_2$, $14_3$, $14_4$. This is achieved by passing selective drive signals through the SMA wires $14_1$, $14_2$, $14_3$, $14_4$ that provide resistive heating. Heating is provided directly by the drive current. Cooling is provided by reducing or ceasing the drive current to allow the SMA wires $14_1$, $14_2$, $14_3$, $14_4$ to cool by conduction, convection and radiation to its surroundings.

In operation, the SMA wires $14_1$, $14_2$, $14_3$, $14_4$ are selectively driven to move the second structure 13 relative to the first structure 12 (or vice versa) in any lateral direction (i.e., a direction within a plane parallel to first and second axes x, y and perpendicular to the optical axis O and third axis z).

Further details are also provided in WO 2013/175197 A1, which is incorporated herein by this reference.

Taking the example of the set of four SMA wires $14_1$, $14_2$, $14_3$, $14_4$, the SMA wires $14_1$, $14_2$, $14_3$, $14_4$ have an arrangement in a loop at different angular positions around the optical axis O (corresponding here to the third axis z) to provide two pairs of opposed SMA wires $14_1$ & $14_3$, $14_2$ & $14_4$ that are substantially perpendicular to each other. Thus, each pair of opposed SMA wires $14_1$ & $14_3$, $14_2$ & $14_4$ is capable on selective driving of moving the second structure 13 in one of two perpendicular directions orthogonal to the optical axis O. As a result, the SMA wires $14_1$, $14_2$, $14_3$, $14_4$ are capable of being selectively driven to move the second structure 13 relative to the first structure 12 to any position in a range of movement in a plane orthogonal to the optical axis O. Another way to view this movement is that contraction of any pair of adjacent SMA wires (e.g. SMA wires $14_3$, $14_4$) will move the second structure 13 in a direction bisecting the pair of SMA actuator wires (diagonally in FIG. 3). The magnitude of the range of movement depends on the geometry and the range of contraction of the SMA wires $14_1$, $14_2$, $14_3$, $14_4$ within their normal operating parameters.

On heating of one of the SMA wires $14_1$, $14_2$, $14_3$, $14_4$, the stress in the SMA wire $14_1$, $14_2$, $14_3$, $14_4$ increases and it contracts, causing movement of the second structure 13 relative to the first structure 12. A range of movement occurs as the temperature of the SMA increases over a range of temperature in which there occurs the transition of the SMA material from the Martensitic phase to the Austenitic phase. Conversely, on cooling of one of the SMA wires $14_1$, $14_2$, $14_3$, $14_4$ so that the stress in the SMA wire $14_1$, $14_2$, $14_3$, $14_4$ decreases, it expands under the force from opposing ones of the SMA wires $14_1$, $14_2$, $14_3$, $14_4$ (and in some examples also biasing forces from one or more biasing means such as springs, armatures and so forth). This allows the second structure 13 to move in the opposite direction relative to the first structure 12.

The SMA wires $14_1$, $14_2$, $14_3$, $14_4$ may be made of any suitable SMA material, for example Nitinol or another titanium-alloy SMA material.

The drive signals for the SMA wires $14_1$, $14_2$, $14_3$, $14_4$ are generated and supplied by the control circuit implemented in the IC 7. For example, if the first structure 12 is fixed to (or part of) the support structure 3 and the second structure 13 is fixed to (or part or) the lens assembly 4, then the drive signals are generated by the control circuit in response to output signals of the gyroscope sensor (not shown) so as to drive movement of the lens assembly 4 to stabilise an image focused by the lens assembly 4 on the image sensor 6, thereby providing OIS. The drive signals may be generated using a resistance feedback control technique, for example as described in WO 2014/076463 A1, which is incorporated herein by this reference.

Figure 4:
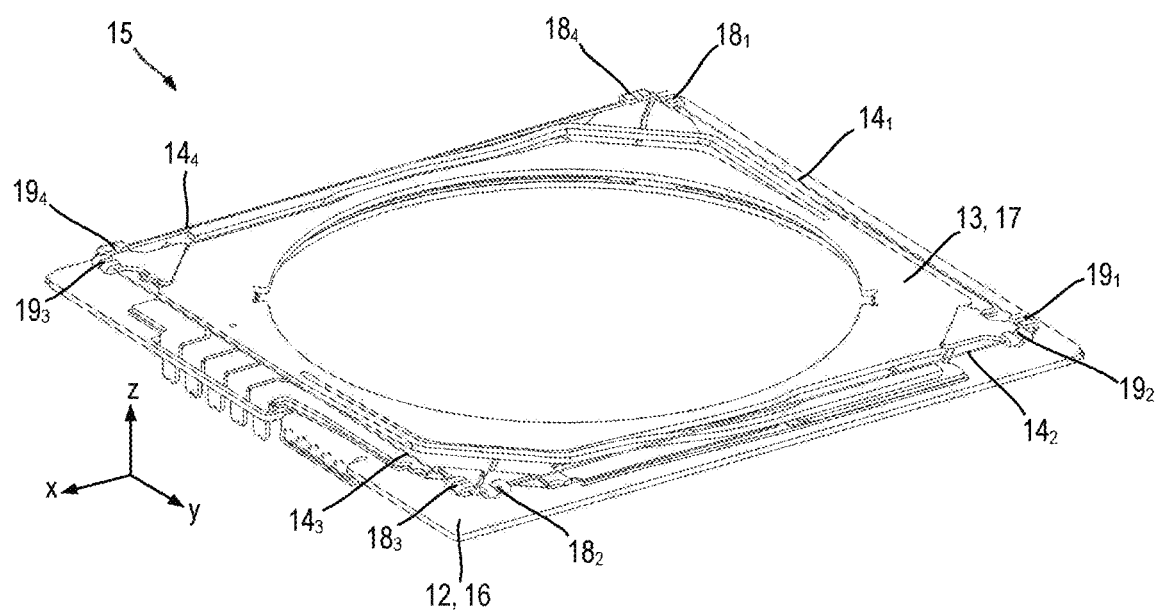
FIG. 4 is a perspective view of a flat SMA actuator assembly employing the first type of drive arrangement shown in FIG. 3.

Referring also to FIG. 4, an example of a "flat" SMA actuator assembly 15 implementing the first drive arrangement 11 is shown.

In the flat actuator assembly 15, the first structure 12 takes the form of a flat, annular plate 16 having a rectangular outer perimeter (or "outer edge") and a circular inner perimeter (or "inner edge"), whilst the second structure 13 takes the form of a flat, thin annular sheet 17 with a rectangular outer perimeter and a circular inner perimeter. The first structure 12 in the form of the plate 16 is supported on a base 5 in the form of a rectangular plate. The four SMA wires $14_1$, $14_2$, $14_3$, $14_4$ are each attached at one end to respective first crimps $18_1$, $18_2$, $18_3$, $18_4$ (also referred to as "static" crimps) which are fixedly attached to (or formed as part of) the first structure 12, 16. The other end of each SMA wire $14_1$, $14_2$, $14_3$, $14_4$ is attached to a respective second crimp $19_1$, $19_2$, $19_3$, $19_4$ (also referred to as a "moving" crimp) which is fixedly attached to (or formed as part of) the second structure 13, 17.

The plate 16 and the sheet 17 may each take the form of respective patterned sheets of metal, e.g., etched or machined stainless steel, and may be coated with an electrically-insulating dielectric material. The plate 16 and the sheet 17 are each provided with a respective central aperture aligned with the optical axis (or primary axis) O allowing the passage of light from a lens assembly 4 mounted to the sheet 17 to an image sensor 6 supported on the base 5 (not shown in FIG. 4—see FIG. 1).

The four SMA wires $14_1$, $14_2$, $14_3$, $14_4$ may be perpendicular to the optical axis O or inclined at a small angle to a plane perpendicular to the optical axis O. Generally, in a set, the four SMA wires $14_1$, $14_2$, $14_3$, $14_4$ are non-collinear.

The flat actuator assembly 15 includes a number of plain bearings (not shown in FIG. 4) spaced around the optical axis O to bear the second structure 13, 17 on the first structure 12, 16. Preferably, at least three bearings are used in order to assist in providing stable support, although in general, a different number of bearings may be used. Each plain bearing (not shown in FIG. 4) may take the form of a bearing member in the form of cylinder, and may be attached to, or formed as part of, the first structure 12. The plain bearings (not shown in FIG. 4) may be made from a suitable metal or alloy such as phosphor bronze or stainless steel with a diamond-like carbon coating. The plain bearings (not shown in FIG. 4) may be made from, or may include an upper layer coating of, a polymer, such as Polyoxymethylene (POM, Acetal), Polytetrafluoroethylene (PTFE) or PTFE-impregnated POM.

The flat actuator assembly 15 will generally also include biasing means (not shown) such as one or more springs or flexure arms arranged and configured to maintain the first and second structures 12, 13 in contact (via the plain bearings) and/or to urge the first and second structures 12, 13 towards a neutral (for example central) relative position when the SMA wires $14_1$, $14_2$, $14_3$, $14_4$ are not powered.

Details relevant to manufacturing actuator assemblies similar to the flat actuator assembly 15 can be found in WO 2016/189314 A1 which is incorporated herein in its entirety this reference.

Although not shown in FIG. 4, the flat actuator assembly 15 may be provided with end stops to provide limits on lateral movement of the second structure 13 relative to the first structure 12. In this way, the SMA wires $14_1$, $14_2$, $14_3$, $14_4$ can be protected from overextension resulting from, for example, impacts to which a device (not shown) incorporating the flat actuator assembly 15 may be subjected (for example being dropped).

The first drive arrangement 11 can drive translations Tx, Ty along first and/or second axes x, y and rotations Rz about an axis parallel to the third axis z (which is substantially parallel to the optical axis O). However, in order to provide translation Tz parallel to the third axis z, the first drive arrangement 11 must be combined with at least one bearing capable of converting a torque applied about the optical axis O into a combination of rotation Rz and translation Tz (a helical movement).

Referring also to FIGS. 5A to 5C, a second type of drive arrangement 20 which may be included in SMA actuator assemblies herein described is shown schematically.

The second drive arrangement 20 is similar to the first drive arrangement 11 except that the first structure 12 includes a base 21 and a pair of first and second upstanding pillars $22_1$, $22_2$, and that the SMA wires $14_1$, $14_2$, $14_3$, $14_4$ are not substantially confined to a plane perpendicular to the third axis z.

FIG. 5A shows the second drive arrangement 20 viewed from above, along a direction parallel to the third axis z.

FIG. 5B shows the second drive arrangement 20 viewed from the side, along a direction parallel to the first axis x.

Note that the fourth SMA wire $14_4$ has been superimposed on FIG. 5B for visual purposes, even though the fourth SMA wire $14_4$ would be largely obscured behind the second structure 13.

FIG. 5C shows the second drive arrangement 20 viewed from the side, along a direction parallel to the second axis y. Note that the first SMA wire $14_1$ has been superimposed on FIG. 5B for visual purposes, even though the first SMA wire $14_1$ would be largely obscured behind the second structure 13.

The base 21 extends beyond the edges of the second structure 13 when viewed along the third axis (FIG. 5A), and in this example is rectangular (or square). The first pillar $22_1$ is upstanding from a first corner of the base 21, and the second pillar $22_2$ is upstanding from a second corner, diagonally opposite across the second structure 13.

The first SMA wire $14_1$ connects from a lower portion (lower along the z axis) of the second structure 13 to an upper portion (higher along the z axis) of the first pillar $22_1$. The second SMA wire $14_2$ connects from an upper portion of the second structure 13 to a lower portion of the second pillar $22_2$. The third SMA wire $14_3$ connects from a lower portion of the second structure 13 to an upper portion of the second pillar $22_2$. The fourth SMA wire $14_2$ connects from an upper portion of the second structure 13 to a lower portion of the first pillar $22_1$.

In this way, the first SMA wire $14_1$ opposes the third SMA wire $14_3$ in a direction parallel to the first axis x, the second SMA wire $14_2$ opposes the fourth SMA wire $14_4$ in a direction parallel to the second axis y, and the first and third SMA wires $14_1$, $14_3$ oppose the second and fourth SMA wires $14_2$, $14_4$ in a direction parallel to the third axis z.

In this way, the second drive arrangement 20, using four angled (non-coplanar) SMA wires $14_1$, $14_2$, $14_3$, $14_4$, may provide drive corresponding to Tx, Ty, Tz, Rx, Ry, Rz motions. The motions are not fully independent degrees of freedom, and in general translations will be linked to rotations, for example [Tx, Rx], [Ty, Ry] and [Tz, Rz], with the specific couplings depending on the angles of the SMA wires $14_1$, $14_2$, $14_3$, $14_4$.

Either or both of the first structure 12, 21 and the second structure 13 may include central apertures to permit light from a lens assembly 4 to form an image on an image sensor 6.

One of more of the motions driven by the first or second drive arrangements 11, 20 may be fully or partly constrained by coupling one or more bearings between the first and second structures 12, 13.

Bearings

In general, an SMA actuator according to this specification will include at least one of the first and second drive arrangements 11, 20 and also an arrangement of one or more mechanical bearings (also referred to as a "bearing arrangement") serving to support, constrain and/or convert the movements generated by the first or second drive arrangement 11, 20.

—Two-Bar Link Bearing—

Figure 6:
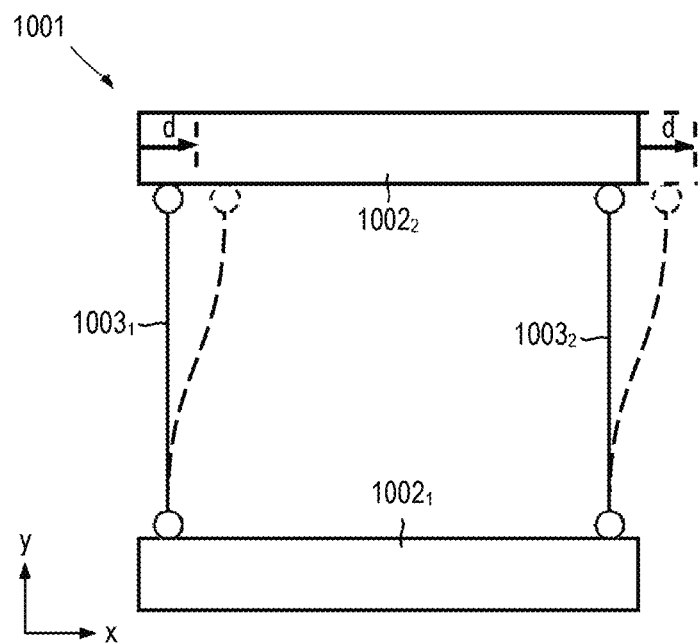
FIG. 6 is a schematic side view of a two-bar link bearing.

Referring also to FIG. 6, a two-bar link bearing 1001 is shown.

The two-bar link bearing 1001 includes first and second rigid portions $1002_1$, $1002_2$ connected by first and second beam portions $1003_1$, $1003_2$ (also referred to as flexures). The rigid portions $1002_1$, $1002_2$ are each elongated in a direction parallel to the first axis x, and are spaced apart from one another in a direction parallel to the second axis y. The beam portions $1003_1$, $1003_2$ are each elongated in a direction parallel to the second axis y, and are spaced apart from one another in a direction parallel to the first axis x. The beam portions $1003_1$, $1003_2$ are shown as being perpendicular to the rigid portions $1002_1$, $1002_2$, however this is not essential and any angle will work provided that the beam portions $1003_1$, $1003_2$ are generally parallel to one another. The beam portions $1003_1$, $1003_2$ are unable to rotate about the joints with the rigid portions $1002_1$, $1002_2$, for example the connections are not pin-jointed or similar.

The relative flexural rigidities of the beam portions $1003_1$, $1003_2$ and the rigid portions $1002_1$, $1002_2$ are selected (primarily using the dimensions and shapes of cross-sections) so that if the first rigid portion $1002_1$ is clamped, the second rigid portion $1002_2$ may move relative to the first rigid portion $1002_1$ via bending of the beam portions $1003_1$, $1003_2$ in the x-y and/or x-z planes. In this way, the two-bar link 1001 is able to provide for relative movements Tx, Tz, Rx and/or Ry for relative motion between the first and second rigid portions $1002_1$, $1002_2$. A deformed state in which the second rigid portion $1002_2$ is displaced by a distance d parallel to the first axis is also shown in FIG. 6 using dashed lines. The two-bar link bearing 1001 may be rotated 90 degrees to provide movement Ty parallel to the second axis y instead of Tx.

The relative resistance to bending in x-y versus y-z planes may be controlled by using the cross-sectional shape of the beam portions $1003_1$, $1003_2$ to select relative flexural rigidities in order to control the overall (or effective) compliance of the two-bar link to forces acting to generate the relative movements Tx, Tz, Rx and/or Ry.

A beam portion $1003_1$, $1003_2$ deforms via bending when a force applies a moment about the longitudinal axis of that beam portion $1003_1$, $1003_2$. In contrast, loading in pure tension or compression (force along the longitudinal axis) tends to generate significantly smaller relative displacements of the beam ends. One way to describe this is that an elongate beam portion $1003_1$, $1003_2$ has relatively greater compliance to bending than it does to tension or compression.

Figure 7A:
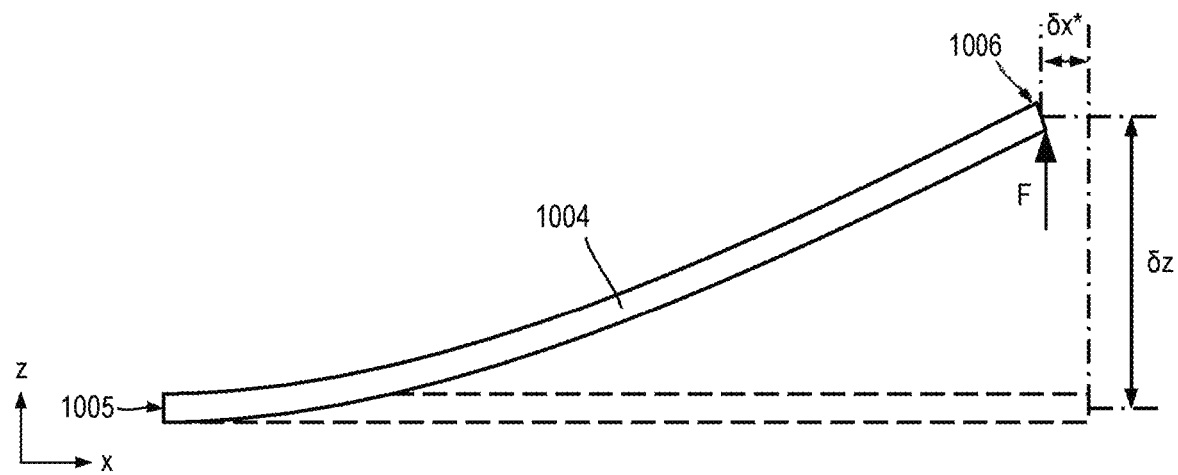
FIG. 7A schematically illustrates a flexure deflected in response to a transverse force.

For example, referring also to FIG. 7A, a beam portion, or flexure, 1004 deforming by bending is shown.

The flexure 1004 has first and second ends 1005, 1006. In an un-deformed (unstrained) state, the flexure 1004 is elongated parallel to the first axis x between the first and second ends 1005, 1006. The flexure 1004 is elongate and substantially straight such that a length L between the first and second ends 1005, 1006 is significantly greater (e.g. 5 or 10 times greater, or more) than the largest distance of any part of the flexure 1004 from a direct line drawn between the first and second ends 1005, 1006.

FIG. 7A illustrates a configuration in which the first end 1005 is clamped and unable to translate or rotate. Translation and/or rotation of the second end 1006 is not externally constrained, and a force of magnitude F is applied to the second end 1006 in a direction parallel to the third axis z, i.e. perpendicular to the longitudinal axis (x) of the unstrained flexure 1004. In this situation, Euler-Bernoulli beam bending tells us that the deflection δz in the direction of the force F may be approximated as:

$$\delta z = \frac{FL^3}{3EI} \quad (1)$$

In which L is the length of the flexure 1004, E is the Young modulus and I is the area moment of inertia. For example, if the flexure 1004 has a width A parallel to the second axis y (into the page as illustrated) and a width B parallel to the third axis z, the second moment of inertia would be:

$$I = \frac{AB^3}{12} \quad (2)$$

Such that the deflection of the flexure 1004 with rectangular cross-section is:

$$\delta z = \frac{4FL^3}{EAB^3} \quad (3)$$

Figure 7B:
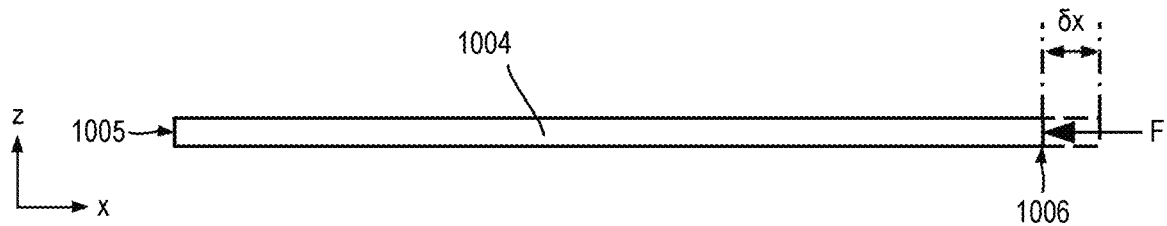
FIG. 7B schematically illustrates a flexure compressed in response to a longitudinal force.

Referring also to FIG. 7B, the same flexure 1004 is shown loaded along its longitudinal axis (F parallel to x), in which case the displacement of the second end 1006 will be (from basic stress-strain relationships and the rectangular geometry):

$$\delta x = \frac{FL}{EAB} \quad (4)$$

Taking the ratio of the displacements δz and δx:

$$\frac{\delta z}{\delta x} = \frac{4L^2}{B^2} \quad (5)$$

the ratio is proportional to the square of the relevant aspect ratio L/B. This serves to illustrate that the deflection δz of the flexure 1005 to a force applying a bending moment is significantly larger than the deflection δx which would result from the same force when acting axially (relative to the flexure 1004).

Referring again to FIG. 7A, it should be noted that the deflection of the second end 1006 does not result in a pure displacement δz parallel to the third axis z. The curvature of the flexure 1004 also results in a displacement δx* of the second end 1006 towards the first end 1005. This displacement δx*, which in an actuator is often unwanted, is a by-product of using bending of flexures such as flexure 1004, and may cause unwanted translation and/or rotations of an actuated part. However, the displacement δx* cannot be completely suppressed, since this would require extending the flexure 1004 along its axis (i.e. in tension), requiring a very large increase in force (see Equation 5).

As will explained in more detail below, similar considerations apply in relation to the four flexures forming part of a simple flexure (e.g. the first or second simple flexure 1008, 1013 in FIGS. 8A and 9) whose central portion is undergoing translational and/or rotational movement Tz, Rx and/or Ry. Such rotational movement Rx, Ry involves displacement of an end of each of the four flexures on the surface of a sphere, which displacement can be approximated as a displacement parallel to the third axis z. In particular, such movement Tz, Rx and/or Ry tends to involve an 'unwanted' displacement of the moving end of each flexure (and hence the central portion of the simple flexure) and/or an 'unwanted' force.

One aspect of the present specification (see for example FIGS. 10 to 17) concerns modifying the geometry of flexures such as flexure 1004 so as to adjust the ratio of mechanical compliance (inverse of stiffness) for the responses of a flexure 1004 to forces applied parallel and perpendicular to a line between the first and second ends 1005, 1006. In doing so, it may be possible to improve the balance between constraint of unwanted flexure deflections without excessively increasing the forces needed to obtain desired flexure deflections.

—Simple Flexure—

Figure 8A:
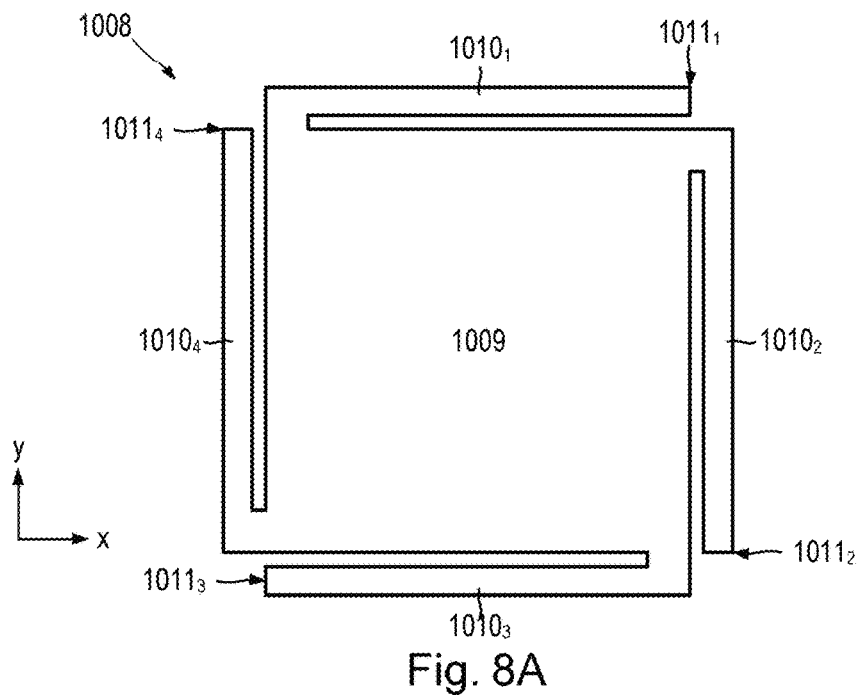
FIG. 8A is a schematic plan view of a first two-by-two parallel bar link bearing (or "simple flexure")

Referring also to FIG. 8A, a tiltable z-flexure in the form of a two-by-two parallel bar link bearing 1008 (also referred to as a simple flexure) is shown.

Figure 10:
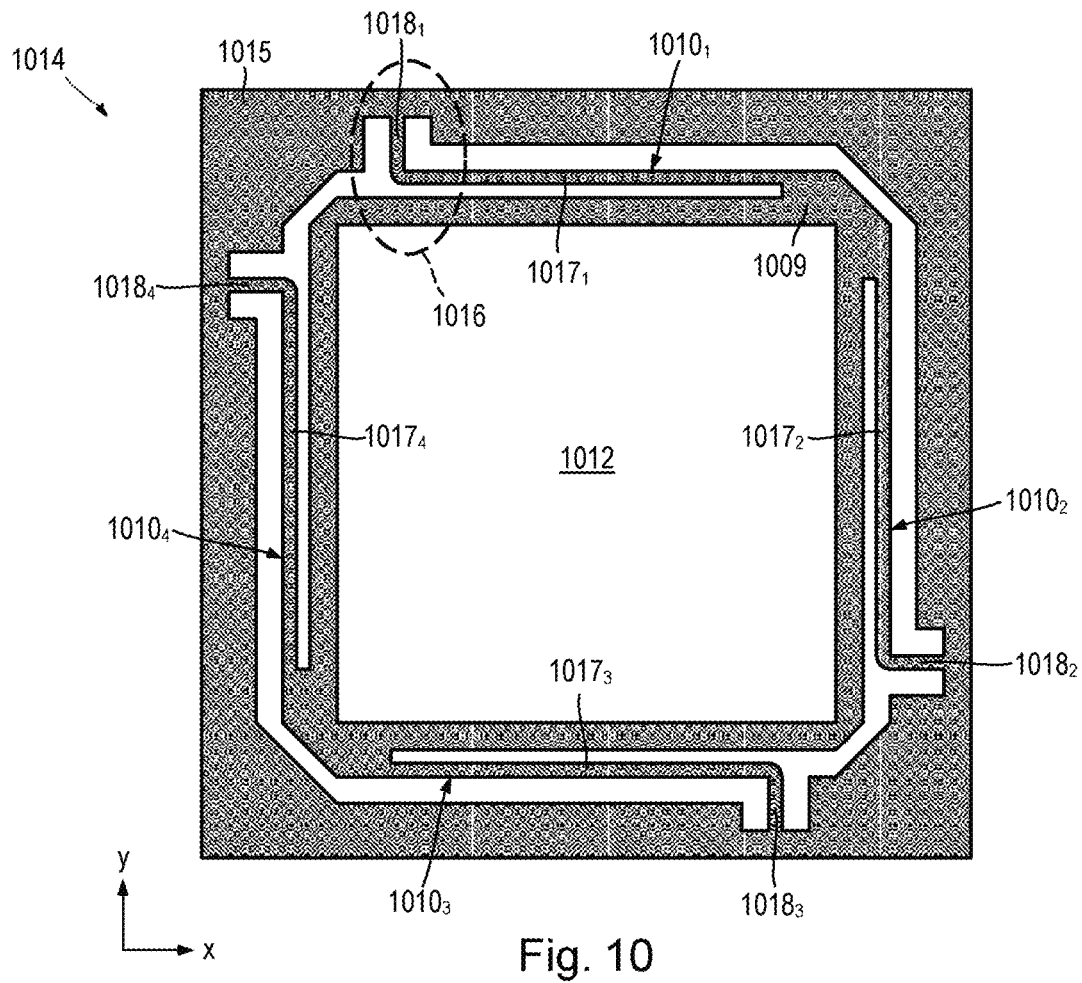
FIG. 10 is a schematic plan view of a third simple flexure.

The simple flexure 1008 includes a central portion 1009 and two pairs of flexures (or beam portions) $1010_1$, $1010_2$, $1010_3$, $1010_4$. Each flexure $1010_1$, $1010_2$, $1010_3$, $1010_4$ is rigidly connected to the central portion 1009 at one end, and has a second, free end $1011_1$, $1011_2$, $1011_3$, $1011_4$. In some examples the central portion 1009 may also have a central aperture 1012 (FIG. 10). The first and third flexures) $1010_1$, $1010_3$ are elongated in a direction parallel to the first axis x, and are able to deform, for example, by beam bending in the x-z plane. Similarly, the second and fourth beam portions (flexures) $1010_2$, $1010_4$ are elongated in a direction parallel to the second axis y, and are able to deform, for example, by beam bending in the y-z plane. Deflection of the flexures $1010_1$, $1010_2$, $1010_3$, $1010_4$ laterally (perpendicular to the third axis z) is constrained by the connection of all the beam portions (or flexures) $1010_1$, $1010_2$, $1010_3$, $1010_4$ to the central portion 1009 and/or by the cross-sectional shapes of the flexures $1010_1$, $1010_2$, $1010_3$, $1010_4$. In particular, as explained hereinbefore, translation perpendicular to the third axis z would require axial extension of at least one flexure 1010 and axial compression of at least one other flexure 1010.

In this way, if the free ends 1011 are clamped, the simple flexure 1008 is able to provide for relative movements Tz, Rx and/or Ry between the central portion 1009 and the clamped free ends 1011.

The simple flexure 1008 illustrated in FIG. 8A resists motions Tx, Ty in the first x and second y directions. This flexure design tends to rotate Rz the moving portion (central portion 1009) about the third axis z as the moving portion (central portion 1009) is tilted Rx, Ry about the first x and/or second y axis.

However, complete suppression of the motions Rz, Tx and Ty is not possible because of unwanted displacements associated with curvature of the flexures 1010, for example δx* discussed hereinbefore.

Figure 8B:
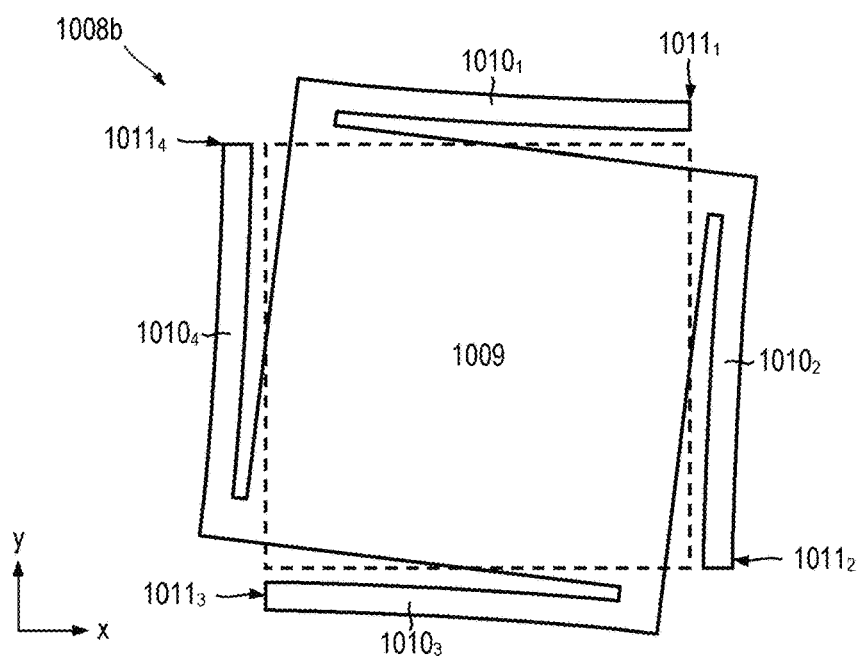
FIG. 8B is a schematic plan view of the simple flexure of FIG. 8A in a deformed state.
Figure 8C:
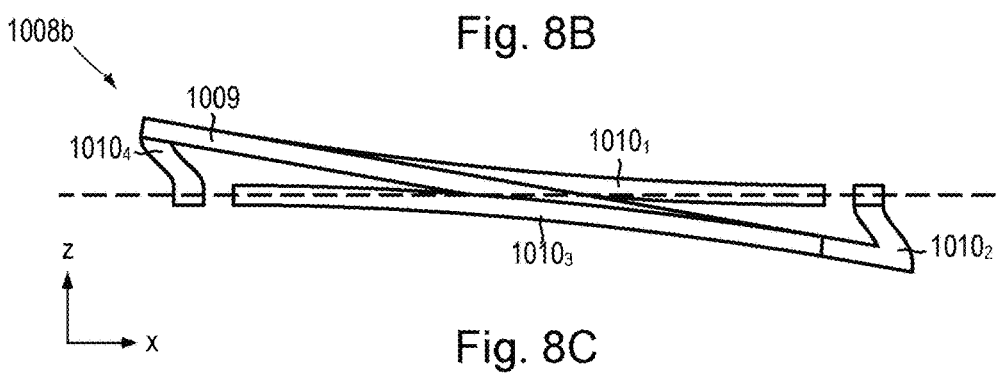
FIG. 8C is a schematic side view of the simple flexure of FIG. 8A in the deformed state of FIG. 8B.

For example, referring also to FIGS. 8B and 8C, a deformed state 1008b of the simple flexure of FIG. 8A is shown in which the central portion 1009 is tilted Ry by an angle about the second axis y.

The tilting of the central portion 1009 is accommodated by curvature of the flexures 1010, in particular the first and fourth flexures $1010_1$, $1010_4$ curve upwards (relative to the third axis z) whilst the second and third flexures $1010_2$, $1010_3$ curve downwards (relative to the third axis z). However, as discussed hereinbefore, such curvatures are inherently associated with a small displacement towards the respective clamped ends 1011. Since the flexures 1010 of the simple flexure 1008 all run in the same sense (clockwise as illustrated in FIGS. 8A to 8C), these unwanted displacements have the net effect of generating a small rotation Rz of the central portion 1009 about the third axis z. This is shown to an exaggerated degree in FIGS. 8B and 8C for visual purposes.

Although the specific tilt configuration shown in FIGS. 8B and 8C results in a small unwanted rotation Rz about the third axis z, other tilt configurations may result in combinations of unwanted rotations Rz, unwanted translations Tx and/or unwanted translations Ty.

—Second Simple Flexure—

In the flexure design (simple flexure 1008) shown in FIG. 8A, all the flexure arms (flexures 1010) extended clockwise (or anticlockwise) around the third axis z when moving from the static portion (clamped free ends 1011) to the moving portion (central portion 1009). This chirality to the design means that when tilted Rx, Ry about the first axis x and/or the second axis y, the moving portion (central portion 1009) tends to rotate Rz about the third axis z. To reduce this effect, a flexure design is proposed in which half the flexures 1010 extend clockwise and half anticlockwise (or vice versa) when moving from the moving portion (central portion 1009) to the static portion (e.g. clamped free ends 1011).

Figure 9:
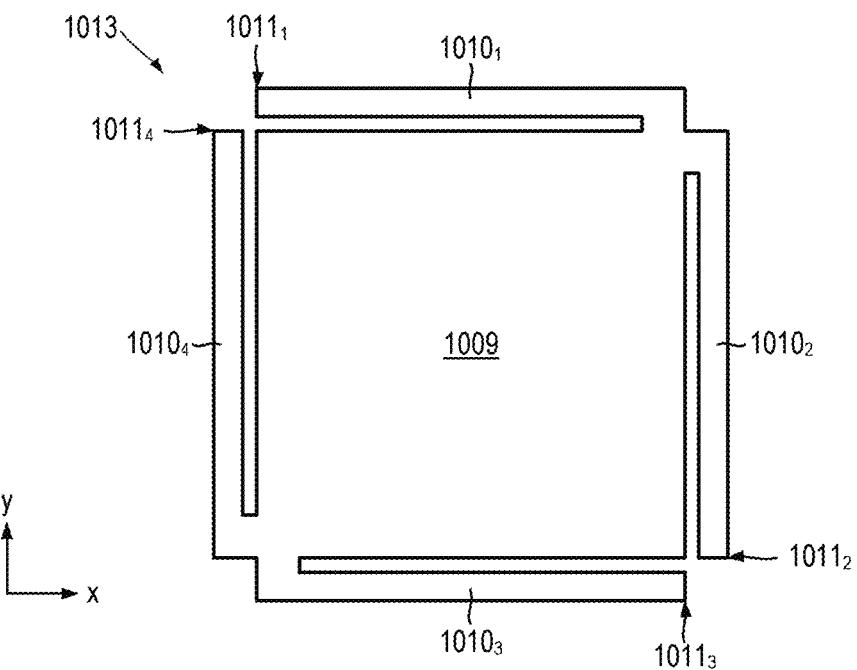
FIG. 9 is a schematic plan view of a second simple flexure.

Referring also to FIG. 9, a second simple flexure 1013 is shown.

The second simple flexure 1013 is configured to resist unwanted rotations Rz about the third axis z whilst still permitting the desired movements Tz, Rx, Ry.

In order to resist rotation Rz about the third axis z during bending of the flexures 1010, the first and third flexures $1010_1$, $1010_3$ run anti-clockwise (counterclockwise) whilst the second and fourth flexures $1010_2$, $1010_4$ run clockwise. In other words, in the second simple flexure 1013 the first to fourth flexures $1010_1$, $1010_2$, $1010_3$, $1010_4$ alternate their sense of rotation around the third axis z. Generally, the first and third flexures $1010_1$, $1010_3$ run in a first sense about the third axis z, and the second and fourth flexures $1010_2$, $1010_4$ run in a second, opposite, sense about the third axis z. The first sense may be clockwise and the second sense anticlockwise, or vice-versa. This is in contrast to the simple flexure 1008 in which the first to fourth flexures $1010_1$, $1010_2$, $1010_3$, $1010_4$ all run in the same sense about the third axis z.

A flexure 1010 which "runs" in a sense about the third axis z (e.g. clockwise or anti-clockwise) may correspond to that flexure being elongated such that a pair of lines drawn from the first and second ends 1005, 1006 of that flexure 1010 to the third axis z make an angle about the third axis z which has a sign (moving from the first end 1005 to the second end 1006) which is either positive (e.g. a first sense) or negative (e.g. a second sense).

When the flexures $1010_1$, $1010_2$, $1010_3$, $1010_4$ of the second simple flexure 1013 are deformed by bending in a plane parallel to the third axis z, unwanted lateral deflections δx* of the first and third flexures $1010_1$, $1010_3$ will tend to rotate the central portion 1009 anti-clockwise, whilst unwanted lateral deflections δy* of the second and fourth flexures $1010_2$, $1010_4$ will tend to rotate the central portion 1009 clockwise. Consequently, unwanted rotation Rz of the central portion 1009 about the third axis z may be suppressed or even prevented.

However, the suppression of unwanted rotation Rz comes at the cost of reduced compliance (increased stiffness) of the central portion 1009 to the desired movements Tz, Rx, Ry. This requires increasing the forces applied by the SMA wires 14 of an SMA actuator assembly 2.

In particular, this flexure design (second simple flexure 1013) in its basic form offers more resistance than expected to the desired rotations Rx, Ry about the first x and/or second y axes. By adding compliance to this flexure design (second simple flexure 1013) the resistance to the desired rotations Rx, Ry about the first x and/or second y axes can be reduced to an acceptable level while maintaining an acceptable level of resistance to translations Tx, Ty in the first x and/or second y directions, and/or rotations Rz about the third axis z.

—Third Simple Flexure—

The resistance of the second simple flexure 1013 to rotations (tilting) Rx, Ry about the first x and/or second y axes is due to the fact that the flexures 1010 are stretched (axial tension) when the central portion 1009 is tilted about these axes x, y. As described hereinbefore, straight flexures are very resistant (low compliance/high stiffness) to increasing in length, and so the flexure 1013 resists tilt Rx, Ry, about the first x and/or second y axes.

Compliance may be added to the flexures 1010 to allow the length of the flexure 1010 to increase during tilting Rx, Ry about the first x and/or second y axes by making the flexures 1010 non-linear (i.e. not simply straight-line beams).

Referring also to FIG. 10, a third simple flexure 1014 is shown.

The third simple flexure 1014 is configured to strike a balance between reducing unwanted movements Rz, Tx, Ty, whilst limiting the reduction in compliance of the central portion 1009 to the desired movements Tz, Rx, Ry by increasing the compliance of the flexures 1010 to extensions.

The third simple flexure 1014 includes a central portion 1009 in the form of a substantially square (or rectangular) plate having a central aperture 1012. The central portion 1009 is connected to an outer annulus 1015 by first to fourth elongate flexures $1010_1$, $1010_2$, $1010_3$, $1010_4$. The outer annulus 1015 takes the form of a plate having a substantially square (or rectangular) outer perimeter. Each flexure 1010 has a first end 1005 (FIG. 1) connected to the outer annulus 1015 and a second end 1006 (FIG. 11) connected to the central portion 1009. In the same way as the second simple flexure 1013, the first and third flexures $1010_1$, $1010_3$ run in a first sense about the third axis z (anti-clockwise as illustrated) whilst the second and fourth flexures $1010_2$, $1010_4$ run in a second opposite sense about the third axis z (clockwise as illustrated). As explained hereinbefore, this configuration of alternating directions acts to suppress rotation Rz about the third axis z in response to deflections of the second ends 1006 of the flexures 1010 relative to the corresponding first ends 1006 along the third axis z.

However, in order to mitigate the issue of reduced compliance (increased stiffness) of the central portion 1009 to the desired movements Tz, Rx, Ry of the third simple flexure 1014, each of the first to fourth flexures $1010_1$, $1010_2$, $1010_3$, $1010_4$ comprises a feature 1016 configured to increase a first compliance of that flexure $1010_1$, $1010_2$, $1010_3$, $1010_4$ to displacement of the respective second end 1006 towards the respective first end 1005.

In the third simple flexure 1015, the feature 1016 takes the form of an elbow joint in each flexure 1010. The first flexure $1010_1$ includes a first long portion $1017_1$ elongated parallel to the first axis x and extending from the central portion 1009 in the negative x direction. The first long portion $1017_1$ joins a first short portion $1018_1$ at the elbow feature 1016, the first short portion $1018_1$ being elongated parallel to the second axis y and extending from the outer annulus 1015 in the negative y direction. Similarly, each of the second to fourth flexures $1010_2$, $1010_3$, $1010_4$ includes a long portion $1017_2$, $1017_3$, $1017_4$ which extends from the central portion 1009 to meet a respective short portion $1018_2$, $1018_3$, $1018_4$ at a corresponding elbow feature 1016.

These features 1016 increase the compliance of a flexures 1010 because the short portion 1018 may also deform by bending. For example, when the first long portion $1017_1$ is deflected by δz parallel to the third axis z, an unwanted deflection δx* due to curvature of the first long portion $1017_1$ is coupled to and partially resisted by bending of the first short portion $1018_1$. This permits the first flexure $1010_1$ overall to accommodate a deflection along its length without axial tensioning of the first long or short portions $1017_1$, $1018_1$ (which as explained hereinbefore dramatically reduces compliance).

Figure 11:
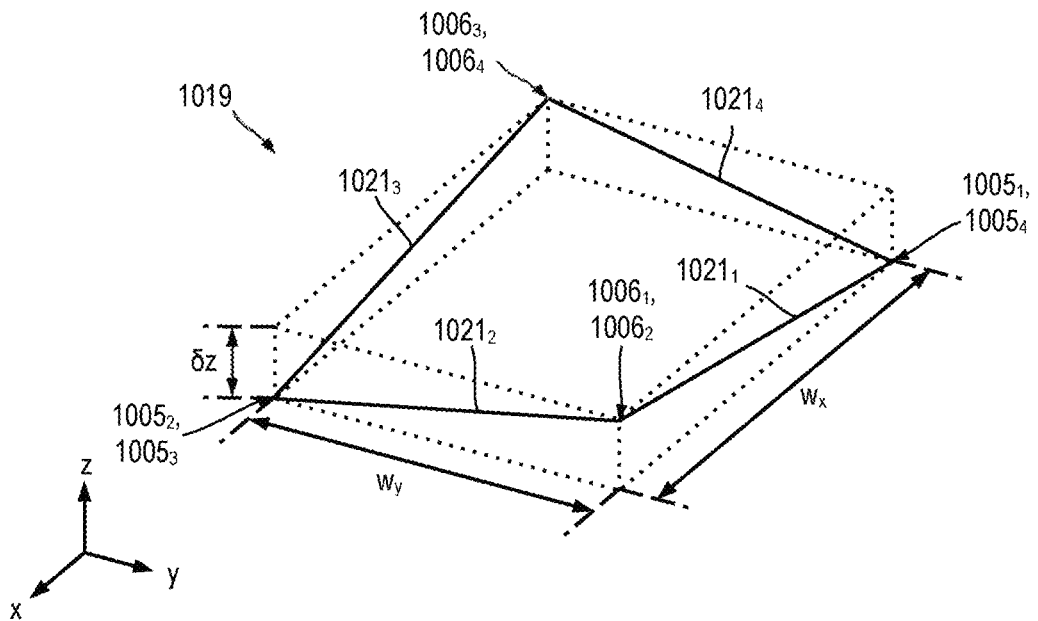
FIG. 11 schematically illustrates a first deformation of the third simple flexure of FIG. 10.
Figure 12:
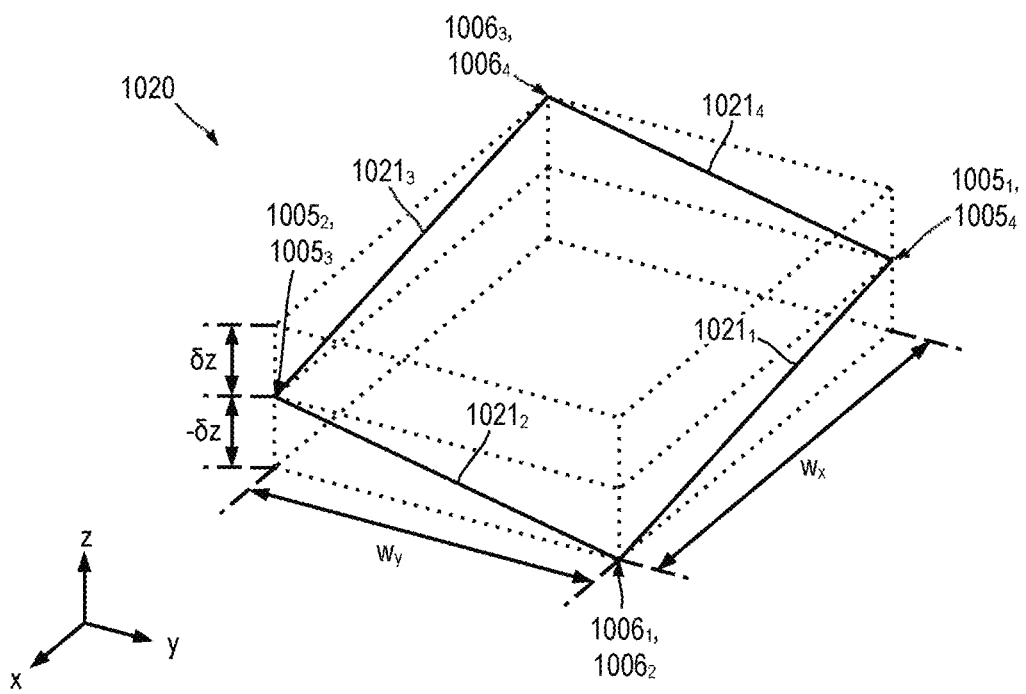
FIG. 12 schematically illustrates a second deformation of the third simple flexure of FIG. 10.

For example, referring also to FIGS. 11 and 12, first and second schematic representations 1019, 1020 of deflecting a second or third simple flexure 1013, 1014 are shown.

The first schematic representation 1019 corresponds to displacing the central portion 1009 upwards (relative to the third axis z) by a distance δz. FIG. 11 shows direct lines 1021 connecting the respective first and second ends 1005, 1006 of each the first to fourth flexures $1010_1$, $1010_2$, $1010_3$, $1010_4$. For example, the first direct line $1021_1$ connects the first end $1005_1$ of the first flexure $1010_1$ to the respective second end $1006_1$. For the purposes of the representation 1019, the direct lines 1021 are assumed to be parallel with the first axis x or the second axis y, though in practice this may not be the case (e.g. FIG. 10 in which the direct lines 1021 would not be parallel to the long portions 1017 or short portions 1018).

The separation of first and second ends 1005, 1006 in the un-deformed condition is $w_x$ parallel to the first axis x and $w_y$ parallel to the second axis y. The separations may be equal $w_x = w_y$. In order to displace the second ends 1005 downwards by δz whilst preventing translation Tx, Ty of the second ends 1006, the distance separating the first and second ends $1005_1$, $1006_1$ of the first direct line $1021_1$ must increase by an amount $\delta d_1$ given by:

$$\delta d_1 = \sqrt{w_x^2 + \delta z^2} - w_x \qquad (6)$$

and similarly for the second to fourth direct lines $1021_2$, $1021_3$, $1021_4$:

$$\delta d_2 = \sqrt{w_y^2 + \delta z^2} - w_y$$

$$\delta d_3 = \sqrt{w_x^2 + \delta z^2} - w_x$$

$$\delta d_4 = \sqrt{w_y^2 + \delta z^2} - w_y \qquad (7)$$

If the displacements $\delta d_1$, $\delta d_2$, $\delta d_3$, $\delta d_4$ had to be accommodated by longitudinal (axial) extension of a flexure 1010 in tension, the forces required would be very high, which explains the low compliance (high stiffness) of the second simple flexure 1013 to the desired motions Tz, Rx, Ry.

In contrast to this, using a compliance enhancing feature 1016 such as the elbows of the third simple flexure 1014 means that the displacements $\delta d_1$, $\delta d_2$, $\delta d_3$, $\delta d_4$ may be accommodated by a combination of bending the long and short portions 1017, 1018, enabling the schematic configuration 1019 to be realised in response to greatly reduced forces.

Of course, a real deformation would not completely avoid lateral translations Tx, Ty of the second ends 1005. However, the configuration of the third simple flexure 1014 with alternating senses (e.g. clockwise and anti-clockwise) of the first to fourth flexures $1010_1$, $1010_2$, $1010_3$, $1010_4$, combined with the compliance features 1016, means that any such lateral translations Tx, Ty of the second ends 1005 may be balanced so as to minimise or even prevent rotations Rz about the third axis z.

Referring in particular to FIG. 12, the second schematic representation 1020 is essentially similar to the first schematic representation 1019, except that the second schematic representation 1020 corresponds to tilting the central portion 1009 such that the second ends $1006_1$, $1006_2$ of the first and second flexures $1010_1$, $1010_2$ are displaced downwards by an amount $-\delta z$ whilst the second ends $1006_3$, $1006_4$ of the third and fourth flexures $1010_3$, $1010_4$ are displaced upwards by an amount $\delta z$. Several different tilt angles of the central portion 1009, about various tilting axes, may be consistent with the second schematic representation 1020, but all may benefit from the balancing of lateral translations Tx, Ty of the second ends 1005 so as to minimise or even prevent rotations Rz about the third axis z.

However, compliance in the length of the flexure 1010 may allow the moving portion to move Tx, Ty parallel to the first x and/or second y axes when acted on by forces, for example provided by SMA wires 14 of an SMA actuator assembly 2. This means that the moving portion (central portion 1009) may additionally shift (lateral translations perpendicular to the third axis z) instead of, or in addition to, tilt Rx, Ry about the first x and/or second y axes as desired.

The compliance added by the features 1016 should be balanced such that the compliance of the flexures 1010 is sufficient to allow low resistance to rotations (tilts) Rx, Ry about the first x and/or second y axes, whilst the resistance to changing length of the flexures 1010 is sufficient so that the motion (translations) Tx, Ty parallel to the first x and/or second y axes at the flexure 1010 height is small compared to the distance moved by an actuating SMA wire 14. Such a balance may help to ensure an efficient conversion of the translation (length change) of the SMA wire 14 into desired tilting Rx, Ry of the moving portion (central portion 1009) about the first x and/or second y axes.

Referring back to FIG. 10, the feature 1016 of a flexure 1010 need not be an elbow, and in general the feature 1016 may be configured in any way which serves to increase a first compliance of that flexure 1010 to displacement of the respective second end 1006 towards the respective first end 1005. The value of the first compliance can be defined relative to a second compliance defined as the compliance of the flexure 1010 to displacement of its second end 1006 parallel to the third axis z. For example, the first compliance may be increased so as to be greater than or equal to 0.02% or 0.05% or 0.1% of the second compliance. However, the feature should not increase the first compliance excessively and, for example, the first compliance should remain less than the second compliance. In particular, the first compliance should be less than or equal to 2% of the second compliance and greater than or equal to 0.02% of the second compliance. Preferably the first compliance is than or equal to 1% of the second compliance, and most preferably less than 0.2% of the second compliance.

The first and second compliances referred to correspond to effective, overall or total compliances for relative displacements between the first and second ends 1005, 1006 of a particular flexure 1010, taking into account the geometry and materials of that flexure 1010. A suitable feature 1016 of a flexure 1010 does not simply correspond to increasing the length of that flexure 1010. Rather, each feature 1016 will correspond to a change of direction of an elongate flexure 1010 and/or a change of cross-section of the elongate flexure 1010 at some point between the respective first and second ends 1005, 1006.

A further benefit of adding compliance to the flexures 1010 using features 1010 is that when the flexures 1010 are used to support a moving part (second part 4) of a SMA actuator assembly, that moving portion (second part 4) may be able to translate further, for example during drop testing (particularly along the third axis z) until it hits an end-stop, without damaging the flexure 1010 (by extending it beyond its elastic range).

Although illustrated as lying within the x-y plane perpendicular to the third axis z, the features 1016 in the form of elbows could equally lie within planes parallel to the third axis z. For example, all of the first to fourth short portions $1018_1$, $1018_2$, $1018_3$, $10181_4$ may be oriented parallel to the third axis z.

The first to fourth flexures $1010_1$, $1010_2$, $1010_3$, $1010_4$ may be formed from one or more corresponding thin webs. For example, the shapes of the first to fourth flexures $1010_1$, $1010_2$, $1010_3$, $1010_4$ may be produced by etching (for example chemical or laser etching) of a metal sheet such as, for example a stainless steel or aluminium sheet. As an alternative to etching, stamping may be used, provided that this does not introduce excessive residual strains into the first to fourth flexures $1010_1$, $1010_2$, $1010_3$, $1010_4$. One or both of the outer annulus 1015 and/or the central portion 1009 may optionally be formed from etching/stamping of the same sheet. In other words, the first to fourth flexures $1010_1$, $1010_2$, $1010_3$, $1010_4$ may be formed as a single part with the first outer annulus 1015, the central portion 1009, or the whole third simple flexure 1014 may be formed as a single piece.

A flexure 1010 is not limited to including a single feature 1016, and two or more flexures 1016 may be positioned in series along a flexure 1010, and/or spaced apart along the flexure.

The third simple flexure 1014 may be incorporated into a SMA actuator assembly 2 by connecting the outer annulus 1015 to the first part 3, or the first part 3 may replace the outer annulus 1015 such that the first ends 1005 of the flexures 1010 connect directly to (or are formed as a single part with) the first part 3. Similarly, the central portion 1009 may be connected to the second part 4, or the central portion 1009 may provide the second part 4, for example by supporting a camera module or one or more lenses 10.

—Fourth Simple Flexure—

Figure 13:
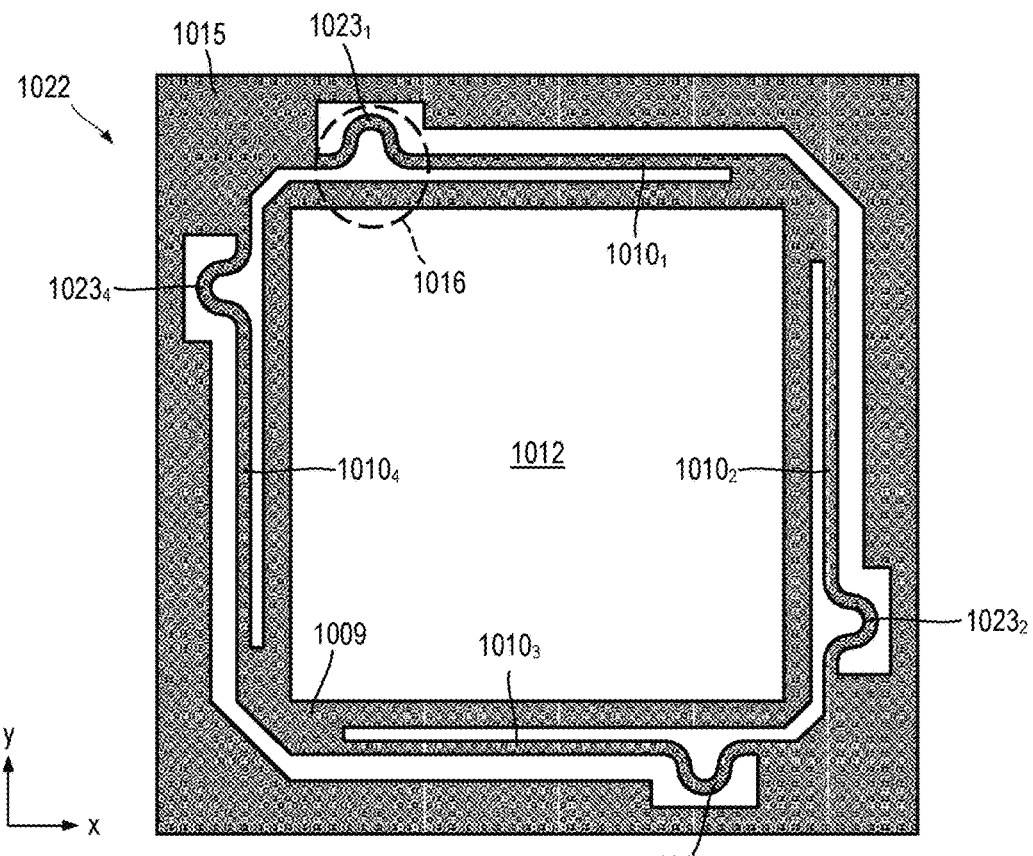
FIG. 13 is a schematic plan view of a fourth simple flexure.

Referring also to FIG. 13, a fourth simple flexure 1022 is shown.

The fourth simple flexure 1022 is the same as the third simple flexure 1014, except that the features 1016 of the first to fourth flexures $1010_1$, $1010_2$, $1010_3$, $1010_4$ are not elbows, and instead take the form of respective hairpin-shaped portions $1023_1$, $1023_2$, $1023_3$, $1023_4$.

Although illustrated as lying within the x-y plane perpendicular to the third axis z, the features 1016 in the form of hairpin-shaped portions $1023_1$, $1023_2$, $1023_3$, $1023_4$ could equally lie within planes parallel to the third axis z. For example, the first and third hairpin-shaped portions $1023_1$, $1023_3$, may lie in respective x-z planes, and the second and fourth hairpin-shaped portions $1023_2$, $1023_4$, may lie in respective y-z planes.

In general, each feature 16 of a flexure 1010 may take the form of at least one portion of that flexure 1010 which meanders within an envelope. The hairpin-shaped portions 1023 may be considered as a particular case of this, in which the envelope is square and sized to permit a single meander. Meanders need not be curved, and as an alternative zig-zag shaped meanders could be used. Features 1016 in the form of meanders may, in general, be confined to a plane or may meander along a three-dimensional path. When confined to a plane, that plane may be parallel to the third axis z.

—Fifth Simple Flexure—

Figure 14:
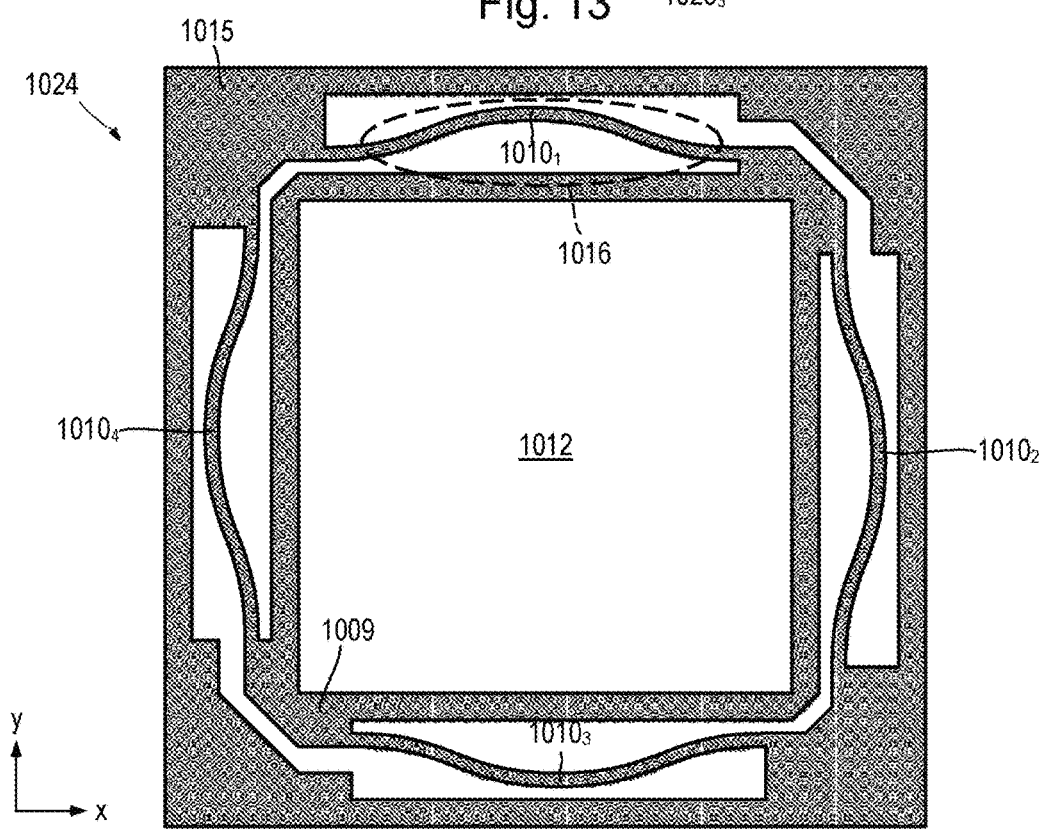
FIG. 14 is a schematic plan view of a fifth simple flexure.

Referring also to FIG. 14, a fifth simple flexure 1024 is shown.

The fifth simple flexure 1024 is the same as the third or fourth simple flexures 1014, 1022, except that instead of an elbow or a hairpin-shaped portion, the features 1016 take the form of each one of the first to fourth flexures $1010_1$, $1010_2$, $1010_3$, $1010_4$ including at least one curved portion (i.e. curving away from a direct line 1021 between the respective first and second ends 1005, 1006).

Although illustrated as lying within the x-y plane perpendicular to the third axis z, a curved portion providing a feature 1016 may equally lie within a respective plane which is parallel to the third axis z.

—Sixth Simple Flexure—

In the fifth simple flexure 1024 shown in FIG. 14, each of the first to fourth flexures $1010_1$, $1010_2$, $1010_3$, $1010_4$ curves away from a direct line 1021 between the respective first and second ends 1005, 1006 towards a mid-point, adopting a shape similar to a single period of a cosine function. However, features 1016 of flexures 1010 are not limited to this specific shape, and the first compliance of a flexure 1010 may be increased if that flexure 1010 follows any curving path which deviates from the respective direct line 1021.

Figure 15:
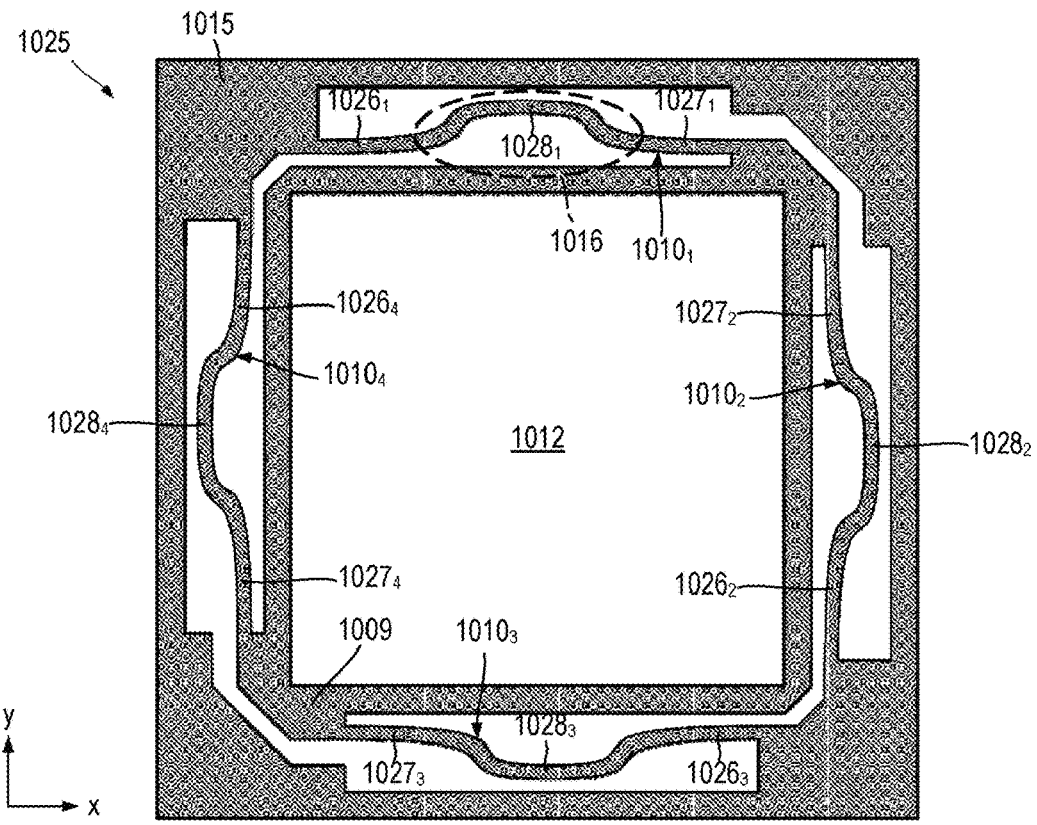
FIG. 15 is a schematic plan view of a sixth simple flexure.

For example, referring also to FIG. 15, a sixth simple flexure 1025 is shown.

The sixth simple flexure 1025 is the same as the fifth simple flexure 1024, except that the shape of the curved portions providing the features 1016 is different. For example, the first flexure $1010_1$ includes a first end portion $1026_1$ extending from the respective first end $1005_1$ substantially parallel to the first axis x, a second end portion $1027_1$ extending from the respective second end $1006_1$ substantially parallel to the first axis x, and an intermediate portion $1028_1$ which runs parallel to the first axis x whilst being offset relative to the first and second end portions $1026_1$, $1027_1$ parallel to the second axis y. The intermediate portion $1028_1$ is connected to the first and second end portions $1026_1$, $1027_1$ by curved sigmoid-shaped portions of the first flexure $1010_1$. The second to fourth flexures $1010_2$, $1010_3$, $1010_4$ include features 1016 having the same configuration as the first flexure $1010_1$.

Seventh Simple Flexure—

The use of compliance enhancing features 1016 is not restricted to the basic configuration of the second simple flexure 1013 with pairs of flexures 1010 running in alternating senses.

Figure 16:
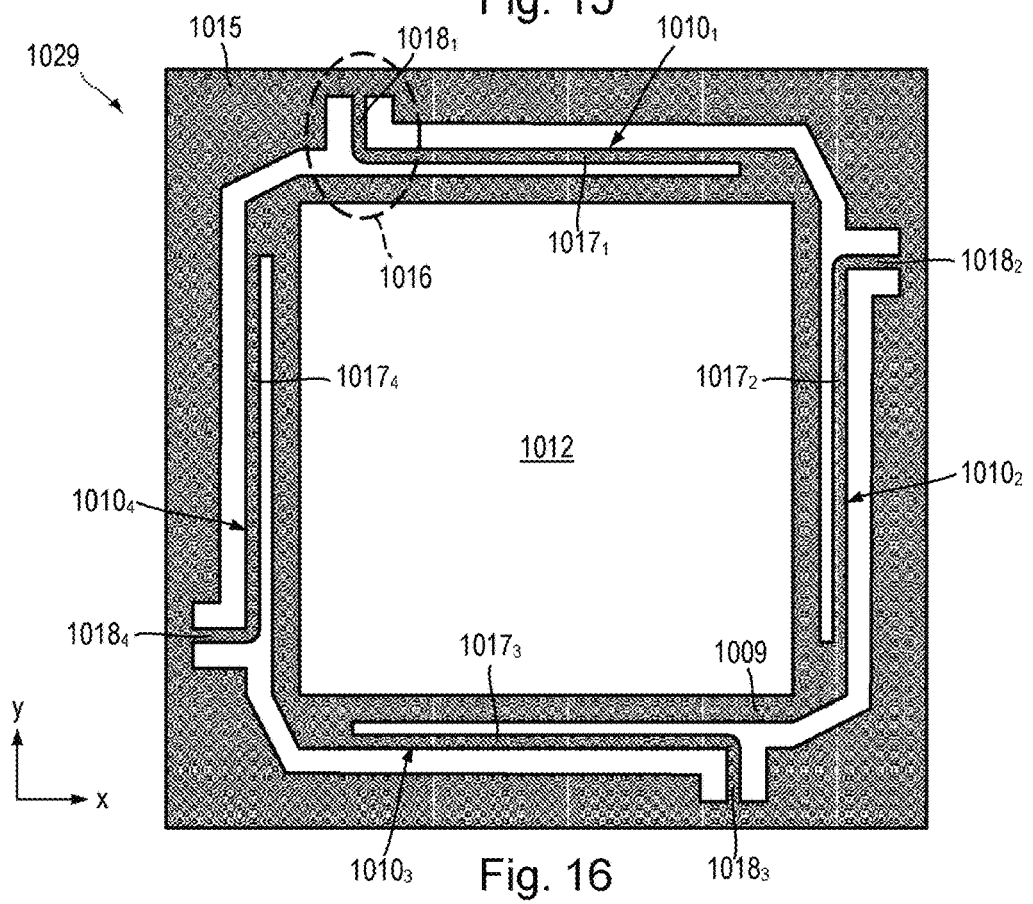
FIG. 16 is a schematic plan view of a seventh simple flexure.

For example, referring also to FIG. 16, a seventh simple flexure 1029 is shown.

The seventh simple flexure 1029 is the same as the third simple flexure 1014, except that the first to fourth flexures $1010_1$, $1010_2$, $1010_3$, $1010_4$ do not alternate their sense of rotation around the third axis, and instead all run in the same sense about the third axis z. The seventh simple flexure 1029 may alternatively be viewed as an implementation of the simple flexure 1008, using the same type of flexures 1010 as the third simple flexure 1014, namely including a long portion 1017 connected to a short portion 1018 at a feature 1016 in the form of an elbow.

Eighth Simple Flexure—

Figure 17:
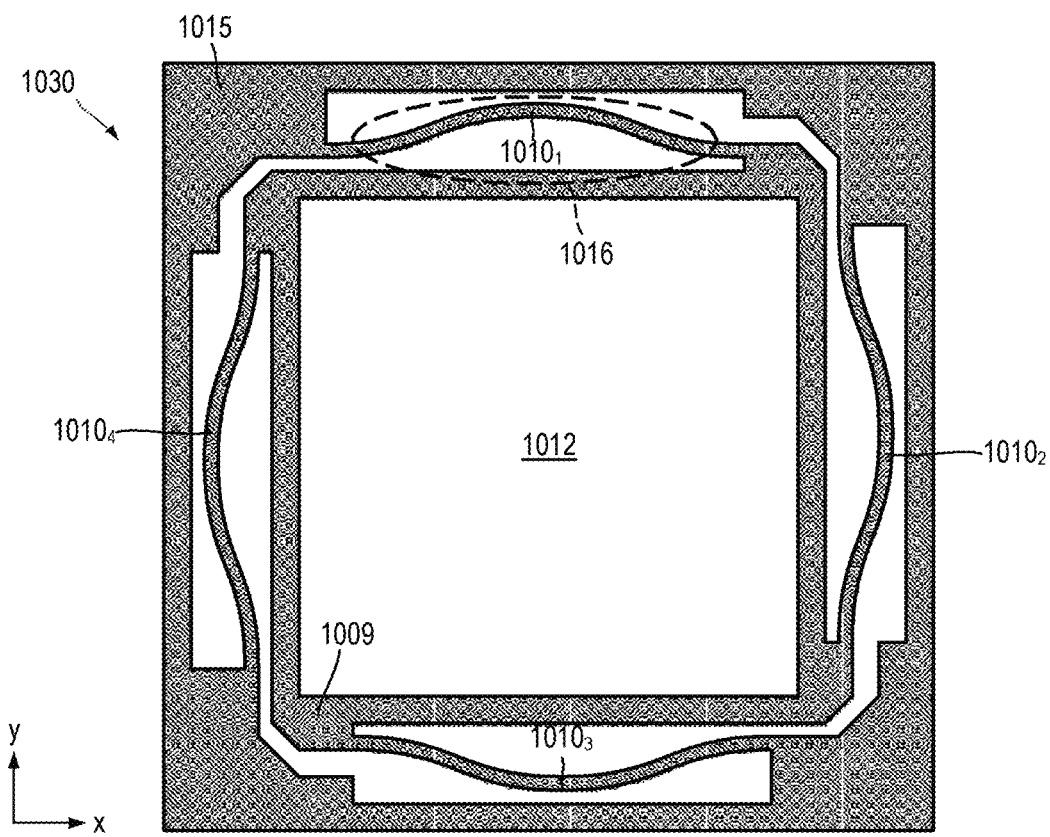
FIG. 17 is a schematic plan view of an eighth simple flexure.

Referring also to FIG. 17, an eighth simple flexure 1030 is shown.

The eighth simple flexure 1030 is the same as the seventh simple flexure 1029, except that it uses features 1016 in the form of curved portions (similar to the fifth simple flexure 1024) instead of elbows (similar to the third simple flexure 1014).

The third to eighth simple flexures 1014, 1022, 1024, 1025, 1029, 1030 have been described an illustrated as including features 1016 corresponding to changes in the path of a flexure 1010, leaving the cross-section substantially constant. However, features 1016 are not limited to this, and in other examples, a feature 1016 may additionally or alternatively include a change in the cross-sectional shape and/or area of the corresponding flexure 1010. For example, a feature 1016 may take the form of a notch or a constriction in the corresponding flexure 1010. In other examples, the cross section of a flexure 1010 may increase towards the respective first and/or second ends 1005, 1006, in order to reduce stress concentrations at one or both points of attachment.

—Pivot Bearing—

Figure 18:
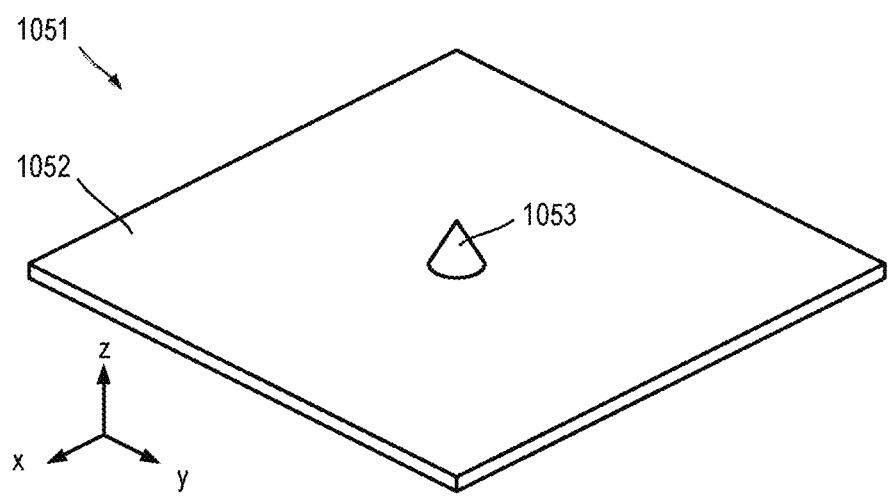
FIG. 18 is a schematic projection of a first pivot bearing.
Figure 19A:
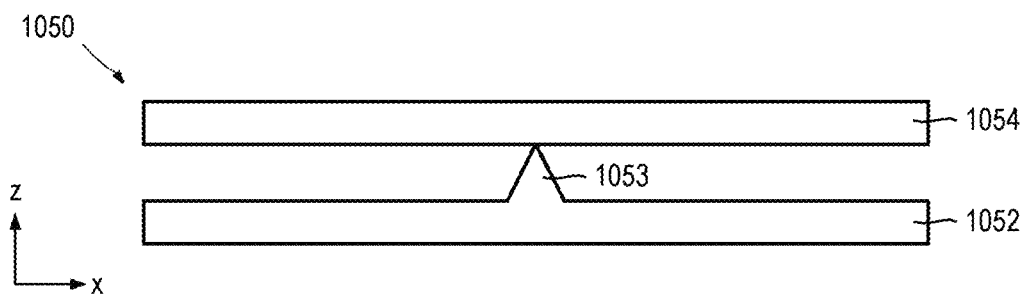
FIG. 19A is a schematic side view of the first pivot bearing shown in FIG. 18.

Referring also to FIGS. 18 and 19A, a first pivot bearing 1050 is shown.

FIG. 18 shows a projection view of a first plate 1051 of the first pivot bearing 1050, and FIG. 19A shows a side view of the first pivot bearing 1050.

The first plate 1051 includes a rectangular base plate 1052 extending parallel to first and second axes x, y from which a conical protrusion 1053 is upstanding in a direction parallel to the third axis z. The conical protrusion 1053 is illustrated as being central to the base plate 1052, but in practice this is not necessary and the conical protrusion 1053 is placed wherever the origin of pivoting is required for a particular application. The first pivot bearing 1050 is completed by a second plate 1054 contacting the conical protrusion 1053. Biasing means (not shown) urge the first and second plates 1051, 1054 together to maintain contact between the conical protrusion 1053 and the second plate 1054. The second plate 1054 may slide relative to the conical protrusion 1053 parallel to the first and/or second axes x, y, and may rotate (tilt) about any axis x, y, z with an origin provided by a point of the conical protrusion.

In this way, the relative motions between the first plate 1051 and the second plate 1054 correspond to Tx, Ty, Rx, Ry and Rz, whilst constraining movement Tz parallel to the third axis z.

A conical protrusion 1053 is not essential, and any shape of protrusion suitable to provide a pivot point may be used instead.

Figure 19B:
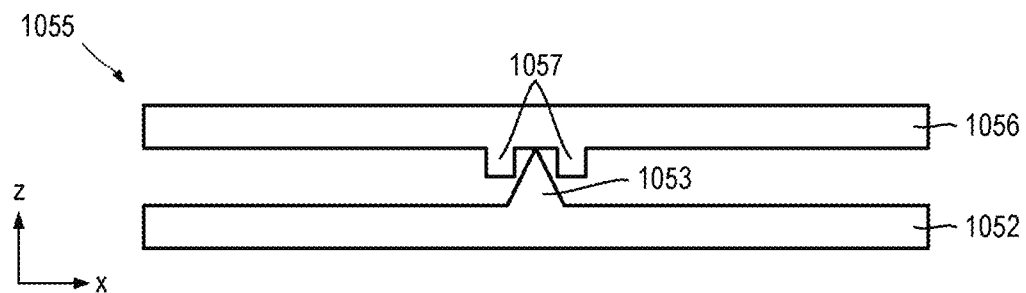
FIG. 19B is a schematic side view of a second pivot bearing.

Referring also to FIG. 19B, a side view of a second pivot bearing 1055 is shown.

The second pivot bearing 1055 includes the first plate 1051, but replaces the second plate 1054 with a third plate 1056. The third plate 1056 includes an annular protrusion 1057 which defines a recess that receives the point of the conical protrusion 1053. The annular protrusion 1057 constrains lateral sliding of the third plate 1056 relative to the first plate 1051. In this way, the relative motions between the first plate 1051 and the third plate 1056 correspond to Rx, Ry and Rz, whilst constraining movements Tx, Ty and Tz.

Figure 19C:
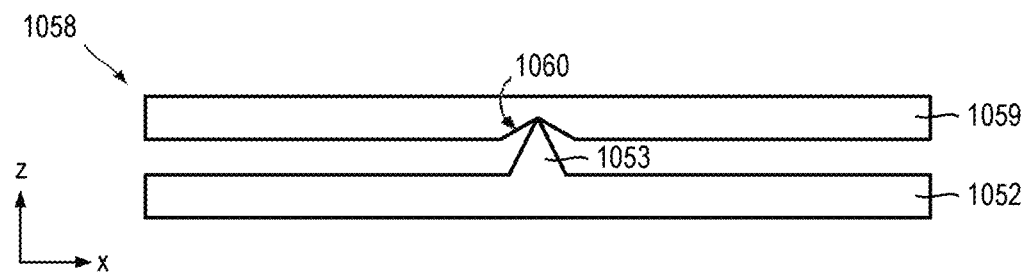
FIG. 19C is a schematic side view of a third pivot bearing.

Referring also to FIG. 19C, a side view of a third pivot bearing 1058 is shown.

The third pivot bearing 1058 includes the first plate 1051, but replaces the second plate 1054 with a fourth plate 1059. The fourth plate 1059 includes a conical indentation 1060 which defines a recess that receives the point of the conical protrusion 1053. The conical indentation 1060 constrains lateral sliding of the fourth plate 1059 relative to the first plate 1051. In this way, the relative motions between the first plate 1051 and the fourth plate 1059 correspond to Rx, Ry and Rz DOF, whilst constraining movements Tx, Ty and Tz.

Figure 19D:
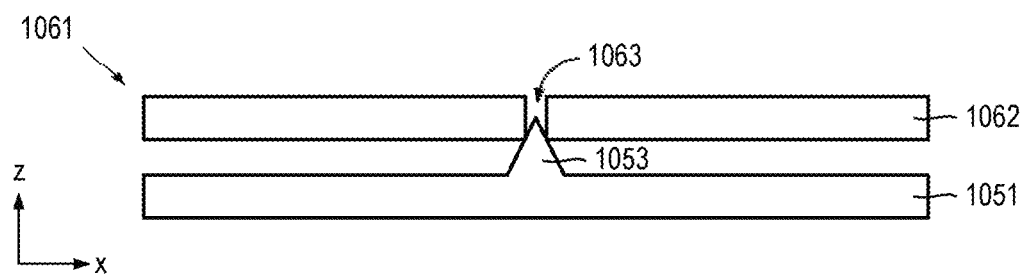
FIG. 19D is a schematic side view of a fourth pivot bearing.

Referring also to FIG. 19D, a side view of a fourth pivot bearing 1061 is shown.

The fourth pivot bearing 1061 includes the first plate 1051, but replaces the second plate 1054 with a fifth plate 1062. The fifth plate 1062 includes through-hole 1063 that receives the point of the conical protrusion 1053. The through-hole 1063 constrains lateral sliding of the fifth plate 1061 relative to the first plate 1051. In this way, the relative motions between the first plate 1051 and the fifth plate 1062 correspond to Rx, Ry and Rz, whilst constraining movements Tx, Ty and Tz. The fifth plate 1062 may be relatively simpler to fabricate compared to the third or fourth plates 1056, 1059.

The pivot bearings 1050, 1055, 1058, 1061 may be inverted. Thus, the conical (or other shaped) protrusion 1053 may depend from the (upper) plate 1054, 1056, 1059, 1062 and, if present, the facing protrusion 1057, indentation 160 or recess 1063 may be provided in the (lower) plate 1051, 1052.

—Planar Bearing—

Figure 20A:
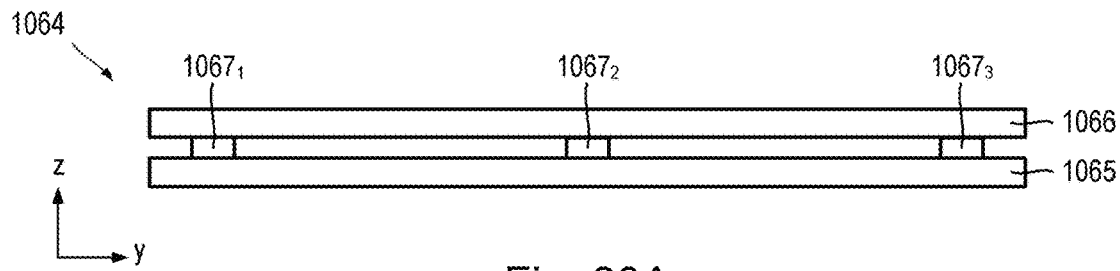
FIG. 20A is a schematic side view of a first planar bearing.
Figure 20B:
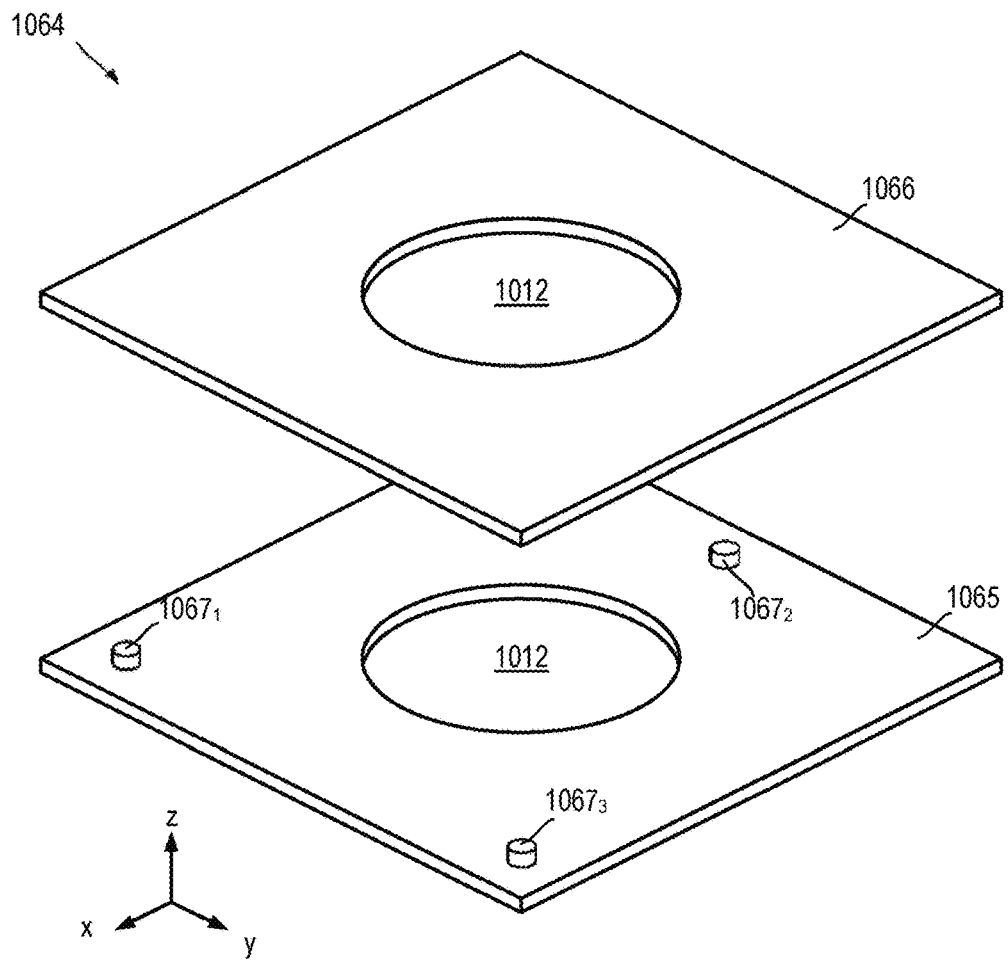
FIG. 20B is a schematic exploded projection view of the first planar bearing shown in FIG. 20A.

Referring also to FIGS. 20A and 20B, a first planar bearing 1064 (also referred to as a three-point bearing) is shown.

FIG. 20A is a side view and FIG. 20B is an exploded projection view.

The first planar bearing 1064 includes a first plate 1065 which slides in contact with a second plate 1066. The first plate 1065 supports at least three cylindrical protrusions 1067 including at least first $1067_1$, second $1067_2$ and third $1067_3$ cylindrical protrusions which are not co-linear, for example arranged at the points of a triangle. The second plate 1066 is urged into contact with the flat surfaces of the cylindrical protrusions 1067 by biasing means (not shown in FIGS. 20A and 20B), and is free to slide in a plane parallel to the first and second axes x, y, and to rotate about an axis parallel to the third axis z. In this way, the relative motions between the first plate 1065 and the second plate 1066 correspond to Tx, Ty and/or Rz. Unless a biasing force urging the plates 1065, 1066 together is overcome, Tz, Rx and Ry movements are constrained.

In the example shown in FIGS. 20A and 20B, both plates 1065, 1066 take the form of an annulus having a rectangular outer perimeter and a circular inner perimeter defining a central aperture 1012. However, the shape of the plates 1065, 1066 is not relevant to the function of the first planar bearing 1064, and any shapes of plate may be used instead. Although three cylindrical protrusions $1067_1$, $1067_2$, $1067_3$ are shown in FIGS. 20A and 20B, in general any number of cylindrical protrusions greater than or equal to three may be used.

Figure 21:
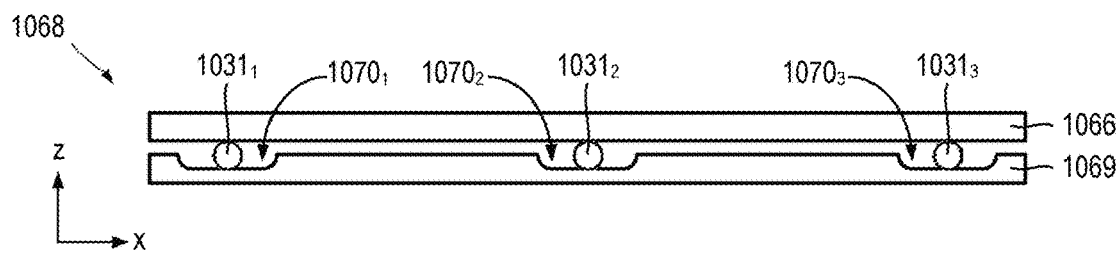
FIG. 21 is a schematic side view of a second planar bearing.
Figure 22:
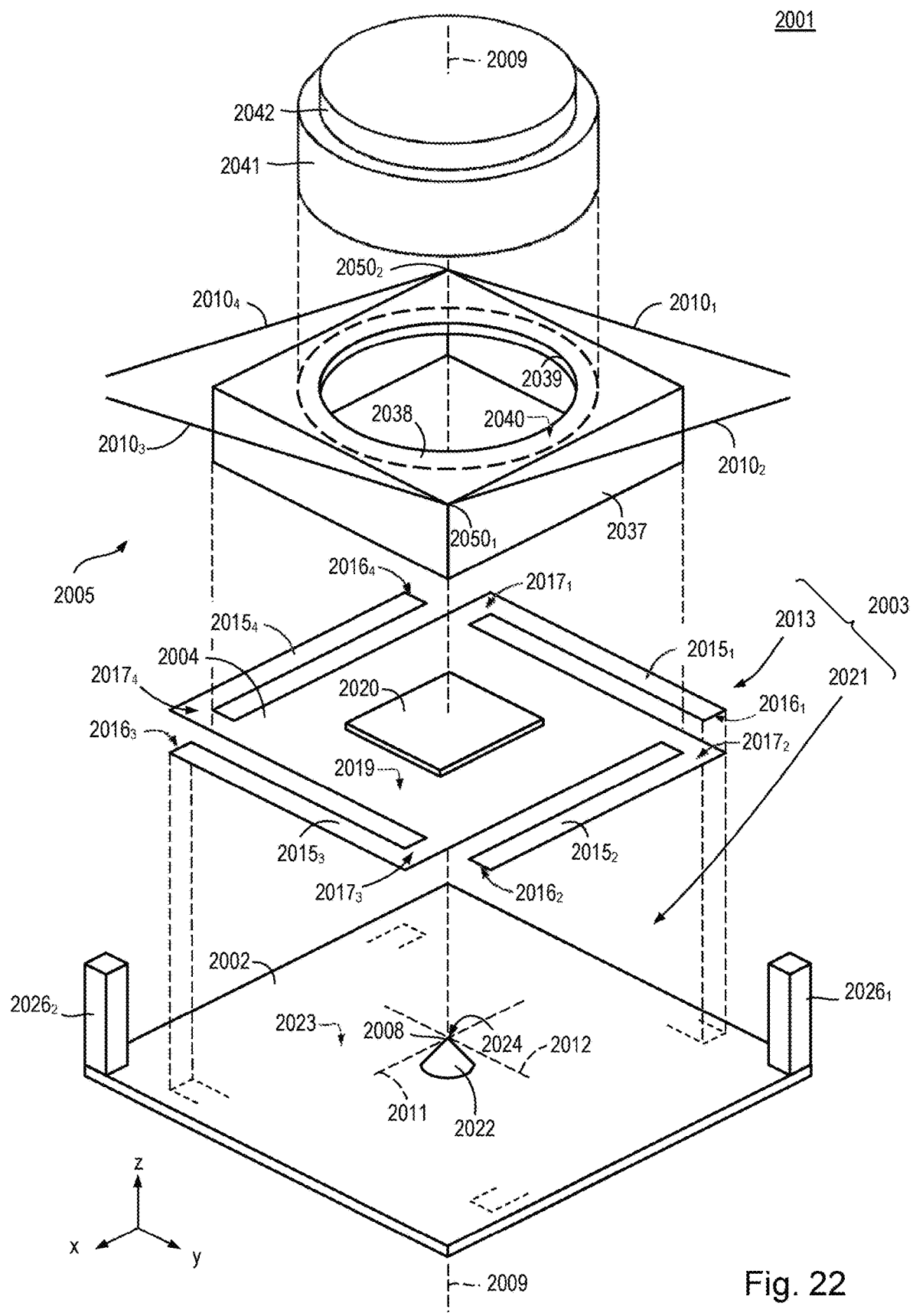
FIG. 22 is a schematic exploded projection of a first actuator assembly.
Figure 23:
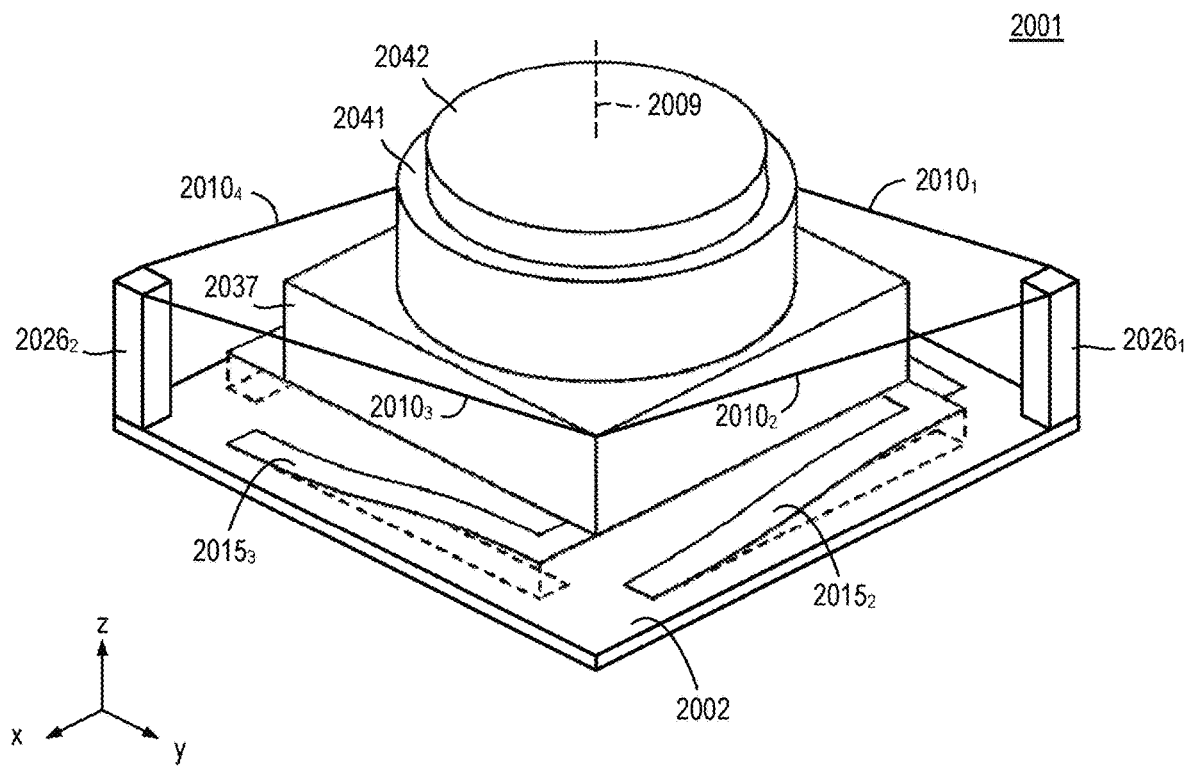
FIG. 23 is a schematic projection of the first actuator assembly shown in FIG. 22.
Figure 24:
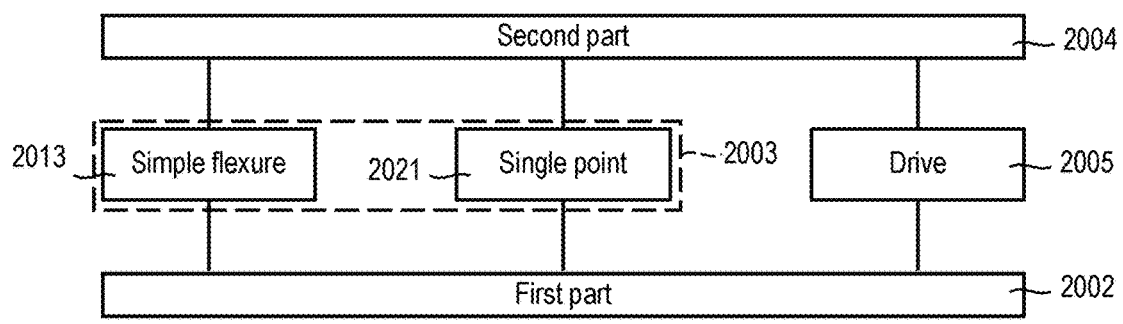
FIG. 24 is schematic block diagram of the first actuator assembly shown in FIG. 22.
Figure 25:
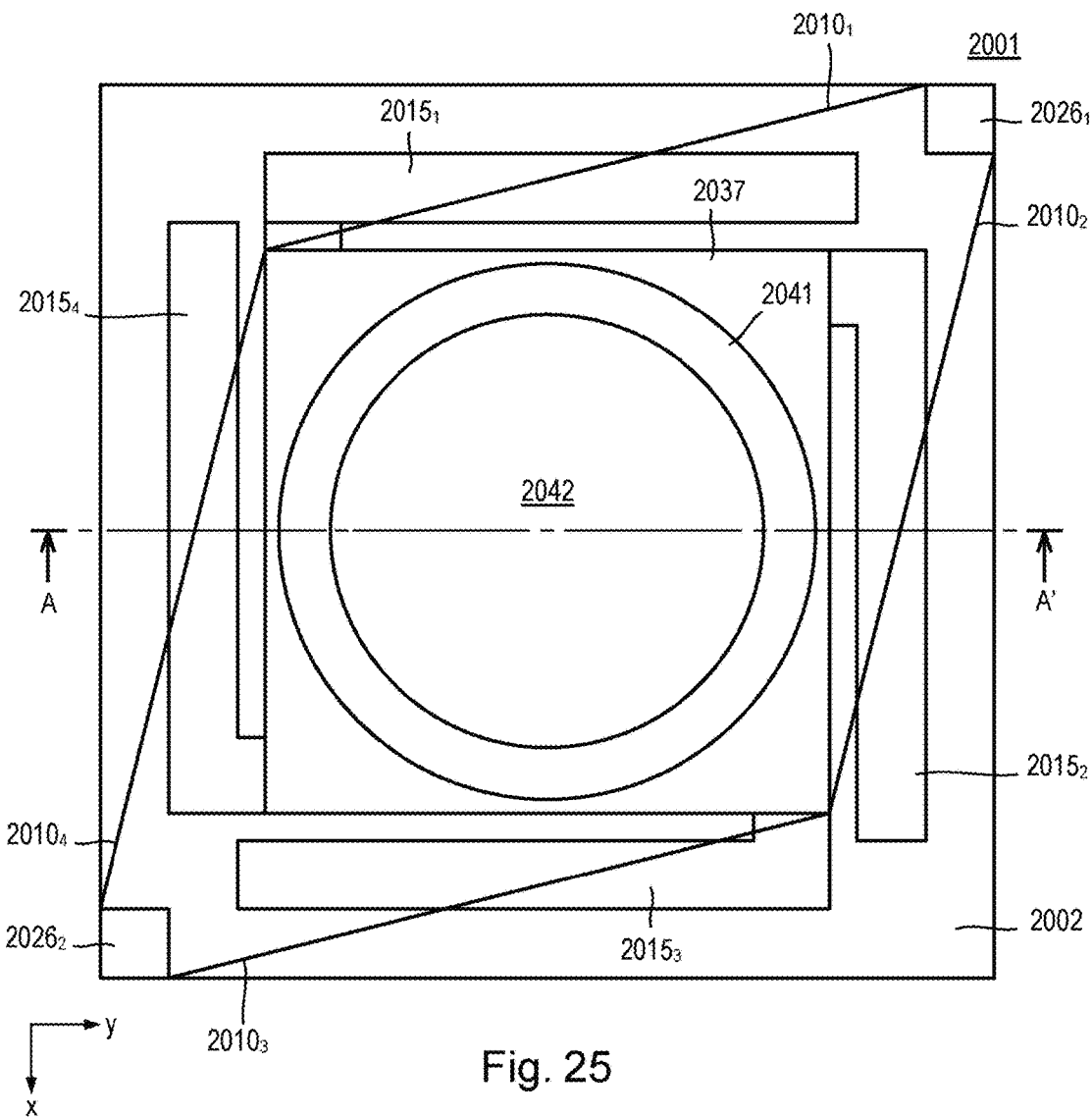
FIG. 25 is a schematic plan view of the first actuator assembly shown in FIG. 22.

Referring also to FIG. 21, a second planar bearing 1068 is shown.

The second planar bearing 1068 is the same as the first planar bearing 1064, except that the cylindrical protrusions 67 are replaced by ball bearings $1031_1$, $1031_2$, $1031_3$. The first plate 1065 may also be replaced with a third plate 1069 including recesses $1070_1$, $1070_2$, $1070_3$, for example circular indents, for receiving corresponding ball bearings $1031_1$, $1031_2$, $1031_3$. The second planar bearing 1068 functions in the same way as the first planar bearing 1064, except that the second planar bearing 1068 is a rolling bearing instead of a plain bearing.

Although illustrated and described in particular orientations with respect to a set of right-handed Cartesian axes x, y, z for reference, any of the bearings described hereinbefore may be oriented at an arbitrary angle.

The bearings described hereinbefore may be formed of any suitable materials and using any suitable fabrication methods. For example, plate- or sheet-like components may be fabricated from metal sheets, for example stainless steel, with patterning provided by chemical or laser etching. Milling or stamping could be used provided that this does not introduce unacceptably residual strains causing distortion of parts. After patterning, such parts may be bent or pre-deformed as needed. Complex three-dimensional parts may be built up by attaching parts to plates, sheets or other parts, for example using adhesives, welding, brazing, soldering and so forth. Alternatively, complex three-dimensional parts may be formed by, for example, sintering or die-casting of metals, or by injection moulding of polymers. Any bearing surfaces may be formed from a polymer such as POM (Acetal), PTFE or PTFE-impregnated POM.

First Actuator Assembly

Referring to FIGS. 22 to 26, a first actuator assembly 2001 is schematically shown.

The actuator assembly 2001 comprises a first part 2002, a bearing arrangement 2003, a second part 2004, and a drive system 2005.

The bearing arrangement 2003 supports the second part 2004 on the first part 2002 of the actuator assembly 2001. The second part 2004 is tiltable about a pivot point 2008 which lies on the optical axis 2009 (or "primary axis") passing through the actuator assembly 2001. In some examples, the pivot point 2008 may be simply a point in space. The pivot point 2008 may, in some cases, move when translational and/or rotational forces are applied to the bearing arrangement 2003.

Hereinafter, the first part 2002 may be referred to as the "fixed part", "support" or "support structure" and the second part 2004 may be referred to as the "moveable part" or "tiltable part".

The drive system 2005 comprises a total of four shape memory alloy wires $2010_1$, $2010_2$, $2010_3$, $2010_4$ (herein referred to also as "lengths of shape memory alloy wire"). The four shape memory alloy wires $2010_1$, $2010_2$, $2010_3$, $2010_4$ mechanically connect (or "couple") the second part 2004 to the first part 2002 of the actuator assembly and are used to move the second part 2004 with respect to the first part 2002 of the actuator assembly 2001. The shape memory alloy wires $2010_1$, $2010_2$, $2010_3$, $2010_4$ are formed from copper-aluminium-nickel alloy, nickel-titanium alloy or other suitable shape memory alloy.

The shape memory alloy wires $2010_1$, $2010_2$, $2010_3$, $2010_4$ are substantially co-planar and the arrangement is referred to as "a flat four-wire SMA wire arrangement". The shape memory alloy wires $2010_1$, $2010_2$, $2010_3$, $2010_4$ can, however, be alternatively arranged so as not to be co-planar (in "an angled four-wire SMA wire arrangement").

Bearing Arrangement 2003—

The bearing arrangement 2003 is configured to guide tilting of the second part 2004 about first and/or second axes 2011, 2012 (i.e., about the first axis 2011, about the second axis 2012 and combinations of tilt about the first and second axes 2011, 2012). In some examples, the bearing arrangement 2003 may be configured to constrain rotation of the second part 2004 about the primary axis 2008. The first and second axes 2011, 2012 are not parallel with respect to each other and are perpendicular to the primary axis 2009. In this example, the first and second axes 2011, 2012 are also perpendicular to each other. The first and second axes 2011, 2012 pass through the pivot point 2008.

The bearing arrangement 2003 includes a simple flexure 2013 substantially as hereinbefore described with reference to the simple flexure 1008 in FIGS. 8A to 8C.

The simple flexure 2013 includes two pairs of flexures (beam portions) $2015_1$, $2015_2$, $2015_3$, $2015_4$. Each flexure $2015_1$, $2015_2$, $2015_3$, $2015_4$ is rigidly connected, e.g., by welding, to the support 2002 at a first end $2016_1$, $2016_2$, $2016_3$, $2016_4$ and rigidly connected to the tiltable part 2004 at respective second ends end $2017_1$, $2017_2$, $2017_3$, $2017_4$.

The tiltable part 2004 and the flexures $2015_1$, $2015_2$, $2015_3$, $2015_4$ are a single piece. For example, the second part 2004 and the flexures $2015_1$, $2015_2$, $2015_3$, $2015_4$ may be formed by etching or machining a sheet of metal or metal alloy, such as stainless steel.

The flexures $2015_1$, $2015_2$, $2015_3$, $2015_4$ can support flexible electrical connections.

The first and third flexures $2015_1$, $2015_3$ are elongated parallel to the first axis x, and are able to deform by beam bending in the x-z plane. Similarly, the second and fourth flexures $2015_2$, $2015_4$ are elongated parallel to the second axis y, and are able to deform by beam bending in the y-z plane. Deflection of the flexures $2015_1$, $2015_2$, $2015_3$, $2015_4$ laterally (perpendicular to the third axis z) is constrained by the connection of all the flexures $2015_1$, $2015_2$, $2015_3$, $2015_4$ to the second part 2004.

The tiltable part 2004 (second part) is generally thin and flat, and has first and second opposite faces 2018, 2019. The first face 2018 faces the support 2002 (first part) and the second face 2019 faces away from the support 2002. The second face 2019 (hereinafter referred to as the "upper face") of the tiltable part 2004 supports an image sensor 2020, such as CCD or CMOS device.

The bearing arrangement 2003 includes a pivot bearing 2021 substantially the same as hereinbefore described with reference to FIGS. 18 and 19A to 19D.

The pivot bearing 2021 includes a member 2022 (or "protrusion") upstanding from an upper face 2023 of the support 2002 which serves as a base for the pivot. In some examples, the pivot bearing 2021 may include a separate base which is supported by the support 2002.

The protrusion 2022 has a distal end 2024 which contacts the tiltable part (second part) 2004, in particular, a point (or area) of contact on the first face 2018 (herein after referred to either as the "bottom face" or "underside") of the tiltable part 2004. The distal end 2024 of the protrusion 2022 and contact point define the pivot point 2008.

The first ends $2016_1$, $2016_2$, $2016_3$, $2016_4$ of the flexures $2015_1$, $2015_2$, $2015_3$, $2015_4$ are attached to the upper face 2023 of the support (first part) 2002. This urges the support (first part) 2002 and the tiltable part (second part) 2004 together to maintain contact between the protrusion 2022 and the tiltable part 2004.

Anchoring members $2026_1$, $2026_2$ for the shape memory alloy wires $2010_1$, $2010_2$, $2010_3$, $2010_4$ are rigidly attached to the support (first part) 2002. The anchoring members $2026_1$, $2026_2$ can take the form of posts or other structures upstanding from the first part 2002 of the actuator assembly 2001. In this example, two anchoring members $2026_1$, $2026_2$ are provided which are located in diagonally opposite corners of the support 2002. More than two anchoring members $2026_1$, $2026_2$, however, may be provided. Crimps (not shown) are used to attach the shape memory alloy wires $2010_1$, $2010_2$, $2010_3$, $2010_4$ the anchoring members $2026_1$, $2026_2$. The anchoring members $2026_1$, $2026_2$ form part of a chassis.

The support (first part) 2002 of the actuator assembly is formed of a metal or metal alloy, such as stainless steel.

Figure 27:
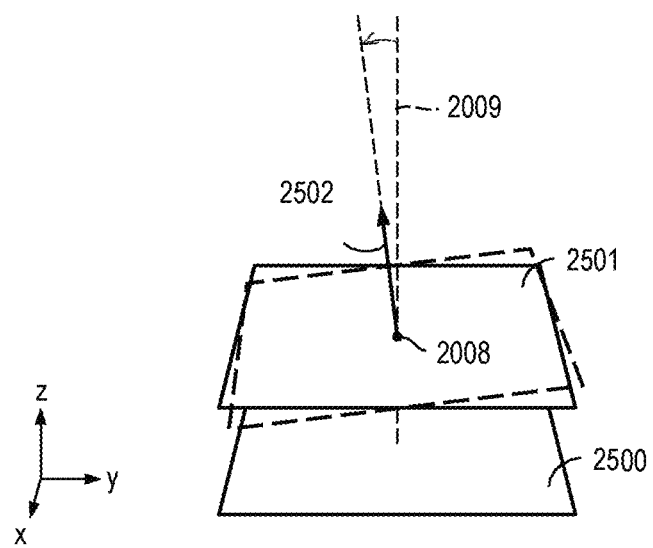
FIG. 27 schematically illustrates tilting of first plane in which a platform lies and tilting of a second plane in which a second part lies.

Referring also to FIG. 27, the support (first part) 2002 lies in a first plane 2500 and the tiltable part (second part) 2004 lies in a second plane 2501 which has a normal 2502 (herein also referred to as "the axis of tilt" or "tilt axis") such that tilting the tiltable part 2002 tilts the normal 2502 away from primary axis 2009.

Referring still to FIGS. 22 to 26, the tiltable part (second part) 2004 carries a bracket 2037 which surrounds the image sensor 2020. The bracket 2037 is generally box-shaped and includes a top plate 2038 (or "top") having a central, circular aperture 2039. The top plate 2038, on its upper surface 2040, supports a lens carriage 2041.

The lens carriage 2041 is generally annular and hold lens assembly 2042. An autofocus system (not shown) and/or an (additional) OIS system may be provided between the lens assembly 2042 and the lens carriage 2041.

The top 2038 of the bracket 2037 has four corners including first and second diagonally opposite corners $2050_1$, $2050_2$. First respective ends of the second and third shape memory alloy wires $2010_2$, $2010_3$ are attached to the first corner $2050_1$ of the top 2038 of the bracket 2037. A second end of the second shape memory alloy wire $2010_2$ is attached to the first anchoring member $2026_1$ and a second end of the third shape memory alloy wire $2010_3$ is attached to the second anchoring member $2026_2$. Similarly, first respective ends of the fourth and first shape memory alloy wires $2010_4$, $2010_1$ are attached to the second corner $2050_2$ of the top 2038 of bracket 2037. A second end of the fourth shape memory alloy wire $2010_4$ is attached to the second anchoring member $2026_2$ and a second end of the first shape memory alloy wire $2010_1$ is attached to the first anchoring member $2026_1$.

Respective static crimps (not shown) are used to attach the respective first ends of the shape memory alloy wires $2010_1$, $2010_2$, $2010_3$, $2010_4$ to the anchoring members $2026_1$, $2026_2$. Respective moving crimps (not shown) are used to attach the respective second ends of the shape memory alloy wires $2010_1$, $2010_2$, $2010_3$, $2010_4$ to the corners $2050_1$, $2050_2$ of the top 2038 of the bracket 2037.

Figure 26:
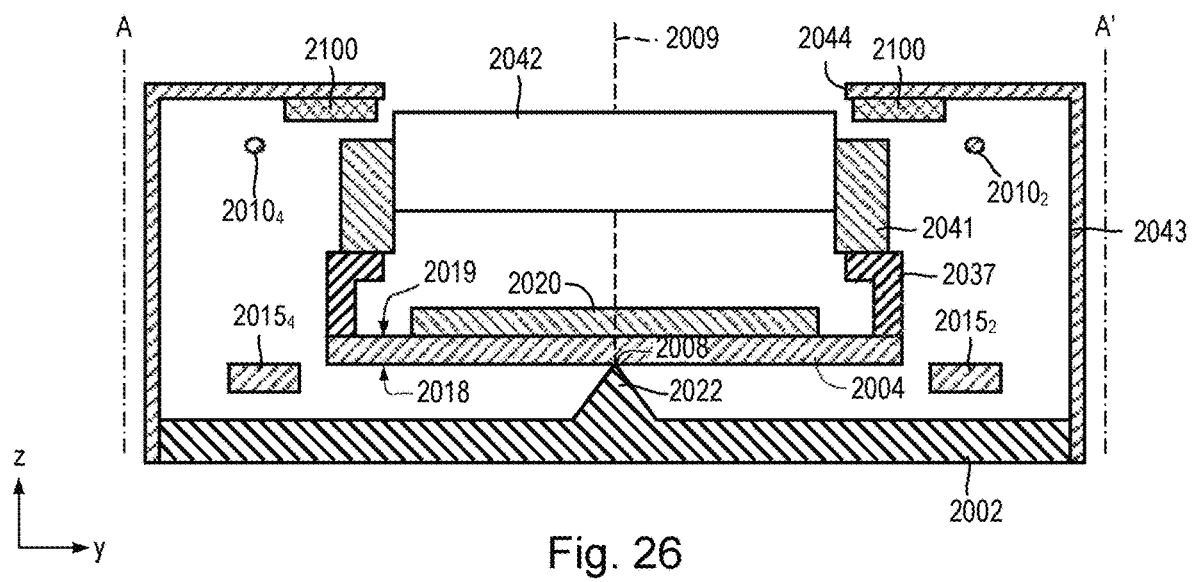
FIG. 26 is a schematic cross-sectional view of the first actuator assembly shown in FIG. 25 taken along the line A-A'.

Referring in particular to FIG. 26, a box-like shielding can 2043 is provided around the bearing arrangement 2003, tiltable part (second part) 2004, SMA wires $2010_1$, $2010_2$, $2010_3$, $2010_4$ lens carriage 2041, and lens assembly 2042. The can 2043 has a central, circular aperture 2044.

—Movement—

Referring still to FIGS. 22 to 26, the first actuator assembly 2001 is able to provide OIS by tilting the tiltable part (second part) 2004.

Different movements are caused by heating and cooling different combinations of the SMA wires $2010_1$, $2010_2$, $2010_3$, $2010_4$. As explained earlier, heating can be caused by driving a current through an SMA wire, which causes the SMA wire to contract.

A change in tilt about a diagonal (e.g., about the line Y=−X) is brought about by increasing the power to, and hence contracting, two adjacent wires, for example, fourth and first wires $2010_4$, $2010_1$ while decreasing the power to, and hence allowing expansion of, the other two wires, in this example, second and third wires $2010_2$, $2010_2$, thereby producing a force on the second part 2004, in this case along the line Y=X.

Suitable tilts can be produced as a linear combination of changes in diagonal tilts.

If the SMA wires $2010_1$, $2010_2$, $2010_3$, $2010_4$ lies A mm above the pivot point 2022 and have a stroke of ±B mm, then the actuator 2001 can produce tilt of ±sin(B/A). For example, when A=1 mm and B=0.09 mm (i.e., 90 μm), then tilt is about ±5°.

Although the first actuator assembly 2001 has been illustrated as using a simple flexure 2013 corresponding to the simple flexure 1008, the simple flexure 2013, or the flexures 2015$_1$, 2015$_2$, 2015$_3$, 2015$_4$ thereof, may alternatively be configured according to any one of the second to eighth simple flexures 1013, 1014, 1022, 1024, 1025, 1029, 1030 (or flexures 1010$_1$, 1010$_2$, 1010$_3$, 1010$_4$ thereof).

If the simple flexure 2013 is configured according to the second to sixth simple flexures 1013, 1014, 1022, 1024, 1025, rotation Rz of the second part 2004 and supported lens assembly 2042 about the primary axis 2009 may be reduced or even prevented. In the specific context of a camera assembly, rotation of lenses 10 of a lens assembly 2042 is preferably avoided because a lens 10 may not be completely symmetric about the optical (primary) axis 2009. Consequently, any rotation about the optical (primary) axis 2009 may introduce aberrations due to such asymmetry of a lens 10. The second to sixth simple flexures 1013, 1014, 1022, 1024, 1025 may be used for the simple flexure 2013 to mitigate or even prevent such aberrations.

Moreover, in some implementations, the simple flexure 2013 may be configured to use flexures 2015$_1$, 2015$_2$, 2015$_3$, 2015$_4$ including compliance improving features 1016 as described hereinbefore in relation to first to fourth flexures 1010$_1$, 1010$_2$, 1010$_3$, 1010$_4$ or the third to eighth simple flexures 1013, 1014, 1022, 1024, 1025, 1029, 1030.

The compliance improving features 1016 may provide the effects and advantages of compliance improving features 1016 described hereinbefore, e.g. may reduce the forces required to be produced by the drive system 2005 in order to tilt the tiltable part (second part) 2004.

Furthermore, there may be additional advantages provided by the compliance improving features. In particular, the first actuator assembly 2001 will include end-stops, e.g. end-step feature 2100 schematically illustrated in FIG. 26 and designed to prevent the second part 2004 from moving (translating and/or rotating) too far off-centre in response to an impact (e.g. after a drop) and damaging e.g. the SMA wires 2010$_1$, 2010$_2$, 2010$_3$, 2010$_4$. The end-stop feature 2100 takes the form of an annular ring depending downwards (with respect to the primary axis 2009) from the inside surface of the shielding can 2043. The annular ring 2100 may be attached to the shielding can 2043, or may be formed as a single piece with the shielding can 2043. The annular ring 2100 is substantially circular and is co-axial with the primary axis 2009. In this way, translation Tz of the second part 2004 along the primary axis 2009 will be limited by the lens carriage 2041 coming into contact with (abutting) the annular ring 2100. Similarly, tilting Rx, Ry of the second part 2004 will be limited by the lens carriage 2041 coming into contact with (abutting) the ring 2101. Further end-stop features (not shown) may be included to limit any possible rotation Rz about the primary axis 2009 and/or any translations Tx, Ty along the first and/or second axes 2011, 2012.

End-stop features such as the annular ring 2100 preferably involve one or more co-operating surfaces on each of the first and second parts 2002, 2004. Using compliance improving features 1016 may help to ensure that flexures 2015$_1$, 2015$_2$, 2015$_3$, 2015$_4$ have sufficient elastic compliance that the flexures 2015$_1$, 2015$_2$, 2015$_3$, 2015$_4$ are not damaged by plastic deformation before one or more end-stops 2100 are reached. This can be particularly important in actuator assemblies such as the first actuator assembly 2001 with a tiltable second part 2004, wherein the normal operating range in relation to tilting involves a relatively large range of movement parallel to the third axis z for each portion of the second part 2004. Hence the relevant end-stops (e.g. the end-stop 2100) need to be configured so as to accommodate this large range of movement parallel to the third axis z. In these circumstances, having flexures with sufficient elastic compliance can be particularly advantageous. In this way, including compliance improving features 1016 in flexures 2015$_1$, 2015$_2$, 2015$_3$, 2015$_4$ may make the first actuator assembly 2001 more robust.

In general, an actuator assembly 2, 2001 and/or the bearing arrangement 2003 thereof, may include one or more end-stops 2100 configured to constrain movement of the second part 4, 2004 relative to the first part 3, 2002 to remain within an allowed volume (not shown). Using compliance improving features 1016, first to fourth flexures, for example flexures 2015$_1$, 2015$_2$, 2015$_3$, 2015$_4$ may be configured so that the mechanical behaviour of the respective flexures 2015$_1$, 2015$_2$, 2015$_3$, 2015$_4$ remains elastic whilst the second part 4, 2004 remains within the allowed volume (not shown). For example, the allowed volume for the first actuator assembly 2001 may be defined by the separation between the lens carriage 2041 and the end-stop 2100, the relative position of the pivot 2008, and the configuration of any further end-stops (not shown). Preferably, at least one end-stop 2100 is configured to constrain movement of the second part 4, 2004 relative to the first part 3, 2002 along the primary axis 2009.

Second Actuator Assembly

The first actuator assembly 2001 concerns tilting the image sensor 2020 and lens assembly 2042 together with the second part 2004, in order to provide "module tilt" OIS. Alternatively, an image sensor may be fixed to a first part whilst a lens, or an assembly of lenses, tilts with a second part to provide OIS Referring also to FIGS. 28 to 32, a second actuator assembly 3001 is shown.

Figure 28:
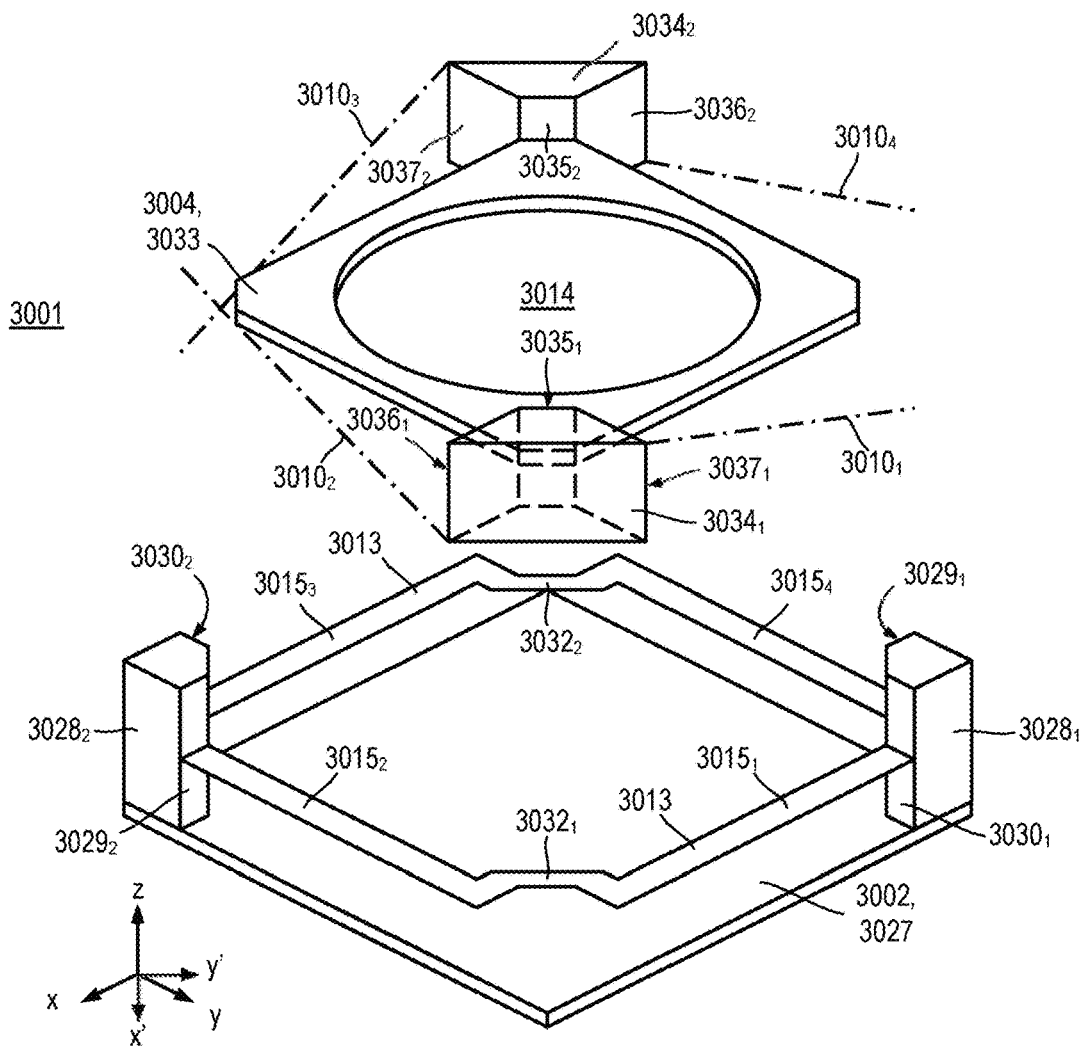
FIG. 28 is a schematic exploded projection view of a second actuator assembly.
Figure 29:
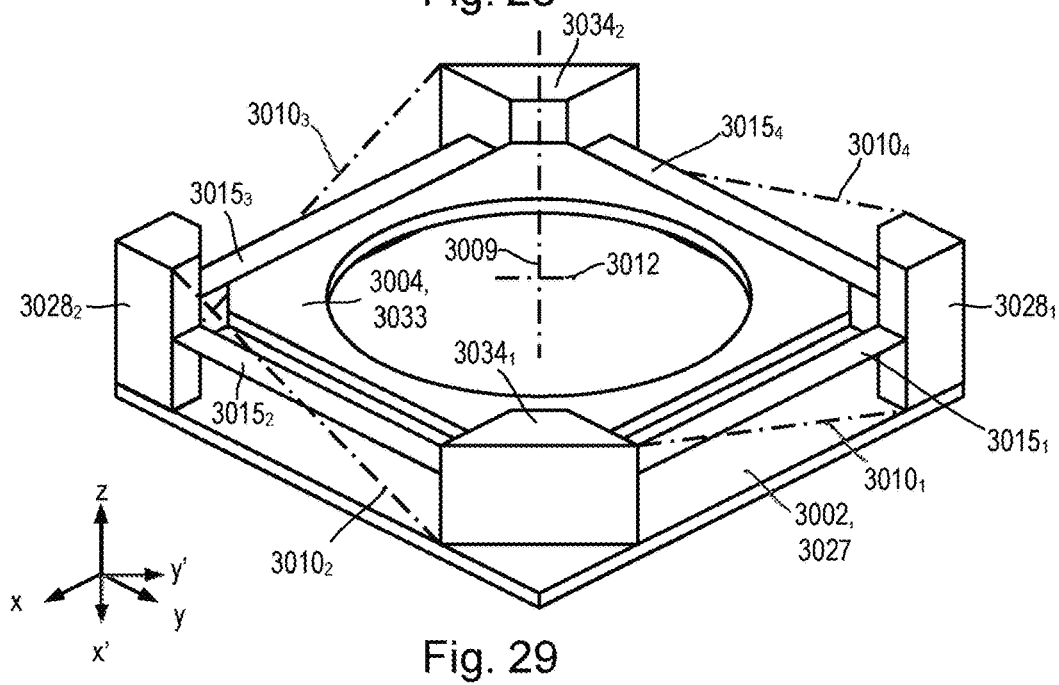
FIG. 29 is a schematic projection view of the second actuator assembly shown in FIG. 28.
Figure 30:
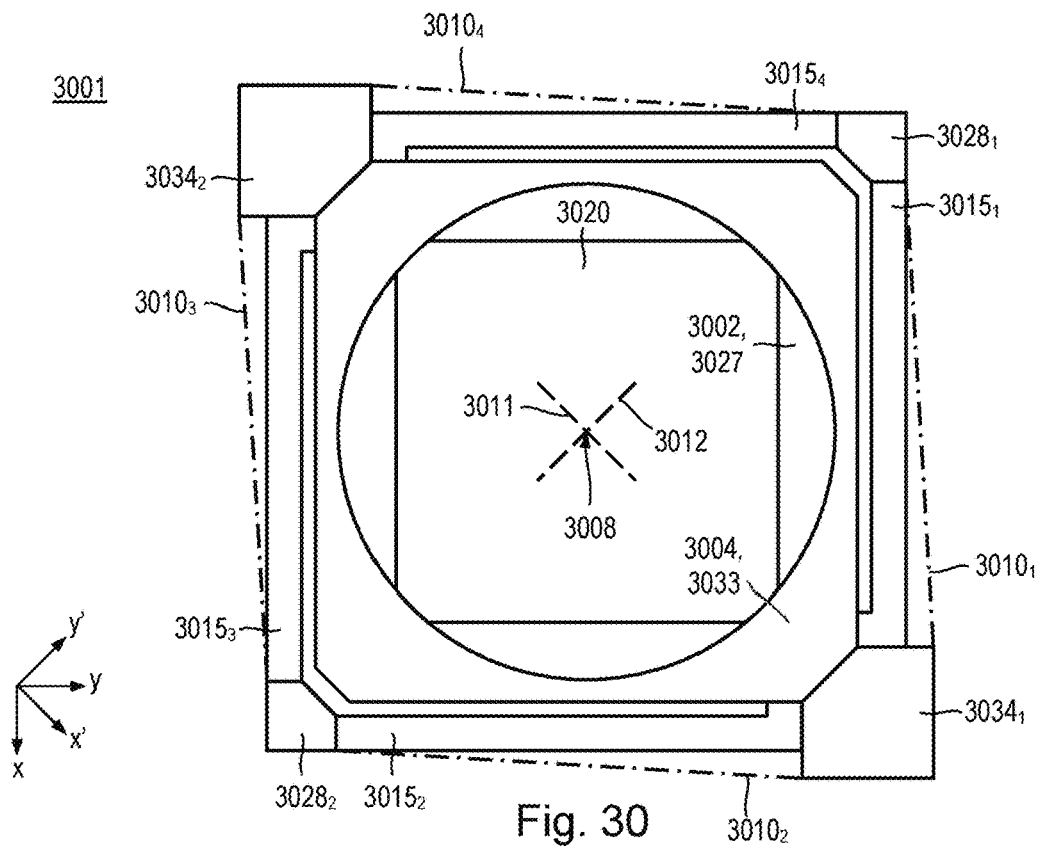
FIG. 30 is a schematic top view of the second actuator assembly shown in FIG. 28.
Figure 31:
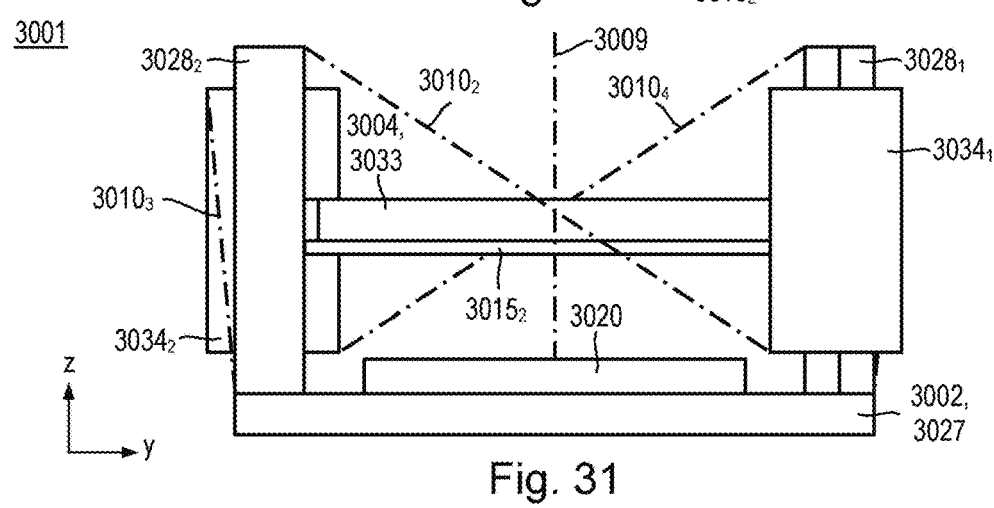
FIG. 31 is a schematic side view of the second actuator assembly shown in FIG. 28.
Figure 32:
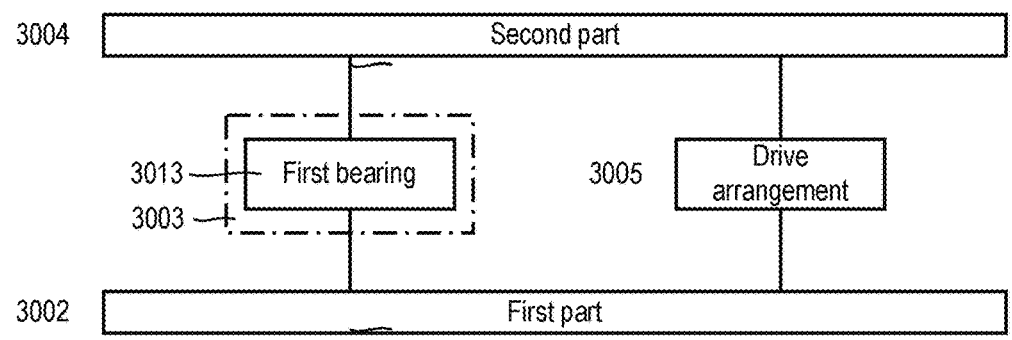
FIG. 32 is a schematic block diagram of the second actuator assembly shown in FIG. 28.

FIG. 28 shows an exploded projection view of the second actuator assembly 3001, FIG. 29 shows a projection view, FIG. 30 is a top view, FIG. 31 is a side view, and FIG. 32 is a schematic.

Referring in particular to FIG. 32, the second actuator assembly 3001 includes a first part 3002 and a second part 3004. A bearing arrangement 3003 mechanically couples the first part 3002 to the second part 3004. The second actuator assembly 3001 also includes a drive system 3005 including a total of four shape memory alloy wires 3010$_1$, 3010$_2$, 3010$_3$, 3010$_4$, coupling the first part 3002 to the second part 3004. In the example shown in FIGS. 28 to 31, the drive system 3005 using angled SMA wires is used, corresponding to the second drive arrangement 20 is used. However, depending on the configuration of the bearing arrangement 3003, a drive system 3005 corresponding to the first drive arrangement 11 could be used instead.

The drive system 3005 and the bearing arrangement 3003 are configured such that the second part 3004 is movable Tz towards or away from the first part 3002 along a primary axis 3009 (or optical axis, parallel to z as drawn in FIGS. 28 to 31) passing through the second actuator assembly 3001, and such that the second part 3004 is tiltable (rotatable) Rx, Ry relative to the first part 3002 (or vice versa) about first and/or second axes 3011, 3012 which are not parallel, which pass through a pivot point 3008, and which are perpendicular to the primary axis 3009. Depending on the specific configuration, the pivot point 3008 may be coincident with the first part 3002, the second part 3002, or offset from both along the primary axis 3009. A tilt Rx, Ry may refer to small rotation, for example a rotation of less than or equal to 10 degrees, 5 degrees, or 1 degree about the respective axis 3011, 3012.

The bearing arrangement 3003 is configured to guide movement Tz of the second part 3004 relative to the first part

3002 along the primary axis 3009, and to guide tilting of the second part 3004 relative to the first part 3002 (or vice versa) about the first axis 3011 and/or the second axis 3012. The bearing arrangement 3003 is also configured to constrain movement Tx, Ty of the second part 3004 relative to the first part 3002 in a plane parallel to the first axis 3011 and/or the second axis 3012, and to constrain rotation Rz of the second part 3004 relative to the first part 3002 about the primary axis 3009.

Referring in particular to FIGS. 28 to 31, one example implementation of the second actuator assembly 3001 is shown in greater detail.

The second actuator assembly 3001 includes a first part 3002 in the form of a rectangular plate 3027. First and second anchoring members 3028$_1$, 3028$_2$ extend upwards (relative to the primary axis z) from diagonally opposed corners of the plate 3027. The plate 3027 and anchoring members 3028$_1$, 3028$_2$ may correspond to the base 21 and pillars 22$_1$, 22$_2$ of a second drive arrangement 20. Each anchoring member 3028$_1$, 3028$_3$ has a cross-section in the form of a rectangle with one corner truncated (or bevelled). Each anchoring member 3028$_1$, 3028$_2$ has a first face 3029 substantially perpendicular to a y axis as drawn and a second face 3030 substantially perpendicular to an x axis as drawn. As shown in FIGS. 30 and 31, an image sensor 3020 may be mounted to the centre of an upper (with respect to the primary axis 3009) surface of the rectangular plate 3027 (first part 3002).

In this example, the bearing arrangement 3003 includes a first bearing 3013 in the form of a modified simple flexure. Similar to the second simple flexure 1013, the first bearing 3013 includes four flexures 3015$_1$, 3015$_2$, 3015$_3$, 3015$_4$. The first flexure 3015$_1$ extends substantially parallel to the x axis (in a positive direction +x) from the second face 3030$_1$ of the first anchoring member 3028$_1$. The second flexure 3015$_2$ extends substantially parallel to the y axis (in a positive direction +y) from the first face 3029$_2$ of the second anchoring member 3028$_2$. The distal ends of the first and second flexures 3015$_1$, 3015$_2$ are connected by a first joint 3032$_1$.

The third flexure 3015$_3$ extends substantially parallel to the x axis (in a negative direction −x) from the second face 3030$_2$ of the second anchoring member 3028$_2$. The fourth flexure 3015$_4$ extends substantially parallel to the y axis (in a negative direction −y) from the first face 3029$_1$ of the first anchoring member 3028$_1$. The distal ends of the third and fourth flexures 3015$_3$, 3015$_4$ are connected by a second joint 3032$_2$.

The second part 3004 takes the form of an annular sheet 3033 having a circular inner perimeter defining a central aperture 3014 and an outer perimeter having the general shape of a rectangle with truncated (or bevelled) corners. The annular sheet 3033 could alternatively be described as having an (irregular) octagonal outer perimeter. The annular sheet 3033 provides a lens carriage 3041 for mounting one or more lenses 10 or a lens assembly (not shown). The annular sheet 3033 is fixed to the joints 3032$_1$, 3032$_2$ of the first bearing 3013, for example by welding, adhesive, or other suitable attachment methods. When assembled, the first and third flexures 3015$_1$, 3015$_3$ bracket the annular sheet 3033 along the y axis as drawn, whilst the second and fourth flexures 3015$_2$, 3015$_4$ bracket the annular sheet 3033 along the x axis as drawn.

First and second wire coupling structures 3034$_1$, 3034$_2$ extend from diagonally opposed corners of the annular sheet 3033 (second part 3004). When the second actuator assembly 3001 is assembled, the wire coupling structures 3034$_1$, 3034$_2$ will corresponding to corners not occupied by the anchoring members 3028$_1$, 3028$_2$. Each wire coupling structure 3034$_1$, 3034$_2$ takes the form of a pillar extending both above and below (relative to the primary axis z) the annular sheet 3033. The wire coupling structures 3034$_1$, 3034$_2$ take the form of a trapezoidal prisms oriented with the trapezoidal cross sections perpendicular to the primary axis 3009. Each wire coupling structure 3034$_1$, 3034$_2$ includes an inner face 3035 corresponding to the shorter of the parallel trapezium sides, a first face 3036 corresponding to an angled side substantially perpendicular to the y axis as drawn, and a second face 3037 corresponding to an angled side substantially perpendicular to the x axis as drawn. Other shapes of wire coupling structures 3034$_1$, 3034$_2$ providing the same functions may be used instead of the illustrated trapezoidal prisms. Note that dashed lines outlining structures occluded by the first wire coupling structure 3034$_1$ are shown in FIG. 28 for visual purposes.

Once the annular sheet 3033 has been fixed to the joints 3032$_1$, 3032$_2$, the first SMA wire 3010$_1$ is connected from an upper region (relative to the primary axis 3009) of the second face 3037$_1$ of the first wire coupling structure 3034$_1$ to a lower region (relative to the primary axis 3009) of the second face 3030$_1$ of the first anchoring member 3028$_1$. The second SMA wire 3010$_2$ is connected from a lower region (relative to the primary axis 3009) of the first face 3036$_1$ of the first wire coupling structure 3034$_1$ to an upper region (relative to the primary axis 3009) of the first face 3029$_2$ of the second anchoring member 3028$_2$. The third SMA wire 3010$_3$ is connected from an upper region (relative to the primary axis 3009) of the second face 3037$_2$ of the second wire coupling structure 3034$_2$ to a lower region (relative to the primary axis 3009) of the second face 3030$_2$ of the second pillar 3028$_2$. The fourth SMA wire 3010$_4$ is connected from a lower region (relative to the primary axis 3009) of the first face 3036$_2$ of the second wire coupling structure 3034$_2$ to an upper region (relative to the primary axis 3009) of the first face 3029$_1$ of the first anchoring member 3028$_1$. This arrangement corresponds to a drive system 3005 which is equivalent to the second drive arrangement 20.

The drive system 3005 may cause movement Tz of the second part 3004 towards the first part 3002 along the primary axis 3009 by contracting the first and third SMA wires 3010$_1$, 3010$_3$ to provide a net downward force. Similarly, the drive system 3005 may cause movement Tz of the second part 3004 away from the first part 3002 along the primary axis 3009 by contracting the second and fourth SMA wires 3010$_2$, 3010$_4$ to provide a net upward force. In either case, a torque about the primary axis 3009 is also generated, but a rotation Rz about the primary axis z is constrained by the rigid connection of the flexures 3015$_1$, 3015$_2$, 3015$_3$, 3015$_4$ to the annular sheet 3033. Such combinations of contractions do not apply net torque about the first or second tilt axes 3011, 3012.

The drive system 3005 may cause tilting Rx', Ry' about first and/or second tilt axes 3011, 3012, which correspond to rotated axes x', y' as drawn. The rotated axes x', y', z as drawn are rotated 45 degrees anti-clockwise (counter-clockwise) about the primary axis 3009 compared to the axes x, y, z shown in FIGS. 28 to 31 and referred to when describing the geometry of the second actuator assembly 3001.

The first and second SMA wires 3010$_1$, 3010$_2$ may be contracted to cause clockwise tilting Rx' of the second part 3004 relative to the first part 3002 about the first tilt axis 3011 (parallel to the x' axis as drawn). Similarly, the third and fourth SMA wires 3010$_3$, 3010$_4$ may be contracted to cause anti-clockwise tilting Rx' of the second part 3004 relative to the first part 3002 about the first tilt axis 3011 (parallel to the x' axis as drawn). In either case, there is no net force along the primary axis 3009.

The second and third SMA wires $3010_2$, $3010_3$ may be contracted to cause clockwise tilting Ry' of the second part 3004 relative to the first part 3002 about the second tilt axis 3012 (parallel to the y' axis as drawn). Similarly, the first and fourth SMA wires $3010_1$, $3010_4$ may be contracted to cause anti-clockwise tilting Ry' of the second part 3004 relative to the first part 3002 about the second tilt axis 3012 (parallel to the y' axis as drawn). In either case, there is no net force along the primary axis 3009.

The tilting Rx', Ry' is about an implied (or virtual) pivot point 3008 (see FIG. 30) at the centre of the first to fourth flexures $3015_1$, $3015_2$, $3015_3$, $3015_4$. A general motion may be broken down in components Rx', Ry', Tz of these motions.

In this way, the second actuator assembly 3001 may provide an OIS function based on tilting Rx', Ry' about the first and/or second tilt axes 3011, 3012, and an AF function based on the translation Tz along the primary axis 3009, using a drive system 3005 including a total of four SMA wires $3010_1$, $3010_2$, $3010_3$, $3010_4$. The OIS and AF functions may be substantially independent, across at least part of a range of motion.

Although explained with reference to the specific example shown in FIGS. 28 to 31, the second actuator assembly 3001 may be varied through a large number of permutations to provide the same functionality.

Although the second actuator assembly 3001 has been explained with the plate 3027 (first part 3002) corresponding to a support structure 4 of a camera and the annular sheet 3033 (second part 3004) corresponding to a lens carriage 9 of a lens assembly 3, the roles may be reversed so that the first part 3002 corresponds to a lens carriage 9 and the second part 3004 provides a support structure 4. Equally, the second actuator assembly 3001 need not be restricted to use in a camera 1, and the first and second parts 3002, 3004 may be any parts requiring the relative motions Rx, Ry and/or Tz.

The plate 3027 and the sheet 3033 may each take the form of respective patterned sheets of metal, e.g., etched or machined stainless steel, and may be coated with an electrically-insulating dielectric material. Either or both of the plate 3027 and the sheet 3033 may be provided with a respective central aperture 3014.

Although the second actuator assembly 3001 has been illustrated as using a first bearing 3013 corresponding to the second simple flexure 1013, the first bearing 3013, or the flexures $3015_1$, $3015_2$, $3015_3$, $3015_4$ thereof, may alternatively be configured according to any one of the simple flexure 1008 or the third to eighth simple flexures 1014, 1022, 1024, 1025, 1029, 1030 (or flexures $1010_1$, $1010_2$, $1010_3$, $1010_4$ thereof).

If the first flexure 3013 is configured according to the second to sixth simple flexures 1013, 1014, 1022, 1024, 1025, rotation of the second part 3004 and a supported lens assembly (not shown) may be reduced or prevented, providing the advantages described hereinbefore in relation to the first actuator assembly 2001.

In some implementations, the first flexure 3013 may be configured to use flexures $3015_1$, $3015_2$, $3015_3$, $3015_4$ including compliance improving features 1016 as described hereinbefore in relation to first to fourth flexures $1010_1$, $1010_2$, $1010_3$, $1010_4$ of the third to eighth simple flexures 1013, 1014, 1022, 1024, 1025, 1029, 1030. The inclusion of compliance improving features 1016 may provide any or all of the effects and advantages of compliance improving features 1016 described hereinbefore in relation to the third to eighth simple flexures 1013, 1014, 1022, 1024, 1025, 1029, 1030 and/or the first actuator assembly 2001.

Providing OIS and AF functions using a single drive system 3005 including a total of four SMA wires $3010_1$, $3010_2$, $3010_3$, $3010_4$, and requiring no fifth or further SMA wires may advantageously reduce the complexity and/or power consumption of a second actuator assembly 3001 for a camera 1. Moreover, a second drive arrangement, whether based on SMA wires or other technologies, is neither included nor necessary. Combined AF and OIS may reduce costs of parts, assembly and/or testing. The robustness of the bond/coupling between OIS and AF functions may also be improved. Furthermore, moving electrical connections between a static part and a separate AF drive system moving with the OIS actuation are not required.

An additional advantage of a combined AF and OIS system is that the second actuator assembly 3001 could potentially be controlled from the output of a single three-axis hall sensor. Such a sensor may be mounted on a static section of the second actuator assembly 3001 (either the first or second part 3002, 3004 depending on the configuration) to avoid potential hysteresis in rotation restraining lens carriage rotation. For example, a magnet (not shown) could be mounted to the first part 3002 and a three-axis hall sensor (not shown) could be mounted to the second part 3004 in the example shown in FIGS. 28 to 31.

Side Assembly of an SMA Actuator

In order to minimise the disruption to the existing supply chains of actuator manufacturers and camera manufacturers, it may be desirable that a module tilt actuator be designed as a cradle that holds and tilts an complete camera module (i.e. at least an image sensor and associated lens(es)). This configuration may involve the actuator being placed around, e.g. on the sides of, the camera module.

Additionally, crimping (or otherwise attaching) SMA wires (e.g. 14, 2010, 3010) to a fully assembled actuator may be undesirable as this tends to make the crimping machinery more complex.

Figure 35:
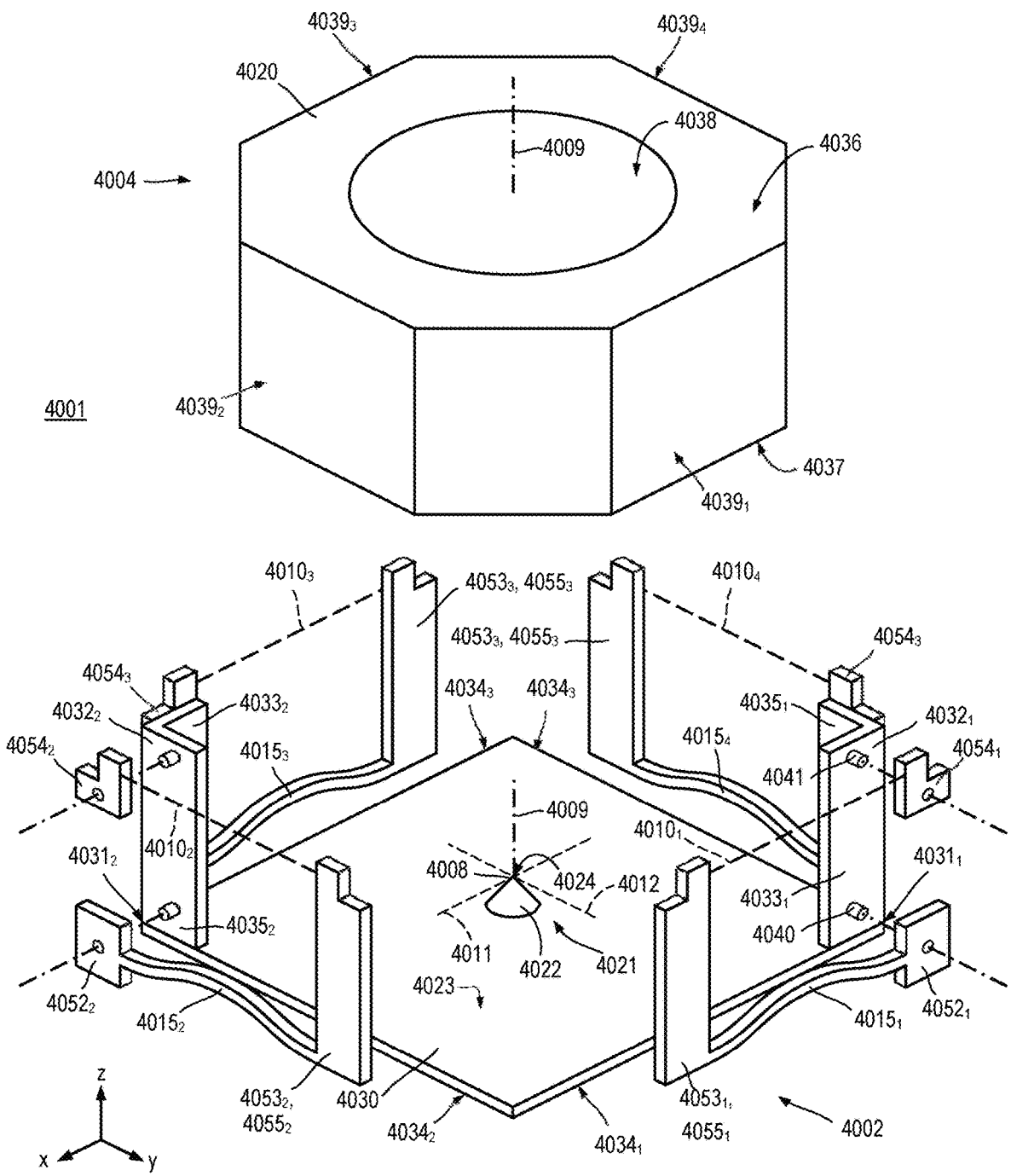
FIG. 35 is a schematic exploded projection view of a third actuator assembly including the modified crimp arrangement and modified flexure arrangement shown in FIG. 33.

The specification describes hereinafter an approach for simplifying fabrication of an SMA actuator assembly using crimp arrangements 4050 (FIG. 33) and flexure arrangements 4051 (FIG. 33) that are attached on the sides of a part, for example a camera module 4020 (FIG. 35). Crimp arrangements 4050 (FIG. 33) include or support a static crimp and a moving crimp. Flexure arrangements 4051 include or support a flexure arm which spans between a first (static) part and a second (moving) part. The SMA wire is crimped so as to be offset from the flexure arm along the z axis to enable generation of tilt motion, as described hereinbefore. Preferably but not essentially, the flexure arm of each flexure arrangement 4051 (FIG. 33) may include added longitudinal compliance compared to a straight beam, for example by including one or more compliance improving features 1016.

Figure 33:
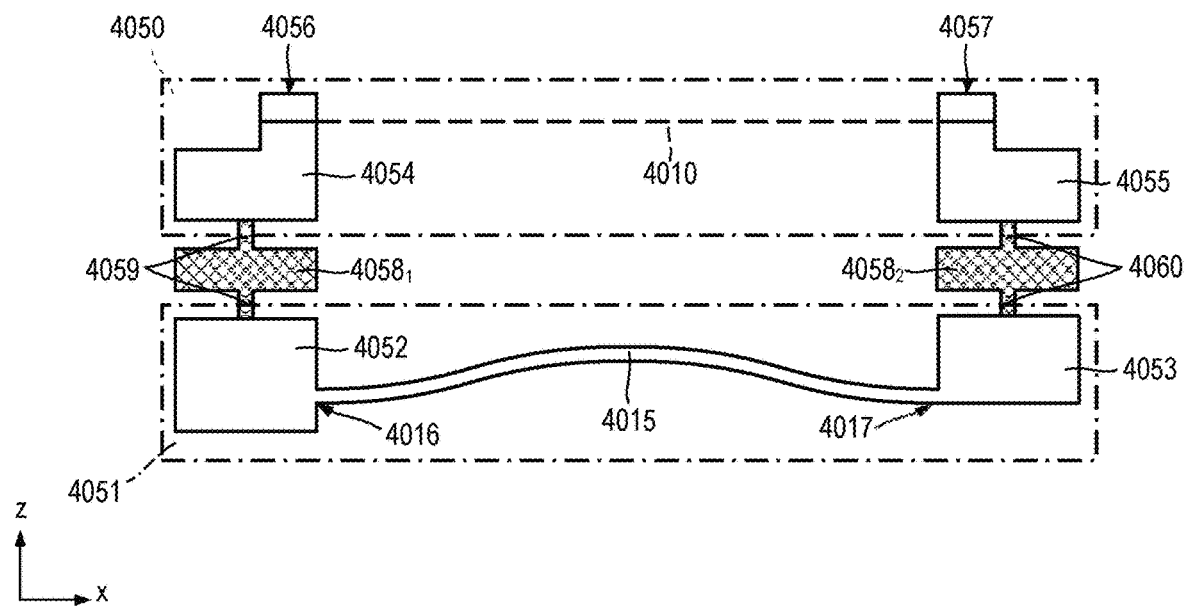
FIG. 33 is a schematic side view of a crimp arrangement and a flexure arrangement.

The use of simple flexures 1008, 1013, 1014, 1022, 1024, 1025, 1029, 1030, 2013, 3013 in bearing arrangements 2003, 3003 of SMA actuators 2001, 3001 may is well suited to approaches to assembling an SMA actuator using crimp arrangements 4050 and flexure arrangements 4051 (FIG. 33).

Referring also to FIGS. 33 to 37, a fabrication method (side assembly method) shall be described in relation to a third SMA actuator 4001.

The side assembly method utilises crimp arrangements 4050 to which SMA wires 4010 may be pre-crimped prior to connection between first and second parts 4002, 4004. The side assembly method also utilises flexure arrangements 4051 connected between first and second parts 4002, 4004.

Referring in particular to FIG. 33, a crimp arrangement 4050 and a flexure arrangement 4051 are shown.

The flexure arrangement 4051 includes a first portion 4052 and a second portion 4053. The crimp arrangement 4050 includes a third portion 4054 and a fourth portion 4055.

The first and third portions 4052, 4054 are separated by a first intermediate portion $4058_1$. The first intermediate portion $4058_1$ is connected between the first and third portions 4052, 5054 by first frets 4059. Similarly, the second and fourth portions 4053, 5055 are separated by a second intermediate portion $4058_2$. The second intermediate portion $4058_2$ is connected between the second and fourth portions 4053, 4055 by second frets 4060.

The first to fourth portions 4052, 4053, 4054, 4055 form a single piece during crimping of the SMA wire 4010 and attachment to the first and second parts 4002, 4004. However, once attached, the frets 4059, 4060 may be severed to detach the intermediate portions $4058_1$, $4058_2$ and divide the first to fourth portions 4052, 4053, 4054, 4055 into separate pieces.

In other examples, the first to fourth portions 4052, 4053, 4054, 4055 may be initially connected to each other by some other structure, for example by being connected via respective frets to a frame (not shown).

In still further examples, the first and second portions 4052, 4053 may be initially connected to a first frame (not shown) by respective frets, whilst the third and fourth portions 4054, 4055 are initially connected to a second frame (not shown) by respective frets. In this way, the first and second portions 4052, 4053 and the connecting flexure 4015 may be formed from one material, whilst the third and fourth portions 4054, 4055 and supported crimps 4056, 4057 may be formed from a second, different material. An advantage of this latter option is that it allows separate material choices for the flexure 4015 and the crimps 4056, 4057. For example, the flexure 4015 and the crimps 4056, 4057 may have differing requirements for yield stress, plasticity and so forth.

The first and third portions 4052, 4054 are both for connection to the first part 4002 when the third actuator assembly 4001 is assembled. The third portion 4054 supports a first crimp 4056 (static crimp). The second portion 4053 is connected to the first portion 4052 by an elongate flexure 4015. The fourth portion 4055 supports a second crimp 4057 (moving crimp). The second and fourth portions 4053, 4055 are for connection to the second part 4004 when the third actuator assembly 4001 is assembled. The flexure 4015 has a first end 4016 connected to the first portion 4052 and a second end 4017 connected to the second portion 4053. The flexure 4015 includes a compliance improving feature 1016 in the form of a curved portion (similar in design to the flexures $1010_1$, $1010_2$, $1010_3$, $1010_4$ of the fifth simple flexure 1024). A length of shape memory alloy wire 4010 is connected between the first and second crimps 4056, 4057.

The first, second, third and fourth portions 4052, 4053, 4054, 4055 and the flexure 4015 may be separate pieces which have been attached together, but are preferably formed as a single piece. For example, by etching (chemical or laser) or stamping the required shapes from a blank sheet of metal, for example stainless steel or aluminium alloy. Etching is preferred, although stamping may be used provided that neither of the resulting crimp arrangement 4050 and the flexure arrangement 4051 is left with excessive residual strains.

Each first crimp 4056 may be formed as a single piece with the corresponding third portion 4054, for example by folding over an extension of the second portion 4054. Similarly, each second crimp 4057 may be formed as a single piece with the corresponding fourth portion 4055.

However, in some implementations, the first and second crimps 4056, 4057 may be separate parts which are attached to the respective third and fourth portions 4054, 4055, for example by welding. An advantage of this latter option is that it allows separate material choices for the flexure 4015 and the crimps 4056, 4057. For example, the flexure 4015 and the crimps 4056, 4057 may have differing requirements for yield stress, plasticity and so forth.

The SMA wire 4010 is offset along the z axis as drawn, which will correspond to an offset along the optical, or primary, axis 4009 when the third actuator assembly 4001 is assembled.

When assembled into the third actuator assembly 4001, the second and fourth portions 4053, 4055 may be electrically connected, such that the flexure 4015 may provide a current return path for the SMA wire 4010.

Figure 34:
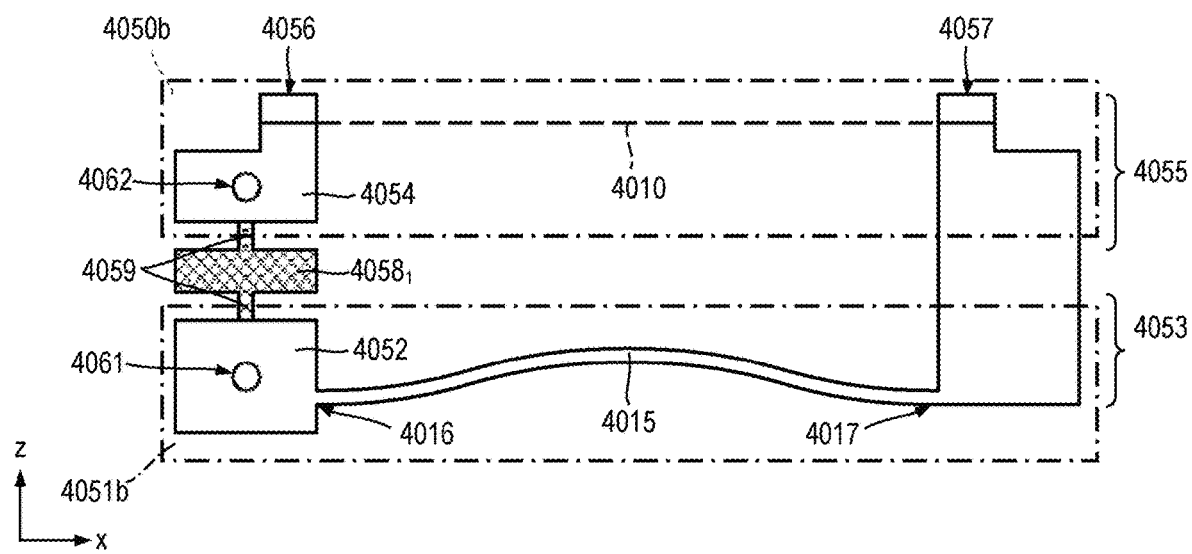
FIG. 34 is a schematic side view of a modified crimp arrangement and a modified flexure arrangement.

Referring also to FIG. 34, a modified crimp arrangement 4050b and a modified flexure arrangement 4051b are shown.

The modified crimp arrangement 4050b and a modified flexure arrangement 4051b are the same as the crimp arrangement 4050 and the flexure arrangement 4051, except that the second and fourth portions 4053, 4055 are formed as a single piece, instead of being separated by the second intermediate portion $4058_2$. In this way, the second and fourth portions 4053, 4055 are electrically connected without the need for additional connections in order for the flexure 4015 to provide a current return path for the SMA wire 4010.

Additionally or alternatively, in some implementations the first and third portions 4052, 4054 may be formed as a single piece.

In either of crimp arrangement 4050 and the flexure arrangement 4051, or the modified crimp arrangement 4050b and the modified flexure arrangement 4051b, the first portion 4052 may optionally include one or more first through-holes 4061 and/or the third portion 4054 may optionally include one or more second through-holes 4062. The first and second through holes 4061, 4062 may help with attachment to the first part 4002.

Third Actuator Assembly

Figure 36:
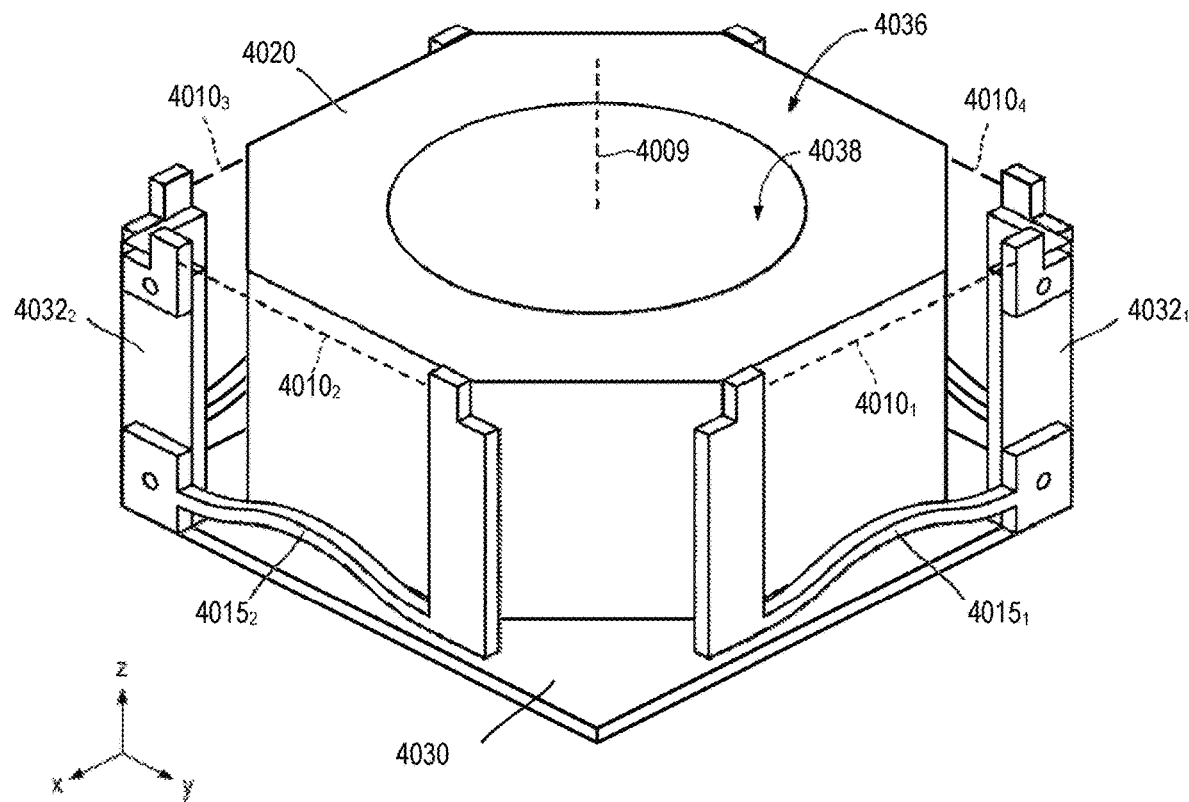
FIG. 36 is a schematic projection view of the third actuator assembly shown in FIG. 35.
Figure 37:
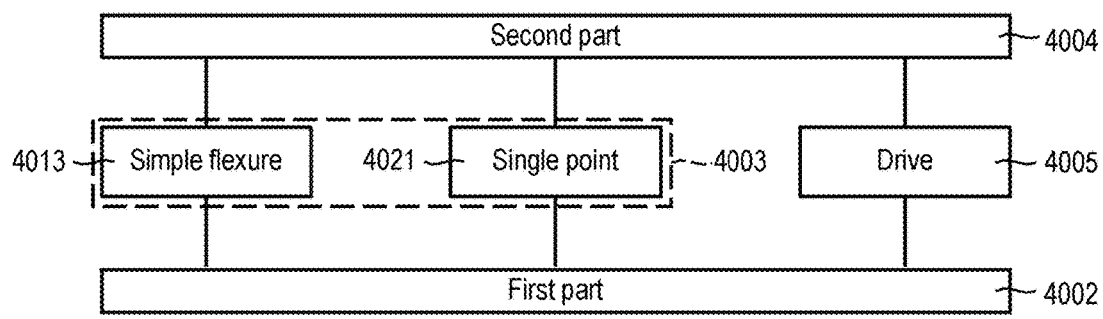
FIG. 37 is a schematic block diagram of the third actuator assembly shown in FIG. 35.

Referring in particular to FIGS. 35 to 37, the third actuator assembly 4001 is shown.

The third actuator assembly 4001 includes a first part 4002 and a second part 4004. A bearing arrangement 4003 supports the second part 4004 on the first part 4002. The first and second parts 4002, 4005 are also coupled together by a drive system 4005.

The first part 4002 includes a flat rectangular plate (or base) 4030 having first and second diagonally opposed corners $4031_1$, $4031_2$. A first wall $4032_1$ is upstanding from the first corner $4031_1$, and includes a first section $4033_1$ extending from the first corner $4031_1$ partway along a first edge $4034_1$ of the plate 4030. The first and third edges $4034_1$, $4034_3$ are parallel with the x axis as drawn, whilst the second and fourth edges $4034_2$, $4034_4$ are parallel with the y axis as drawn. The first wall $4032_1$ also includes a second section $4035_1$ extending from the first corner $4031_1$ partway along the fourth edge $4034_4$ of the plate 4030. A second wall $4032_2$ is upstanding from the second corner $4031_2$, and includes a first section $4033_2$ extending from the second corner $4031_2$ partway along the third edge $4034_3$, and a second section $4035_2$ extending from the second corner $4031_2$ partway along the second edge $4034_2$. The first and second walls $4032_1$, $4032_2$ are preferably formed from a non-conductive material, for example any engineering polymer, in order to allow the flexures $4015_1$, $4015_2$, $4015_3$, $4015_4$ to act as return paths for the respective SMA wires $4010_1$, $4010_2$, $4010_3$, $4010_4$.

The second part 4004 takes the form of a camera module 4020 including an image sensor (not shown) and one or more lenses (not shown). The camera module 4020 may optionally include an AF system. The camera module 4020 has an upper face 4036 facing away from the plate 4030, and a lower face 4037. A central aperture 4038 is provided in the upper face 4036 to allow light into the camera module 4020. A primary axis 4009 extends through the camera module 4020 and coincides with an optical axis of the camera module 4020. The camera module 4020 also has first to fourth side surfaces $4039_1$, $4039_2$, $4039_3$, $4039_4$ which are parallel to the primary axis 4009. The first and third side surfaces $4039_1$, $4039_3$ are parallel to the x axis as drawn and the second and fourth side surfaces $4039_2$, $4039_4$ are parallel to the y axis as drawn.

First to fourth modified crimp arrangements $4050b_1$, $4050b_2$, $4050b_3$, $4050b_4$ connect the first part 4002 to the second part 4004. First to fourth modified flexure arrangements $4051b_1$, $4051b_2$, $4051b_3$, $4051b_4$ also connect the first part 4002 to the second part 4004.

A first modified crimp arrangement $4050b_1$ is connected between the first portion $4033_1$ of the first wall $4032_1$ and the camera module 4020, so that the corresponding first SMA wire $4010_1$ runs substantially parallel to the first and third edges $4034_1$, $4034_3$. The first portion $4052_1$ of the first modified flexure arrangement $4051b_1$ is connected to the first portion $4033_1$ of the first wall $4032_1$, for example by welding or gluing. Optionally, the first portion $4033_1$ of the first wall $4032_1$ may include a first protrusion 4040 for receipt into a corresponding first through-hole 4061 of the first portion $4052_1$. The third portion $4054_1$ of the first modified crimp arrangement $4050b_1$ is connected to the first portion $4033_1$ of the first wall $4032_1$, for example by welding or gluing. Optionally, the first portion $4033_1$ of the first wall $4032_1$ may include a second protrusion 4041 for receipt into a corresponding second through-hole 4062 of the third portion $4054_1$. The second and fourth portions $4053_1$, $4055_1$ of the first modified crimp arrangement $4050b_1$ and the first modified flexure arrangement $4051b_1$ are connected to the first side surface $4039_1$ of the camera module 4020, for example by welding or gluing.

Similarly, the second crimp modified arrangement $4050b_2$ and the second modified flexure arrangement $4051b_2$ are connected between the second portion $4035_2$ of the second wall $4032_2$ and the second side surface $4039_2$ of the camera module 4020, so that the corresponding second SMA wire $4010_2$ runs parallel to the second and fourth edges $4034_2$, $4034_4$. The third modified crimp arrangement $4050b_3$ and the third modified flexure arrangement $4051b_3$ are similarly connected between the first portion $4033_2$ of the second wall $4032_2$ and the third side surface $4039_3$ of the camera module 4020, so that the corresponding third SMA wire $4010_3$ runs parallel to the first and third edges $4034_1$, $4034_3$. The fourth crimp arrangement $4050b_4$ and the fourth flexure arrangement $4051b_4$ are connected between the second portion $4035_1$ of the first wall $4032_1$ and the fourth side surface $4039_4$ of the camera module 4020, so that the corresponding fourth SMA wire $4010_4$ runs parallel to the second and fourth edges $4034_2$, $4034_4$.

The bearing arrangement 4003 includes a simple flexure 4013 formed from first to fourth flexures $4015_1$, $4015_2$, $4015_3$, $4015_4$ corresponding to the first to fourth modified flexure arrangements $4051b_1$, $4051b_2$, $4051b_3$, $4051b_4$. The simple flexure 4013 is essentially similar to the fifth simple flexure 1024, with the outer annulus 1015 exchanged for the first part 4002, the central portion 1009 exchanged for the second part 4004, and each of the flexures $1010_1$, $1010_2$, $1010_3$, $1010_4$ rotated to lie in respective planes which are parallel to the z axis as drawn.

The bearing arrangement 4003 also includes a pivot bearing 4021 substantially the same as hereinbefore described with reference to FIGS. 18 and 19A to 19D.

The pivot bearing 4021 includes a member 4022 (or "protrusion") upstanding from an upper face 4023 of the plate 4030 (first part 4002) which serves as a base for the pivot. In some examples, the pivot bearing 4021 may include a separate base which is supported by the plate 4030 (first part 4002).

The protrusion 4022 has a distal end 4024 which contacts the camera module 4020 (second part 4004), in particular, a point (or area) of contact on the lower surface 4037. The distal end 4024 of the protrusion 4022 and contact point define the pivot point 4008. The pivot point 4008 lies on the primary axis 4009, and first and second tilt axes 4011, 4012 pass through the pivot point 4008. The first and second axes 4011, 4012 are not parallel, are perpendicular to the primary axis 4009.

The modified flexure arrangements $4051b_1$, $4051b_2$, $4051b_3$, $4051b_4$ may be connected between the first and second parts 4002, 4004 such that the flexures $4015_1$, $4015_2$, $4015_3$, $4015_4$ are slightly strained and urge the contact point on the lower surface 4037 of the camera module 4020 into contact with the distal end 4024.

The bearing arrangement 4003 (the simple flexure 4013 and pivot bearing 4021) supports the second part 4004 on the first part 4002 so that the second part 4004 (camera module 4020) is tiltable about the first and/or second axes 4011, 4012, in the same way described hereinbefore for the first and second parts 2002, 2004 of the first actuator assembly 2001.

The drive system 4005 includes the first to fourth SMA wires $4010_1$, $4010_2$, $4010_3$, $4010_4$ corresponding to the first to fourth modified crimp arrangements $4050b_1$, $4050b_2$, $4050b_3$, $4050b_4$. The drive system 4005 corresponds to the first (coplanar) drive arrangement 11, yet is able to generate tilting of the camera module 4020 due to the offset between the pivot point 4008 and the first to fourth SMA wires $4010_1$, $4010_2$, $4010_3$, $4010_4$ along the primary axis 4009.

The drive system 4005 and the bearing arrangement 4003 operate together to generate tilting of the second part 4004 (camera module 4020) relative to the first part 4002 (plate 4030) about the first and/or second tilt axes 4011, 4012, in substantially the same way described hereinbefore in relation to the first actuator assembly 2001.

The third actuator assembly 4001 has been described using flexures 4015 having a compliance feature 1016 in the form of a curved portion, corresponding to the flexures 1010 of the fifth simple flexure 1024. However, any compliance feature 1016 described hereinbefore may be used instead, for example, an elbow as used in the third simple flexure 1014, a hairpin-shaped portion 1023 as used in the fourth simple flexure 1022, the alternative curved portion used in the sixth simple flexure 1025, or any other feature 1016 satisfying the requirements outlined hereinbefore. Alternatively, the flexures 4015 need not include any compliance improving feature 1016, and may take the form of simple, straight beams.

The third actuator assembly 4001 has been described such that the first and third flexures $4015_1$, $4015_3$ run in a first sense about the primary axis 4009 whilst the second and fourth flexures $4015_2$, $4015_4$ run in a second, opposite sense about the primary axis 4009 (see the second simple flexure 4013 in FIG. 9). However, this is not essential, and alternatively, all of the first to fourth flexures $4015_1$, $4015_2$, $4015_3$, $4015_4$ may run in the same sense about the primary axis 4009 (see the simple flexure 1008 in FIG. 8A).

The third actuator assembly 4001 has been described as including four modified crimp arrangements 4050b and four modified flexure arrangements 4051b. However, one, some or all of the modified crimp arrangements 4050b and modified flexure arrangements 4051b may be swapped for crimp arrangements 4050 and flexure arrangements 4051. The first and third portions 4052, 4054 may be separated in the finished third actuator assembly 4001 by severing the respective first frets 4059. The second and fourth portions 4053, 4055 may be separated in the finished third actuator assembly 4001 by severing the respective second frets 4060.

In order to assemble the third actuator assembly 4001, the first to fourth SMA wire $4010_1$, $4010_2$, $4010_3$, $4010_4$ are crimped to first to fourth corresponding crimp arrangements $4050_1$, $4050_2$, $4050_3$, $4050_4$, or modified crimp arrangements $4050b_1$, $4050b_2$, $4050b_3$, $4050b_4$. Subsequently, each of the first to fourth crimp arrangements $4050_1$, $4050_2$, $4050_3$, $4050_4$, or modified crimp arrangements $4050b_1$, $4050b_2$, $4050b_3$, $4050b_4$, is connected between the first part 4002 and the second part 4004 as described hereinbefore.

When each crimp arrangement 4050, 4050b is initially connected to the corresponding flexure arrangement 4051, 4051b, the flexure arrangements 4051, 4051b are connected between the first part 4002 and the second part 4004 along with the crimp arrangements 4050, 4050b. However, when each crimp arrangement 4050, 4050b supplied separately to the corresponding flexure arrangement 4051, 4051b, the flexure arrangements 4051, 4051b may be connected between the first part 4002 and the second part 4004 during a separate from to connection of the crimp arrangements 4050, 4050b.

Although the SMA wires 4010 are preferably crimped to the crimp arrangements 4050, 4050b prior to assembly, it is equally possible to connect the crimp arrangements 4050, 4050b to the first and second parts 4002, 4004 before crimping the SMA wires 4010 into position.

The third actuator assembly 4001 may be fabricated using a different type of connection assembly, for example:

The first and third portions 4052, 4054 may be formed as a single piece. In such an example, the crimp arrangement 4050, 4050b and flexure arrangement 4051, 4051b are preferable configured such that the flexure 4015 does not short-circuit the length of SMA wire 4010.

Alternatively or additionally, the second and fourth portions 4053, 4055 may be formed as separate pieces in the final assembly (although they may be initially connected to each other in a similar way to the first and third portions 4052, 4054, e.g. using the second intermediate portion $4058_2$). Where the first and third portions 4052, 4054 as well as the second and fourth portions 4053, 4055 are formed as separate pieces, each crimp arrangement 4050, 4050b is effectively separate from the corresponding flexure arrangement 4051, 4051b, such that each crimp arrangement 4050, 4050b may be connected between the first and second parts 4002, 4004 independently of the corresponding flexure arrangement 4051, 4051b.

Alternatively or additionally, the second portion 4053 may be connected to a different surface of the second part 4004, e.g. the lower surface 4037, whilst the corresponding fourth portion 4055 remains attached to a side surface 4039. Where the second and fourth portions 4053, 4055 are formed as a single piece, this may be achieved by forming (bending) the single piece such that, for example, the second and fourth portions 4053, 4055 lie in orthogonal planes. The first and third portions 4052, 4054 may have a similar configuration. As will be appreciated, such configurations may be more easily achieved if the first and third portions 4052, 4054 as well as the second and fourth portions 4053, 4055 are formed as separate pieces.

Although described in relation to the third actuator assembly 4001, the side assembly method using (preferably pre-crimped) crimp arrangements 4050 4050b and corresponding flexure arrangements 4051, 4051b may be readily adapted for use in fabrication of the first SMA actuator 2001 and/or the second SMA actuator 3001.

Carriage/Base Plate Sub-Assembly

In the actuator assemblies 2001, 3001 described hereinbefore, each SMA wire $2010_1$, $2010_2$, $2010_3$, $2010_4$, $3010_1$, $3010_2$, $3010_3$, $3010_4$ is held between a pair of crimps, one crimp attached (directly or indirectly) to one part of the SMA actuator assembly (e.g., the first part 2002, 3002) and the other crimp attached (directly or indirectly) to another, different part of the SMA actuator (e.g., the second part 2004, 3004).

Crimping can be performed in different locations. In one approach, each SMA wire can be crimped in situ (or "on board"), in other words, during assembly of an actuator assembly such as the first or second actuator assemblies 2001, 3001. Each SMA wire is offered up to a partially-fabricated actuator assembly and a crimp tool is inserted into the assembly to crimp the wire. It may, however, be difficult to insert the crimping tool to allow the wire to be crimped. Thus, in another approach, each SMA wire can be crimped "off-board" using a strut element (or "fret"), remotely from the actuator-under-assembly. The fret has tabs extending laterally from its distal ends and the tabs are folded over the ends of the SMA wire and compressed to form the crimps. The SMA wire and crimps are offered up to the actuator-under-assembly and attached to the actuator-under-assembly, e.g., by welding. The fret is detached from the crimps using a cropping tool or a laser and the fret is withdrawn. Further details can be found in WO 2016/189314 A1.

One variant of this approach involves assembly using crimp assemblies that are attached on the side of the actuator. A crimp fret consists of first and second crimps (also referred to as "static and moving crimps") and a flexure arm which spans the two crimps and which reaches a fixed terminus proximate to the static crimp. The SMA wire is offset from the flexure arm to generate tilt motion.

Additionally (or alternatively), assembly can be facilitated by integrating the flexures into the carriage, as will now be described in more detail.

Figure 38:
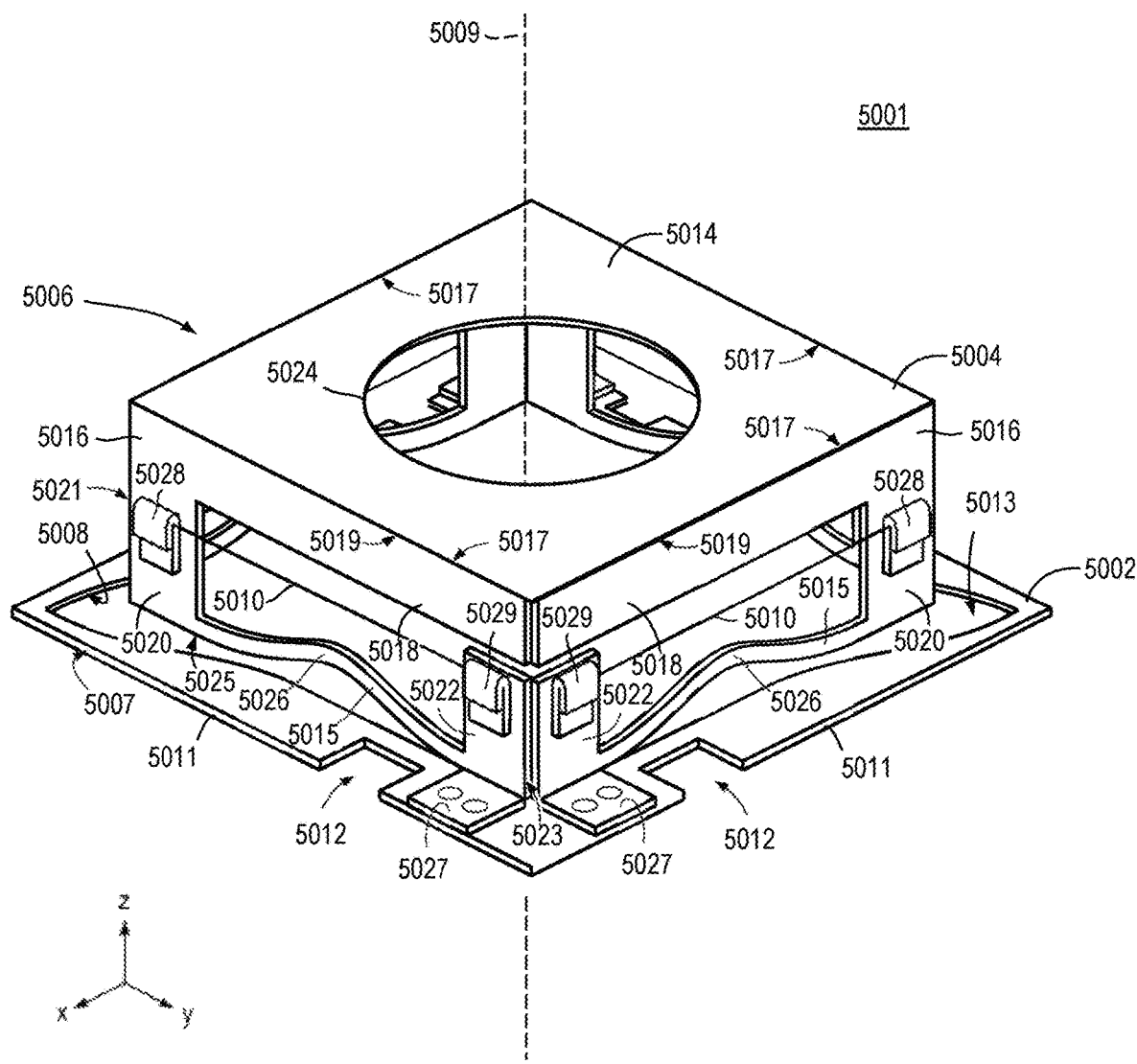
FIG. 38 is a perspective view of an actuator sub-assembly comprising a base plate and a carriage, wherein the carriage is mounted on the base plate and includes integral flexure arms.

Referring to FIG. 38, a carriage/base plate sub-assembly 5001 is schematically shown.

The sub-assembly 5001 comprises a first part 5002, a bearing arrangement 5003, a second part 5004 and a drive system 5005.

The sub-assembly 5001 is assembled using the first part 5002 and a carriage unit 5006 which comprises the bearing arrangement 5003, the second part 5004 and the drive system 5005.

The first part 5002 takes the form of a thin, annular frame having a generally square outer perimeter 5007 and a generally square inner perimeter 5008. Each side 5011 of the outer perimeter 5007 includes a respective rectangular open-sided cut out 5012 offset from the centre of the side 5011. The inner perimeter 5008 also includes first and second arrow-headed cut outs 5013 in two, opposite corners.

The carriage unit 5006 includes the second part 5004 which comprises a sheet-like main portion 5014 (or "face portion") which is generally square in plan view having a central circular aperture 5024 and four depending wing-like wall portions 5016 depending from sides 5017. The central circular aperture 5024 coincides with a primary (or optical) axis 5009. As will be explained in more detail hereinafter, the main and wall portions 5014, 5016 are integrally formed, in a single piece. The wall portions 5016 are bent so as to provide two pairs of opposite walls, each pair of opposite walls parallel to each other.

Each wall portion 5016 includes a first (or "upper") elongate portion 5018 having an first elongate edge 5019 running along a respective side 5017 of the main portion, a first wall portion 5020 depending from the elongate portion 5018 at a first end 5021 of the wall portion 5016 and second wall portion 5022 disposed at a second opposite end 5023 of the wall portion, and a flexure portion 5015 (or simply "flexure") running between the first and second ends 5021, 5023 along second elongate edge 5025. The bearing arrangement 5003 includes at least the flexures 5015, and may include additional bearings such as, for example a pivot bearing such as first pivot bearing 1050. The flexure 5015 includes a feature 5026, such as kink or meander, corresponding to the compliance improving feature 1016 described hereinbefore, and in the illustrated example configured similarly to the flexures 1010 of the fifth simple flexure 1024 shown in FIG. 14. A wing-like tab portion 5027 extends outwardly from the wall portion 5016. The tab portion 5027 is secured (e.g. welded) to the first part 5002.

The drive system 5005 includes four SMA wires 5010. Each SMA wire 5010 is held by respective pair of crimps 5028, 5029. A first crimp 5028 (or "moving crimp") is secured (e.g., welded) to the first wall portion 5020 of the wall 5016 or is formed by a portion of the first wall portion 5020 (e.g., a bent-over tongue formed by a 'U'-shaped slot in the first wall portion 5020). Similarly, a second crimp 5029 (or "static crimp") is secured (e.g., welded) to or formed by a portion of (e.g., a tongue formed by a 'U'-shaped slot) the second wall portion 5022. Thus, the first and second wall portions 5020, 5022 are connected by a parallel arrangement of a flexure 5015 and an SMA wire 5010.

The second wall portion 5022 providing the static crimp 5029 location is then folded back at the base to form the wing-like tab portion 5027, which allows for the static crimps 5029 to be mounted to the base plate (first part) 5002. An outer can would then be assembled over and welded to the base plate (first part) 5002.

The base plate (first part) 5002 has cut outs 5012 to allow the static crimps to have terminals protruding under the base plate. These can be soldered down onto flaps from the sensor PCB.

The first wall portion 5020 (where the moving crimp 5028 is located) has space underneath, due in part to the arrow-headed cut outs 5013 in the first part 5002, which could be occupied by an end stop feature (not shown), e.g. to limit downward movement along the third axis z. The plate material of the first wall portion 5020 and/or of the second part 5002 could be bent back to form first and second axis x, y end stops in this location.

The carriage/base plate sub-assembly 5001 can allow different materials to be used for the flexures 5015 and crimps 5028, 5029, which may have different yield stress and plasticity requirements. For example, the flexures 5015 (and the carriage unit 5016) may be formed of a hard stainless steel, titanium copper or nickel copper, while the crimps 5028, 5029 may be formed of a half-hard stainless steel or phosphor bronze. The carriage/base plate sub-assembly 5001 also can help to minimises footprint whilst providing a base plate (first part) 5002 with a surface.

Fabrication of the carriage/base plate sub-assembly 5001 will now be described with reference to FIGS. 39A to 39G.

Figure 39A:
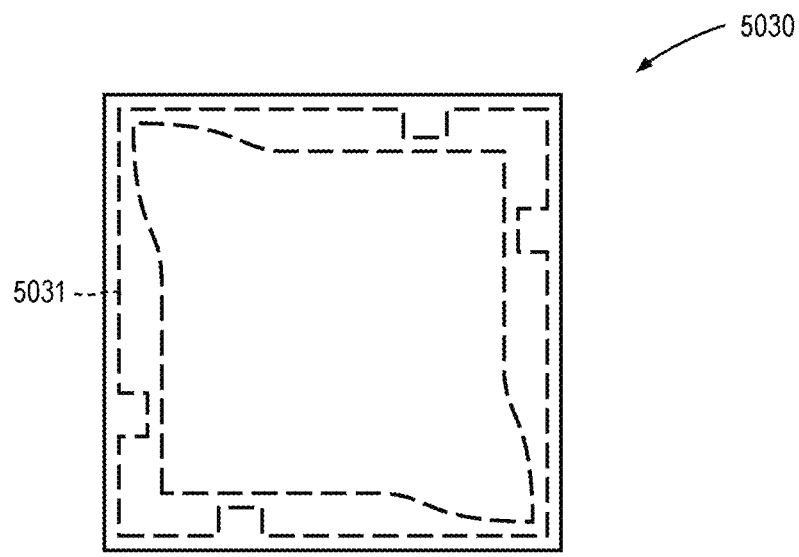
FIGS. 39A to 39G illustrate steps during fabrication of the sub-assembly shown in FIG. 38.
Figure 39B:
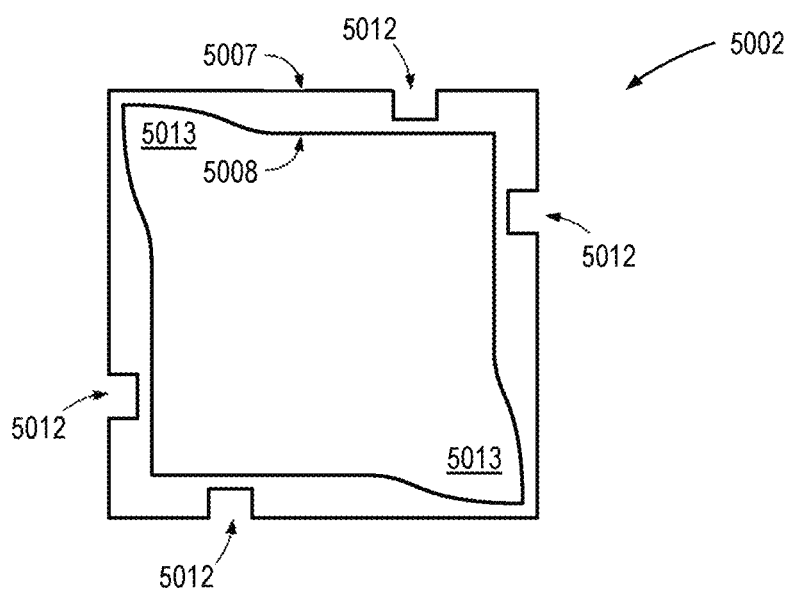

Referring to FIGS. 39A and 39B, a first sheet-like workpiece 5030, which in this case takes the form of a sheet of stainless steel, is masked with a etch-resistant mask 5031 and is wet- or dry-etched. The mask 5031 is removed leaving the first part 5002. As an alternative to etching, stamping may be used.

Figure 39C:
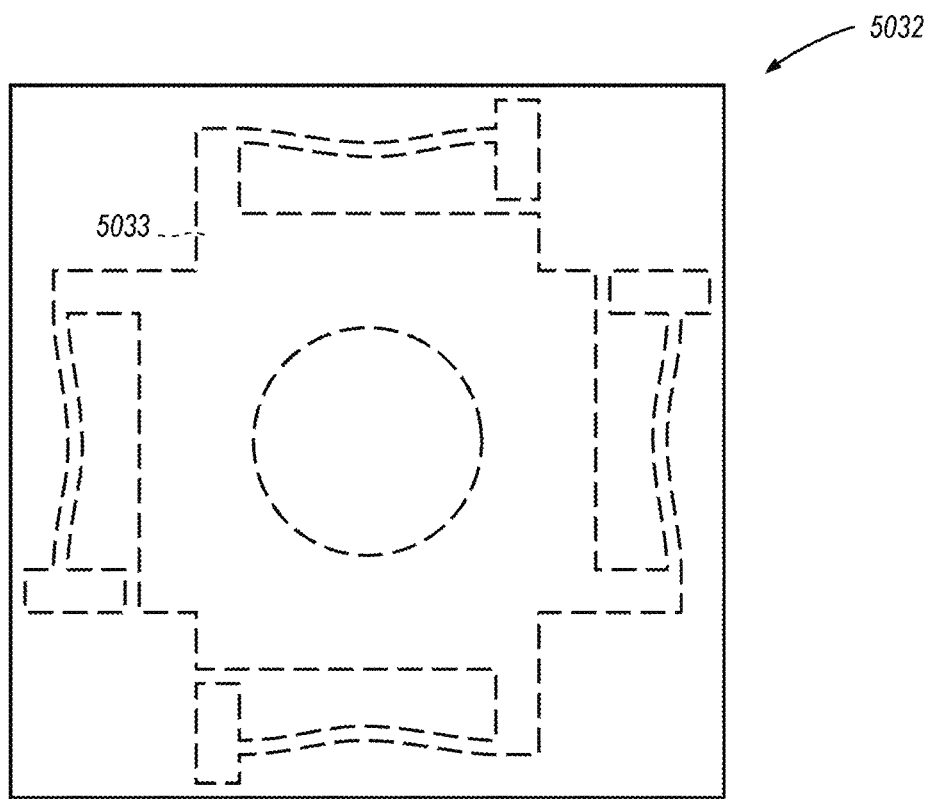
Figure 39D:
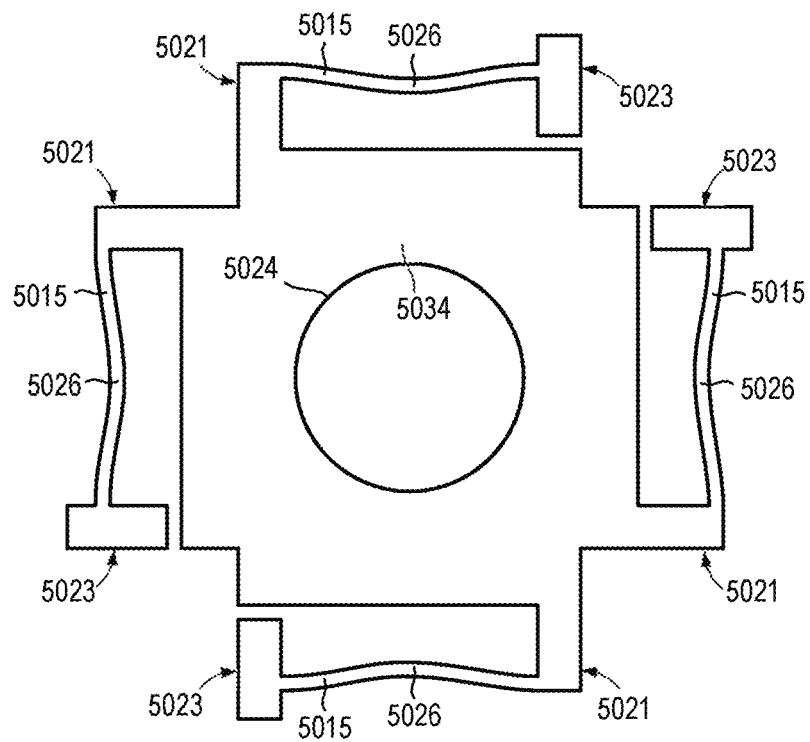

Referring to FIGS. 39C and 39D, a second sheet-like workpiece 5032, which in this case takes the form of a sheet of stainless steel, is masked with an etch-resistant mask 5033 and is wet- or dry-etched. The mask 5033 is removed leaving a sheet-like net 5034. Again, as an alternative to etching, stamping may be used.

Figure 39E:
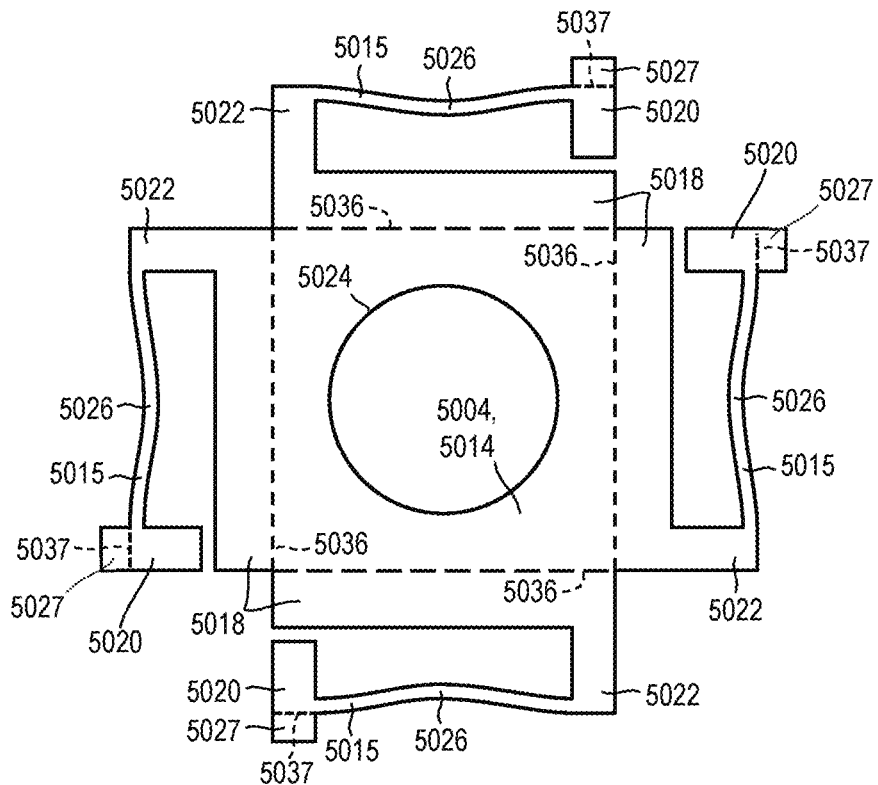

Referring to FIGS. 39E, the net 5034 is folded along fold lines 5036, 5037. A first set of fold lines 5036 define the edge between the main portion 5014 and side walls 5016. A second set of fold lines 5037 define the edge between the second wall portions 5022 and the respective wing-like tabs 5027. This forms the carriage unit 5006.

Figure 39F:
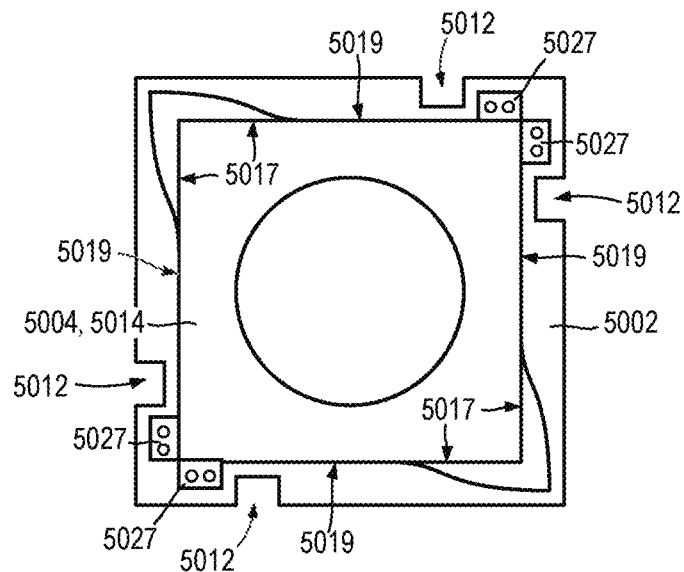

Referring to FIG. 39F, the carriage unit 5006 is then mounted onto and the first part 5002 and secured by welded wing-like tabs 5027 to the first part 5002.

Figure 39G:
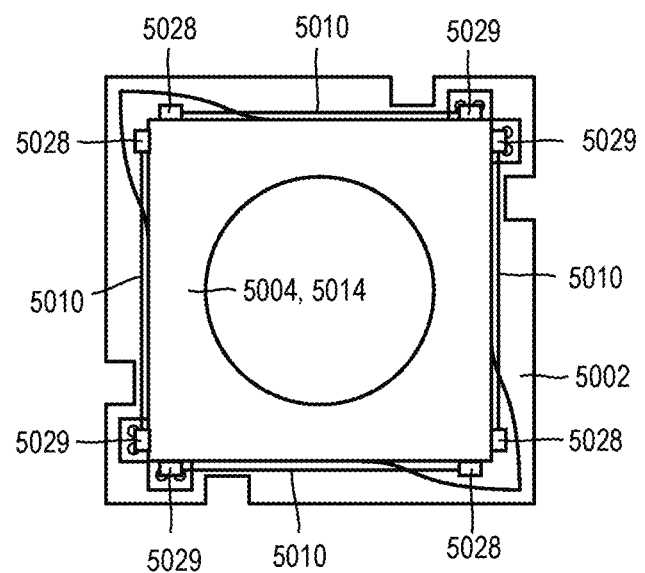

Referring to FIG. 39G, the SMA wires 5010 and crimps 5028, 5029, are attached to the outside of the carriage unit 5006. The crimping is preferably carried out "off-board" but may be carried out "on-board" as described above.

Although the carriage/base plate sub-assembly 5001 has been described using flexures 5015 having a compliance feature 5026 in the form of a curved portion, substantially corresponding to the flexures 1010 of the fifth simple flexure 1024. However, any compliance feature 1016 described hereinbefore may be used instead, for example, an elbow as used in the third simple flexure 1014, a hairpin-shaped portion 1023 as used in the fourth simple flexure 1022, the alternative curved portion used in the sixth simple flexure 1025, or any other feature 1016 satisfying the requirements outlined hereinbefore. Alternatively, the flexures 5015 need not include any compliance improving feature 5026, 1016, and may take the form of simple, straight beams.

The carriage/base plate sub-assembly 5001 has been described such that a pair of opposed flexures 5015 run in a first sense about the primary axis 5009 whilst the remaining pair of flexures 5015 run in a second, opposite sense about the primary axis 5009 (see the second simple flexure 1013 in FIG. 9). However, this is not essential, and alternatively, the four flexures 5015 may run in the same sense about the primary axis 5009 (see the simple flexure 1008 in FIG. 8A).

Instead of being attached to the outside of the carriage unit 5006, the SMA wires 5010 and crimps 5028, 5029 may be attached to the inside of the carriage unit 5006. Alternatively or additionally, the SMA wires 5010 and/or crimps 5028, 5029 may be attached to the carriage unit 5006 at a different stage of the fabrication, e.g. before folding the net 5034 or before securing the carriage unit 5006 to the first part 5002.

Modifications

It will be appreciated that there may be many other variations of the above-described embodiments.

For example, different SMA drive assemblies and different bearings hereinbefore can be suitably used in the actuator assemblies hereinbefore described.

Each of the four shape memory alloy wires $14_1$, $14_2$, $14_3$, $14_4$, $2010_1$, $2010_2$, $2010_3$, $2010_4$, $3010_1$, $3010_2$, $3010_3$, $3010_4$, $4010_1$, $4010_2$, $4010_3$, $4010_4$, 5010 corresponds to a section of SMA wire over which a drive current may be controlled independently. For example, a pair of SMA wires (e.g. $14_1$, $14_2$) may be provided by a single physical wire having a first current source (not shown) connected to one end, a second current source (not shown) connected to the other end and a current return connection (not shown) at a point between the two ends.

In the description hereinbefore, parts have been described as rectangular, and this should be interpreted as encompassing square shapes. In the description hereinbefore, parts have been described as circular, and this should be interpreted as encompassing elliptical shapes.

The first to fourth SMA wires have been described and shown as directly connecting the first and second parts. However, in some examples the first to fourth SMA wires may indirectly connect the first and second parts, for example via one or more intermediate structures (not shown). Intermediate structures (not shown) may be configured to help extend the stroke of one or more SMA wires.

The actuator assembly may be any type of assembly that comprises a first part and a second part movable with respect to the first part. The actuator assembly may be, or may be provided in, any one of the following devices: a smartphone, a protective cover or case for a smartphone, a functional cover or case for a smartphone or electronic device, a camera, a foldable smartphone, a foldable smartphone camera, a foldable consumer electronics device, a camera with folded optics, an image capture device, an array camera, a 3D sensing device or system, a servomotor, a consumer electronic device, a mobile or portable computing device, a mobile or portable electronic device, a laptop, a tablet computing device, an e-reader, a computing accessory or computing peripheral device, an audio device, a security system, a gaming system, a gaming accessory, a robot or robotics device, a medical device, an augmented reality system, an augmented reality device, a virtual reality system, a virtual reality device, a wearable device, a drone, an aircraft, a spacecraft, a submersible vessel, a vehicle, and an autonomous vehicle, a tool, a surgical tool, a remote controller, clothing, a switch, dial or button, a display screen, a touchscreen, a flexible surface, and a wireless communication device. It will be understood that this is a non-exhaustive list of example devices.

The invention claimed is:

1. An actuator assembly comprising:
  a first part;
  a bearing arrangement comprising first to fourth flexures arranged about a primary axis passing through the actuator assembly;
  a second part, wherein the bearing arrangement supports the second part on the first part and wherein the second part is tiltable about first and/or second axes which are not parallel and which are perpendicular to the primary axis; and
  a drive arrangement comprising four lengths of shape memory alloy wire, wherein the four lengths of shape memory alloy wire are coupled to the second part and to the first part;
  wherein the bearing arrangement is configured to convert lateral force(s) normal to the primary axis generated by the drive arrangement into tilting of the second part about the first and/or second axes, and
  wherein each of the first to fourth flexures has a first end connected to the first part and a second end connected to the second part, and each of the first to fourth flexures comprises a feature configured to increase a first compliance of that flexure to displacement of the respective second end towards the respective first end, wherein the first compliance is less than a second compliance of that flexure to displacement of the respective second end parallel to the primary axis.

2. The actuator assembly according to claim 1, wherein the first and third flexures run in a first sense about the primary axis, and the second and fourth flexures run in a second, opposite, sense about the primary axis.

3. The actuator assembly according to claim 1 wherein the feature of each of the first to fourth flexures comprises at least one change of direction at a point between the respective first and second ends.

4. The actuator assembly according claim 1, wherein the feature of each of the first to fourth flexures comprises at least one hairpin-shaped portion of that flexure.

5. The actuator assembly according to claim 1, wherein the feature of each of the first to fourth flexures comprises at least one portion of that flexure which meanders within an envelope.

6. The actuator assembly according to claim 1, wherein the feature of each of the first to fourth flexures comprises at least one curved portion of that flexure.

7. The actuator assembly according to claim 1, wherein the feature of each of the first to fourth flexures comprises at least one elbow.

8. The actuator assembly according to claim 1, wherein the first compliance is less than or equal to 2% of the second compliance and the first compliance is greater than or equal to 0.02% of the second compliance.

9. The actuator assembly according to claim 1, wherein the bearing arrangement comprises one or more stops configured to constrain movement of the second part relative to the first part to within an allowed volume;
  wherein each feature of the first to fourth flexures is configured so that the mechanical behavior of the respective flexures remains elastic whilst the second part remains within the allowed volume; and
  wherein at least one stop of the one or more stops is configured to constrain movement of the second part relative to the first part along the primary axis.

10. The actuator assembly according to claim 1, wherein the bearing arrangement is configured to constrain rotation of the second part relative to the first part about the primary axis.

11. The actuator assembly according to claim 1, wherein the bearing arrangement is configured to constrain translation of the second part relative to the first part in directions perpendicular to the primary axis.

12. The actuator assembly according to claim 1, wherein each of the four lengths of shape memory alloy wire lies in a first plane parallel to a second plane defined by the first and second axes, and wherein the first and second planes are offset with respect to each other along the primary axis; or
wherein the four lengths of shape memory alloy wire are not co-planar.

13. The actuator assembly according to claim 1, wherein each of the each of the four lengths of shape memory alloy wire are interposed between the first and second parts.

14. The actuator assembly according to claim 1, wherein each of the first to fourth flexures comprises a corresponding thin web.

15. The actuator assembly according to claim 1, wherein the first to fourth flexures are formed as a single part with the first part.

16. The actuator assembly according to claim 1, wherein the first to fourth flexures are formed as a single part with the second part.

17. The actuator assembly according to claim 1, wherein the second part is tiltable with respect to the first part to a range of ±6° about the first and/or second axes.

18. The actuator assembly according to claim 1, further comprising:
an image sensor; and
a lens system,
wherein the image sensor and the lens system are supported by the second part and tilt with the second part, or, wherein the image sensor is supported by the first part, and wherein the lens system is supported by the second part and tilts with the second part.

19. A system comprising:
the actuator assembly according to claim 1;
a set of switching devices for applying drive signals to respective lengths of shape memory alloy wire; and
a controller for individually controlling the switching devices.

20. A method comprising using the actuator assembly according to claim 1 for optical image stabilization and/or automatic focusing.

* * * * *